(12) United States Patent
Bailey et al.

(10) Patent No.: US 10,942,080 B2
(45) Date of Patent: Mar. 9, 2021

(54) FLUID FLOW DETECTION APPARATUS

(71) Applicant: HomeServe plc, Walsall (GB)

(72) Inventors: Samuel Bailey, London (GB); Greer Gray, Walsall (GB)

(73) Assignee: HomeServe plc, Walsall (GB)

( * ) Notice: Subject to any disclaimer, the term of this patent is extended or adjusted under 35 U.S.C. 154(b) by 189 days.

(21) Appl. No.: 16/068,252

(22) PCT Filed: Dec. 9, 2016

(86) PCT No.: PCT/GB2016/053892
§ 371 (c)(1),
(2) Date: Jul. 5, 2018

(87) PCT Pub. No.: WO2017/118834
PCT Pub. Date: Jul. 13, 2017

(65) Prior Publication Data
US 2019/0128762 A1 May 2, 2019

(30) Foreign Application Priority Data

Jan. 6, 2016 (WO) ................. PCT/GB2016/050021
May 24, 2016 (GB) ...................................... 1609091

(51) Int. Cl.
*G01M 3/00* (2006.01)
*G01M 3/28* (2006.01)
(Continued)

(52) U.S. Cl.
CPC ............. *G01M 3/002* (2013.01); *G01K 1/143* (2013.01); *G01K 13/02* (2013.01);
(Continued)

(58) Field of Classification Search
CPC .... G01M 3/002; G01M 3/2807; G01K 1/143; G01K 13/02; G01K 2013/026; G01P 13/006
See application file for complete search history.

(56) References Cited

U.S. PATENT DOCUMENTS 3,366,942 A 1/1968 Deane
3,425,277 A 2/1969 Adams
(Continued)

FOREIGN PATENT DOCUMENTS

CN 202693053 U 1/2013
CN 103016958 A 4/2013
(Continued)

OTHER PUBLICATIONS

Written Opinion of the International Searching Authority directed to International Patent Application No. PCT/GB2016/050021, dated May 19, 2016; 13 pages.
(Continued)

*Primary Examiner* — Nathaniel T Woodward
*Assistant Examiner* — Philip L Cotey
(74) *Attorney, Agent, or Firm* — Sterne, Kessler, Goldstein & Fox P.L.L.C.

(57) ABSTRACT

The present application generally relates to fluid flow detection apparatuses and methods for detecting a water leak in a pipe system of a building. A method may: determine that a low flow is present, if absolute values of temperature differences between ambient and pipe temperatures of respective samples of a first monitoring period are above a difference threshold; and perform a high flow test by estimating a temperature profile of water entering the pipe, based on identifying at least one temperature difference maximum of a second monitoring period, wherein each said difference maxima is a maximum temperature difference between
(Continued)

ambient and pipe temperatures of a received sample, and determining that a high flow is present by detecting, based on the received pipe temperatures of the second monitoring period, if the pipe temperature is approaching the estimated water temperature profile.

23 Claims, 26 Drawing Sheets

(51) Int. Cl.
  *G01P 13/00* (2006.01)
  *G01K 1/143* (2021.01)
  *G01K 13/02* (2021.01)
(52) U.S. Cl.
  CPC ......... *G01M 3/2807* (2013.01); *G01P 13/006* (2013.01); *G01K 2013/026* (2013.01)

(56) References Cited

U.S. PATENT DOCUMENTS

| | | | |
|---|---|---|---|
| 3,438,254 A | 4/1969 | Seeley | |
| 3,570,310 A | 3/1971 | Densmore | |
| 3,830,104 A | 8/1974 | Gau | |
| 3,874,222 A * | 4/1975 | Ladd | G01M 3/18 340/524 |
| 3,938,384 A | 2/1976 | Blair | |
| 4,067,237 A | 1/1978 | Arcella | |
| 4,255,968 A | 3/1981 | Harpster | |
| 4,295,669 A | 10/1981 | LaPrade et al. | |
| 4,308,746 A | 1/1982 | Covington | |
| 4,319,483 A | 3/1982 | Durham, Jr. et al. | |
| 4,335,605 A | 6/1982 | Boyd | |
| 4,336,708 A | 6/1982 | Hobgood et al. | |
| 4,339,949 A | 7/1982 | Bahner et al. | |
| 4,349,282 A | 9/1982 | Norfolk | |
| 4,363,221 A * | 12/1982 | Singh | F25B 30/02 62/238.6 |
| 4,400,975 A | 8/1983 | McGarr | |
| 4,418,568 A | 12/1983 | Surman | |
| 4,440,021 A | 4/1984 | Abouchar et al. | |
| 4,480,467 A | 11/1984 | Harter et al. | |
| 4,484,471 A | 11/1984 | Swithenbank et al. | |
| 4,494,112 A | 1/1985 | Streib | |
| 4,495,488 A | 1/1985 | Streib | |
| 4,519,246 A | 5/1985 | Hartemink | |
| 4,548,516 A | 10/1985 | Helenowski | |
| 4,599,895 A | 7/1986 | Wiseman | |
| 4,608,857 A * | 9/1986 | Mertens | G01M 3/2815 73/40.5 R |
| 4,609,292 A | 9/1986 | Asano et al. | |
| 4,633,578 A | 1/1987 | Aine et al. | |
| 4,637,253 A | 1/1987 | Sekimura et al. | |
| 4,690,570 A | 9/1987 | Wall | |
| 4,750,189 A | 6/1988 | Lancaster et al. | |
| 4,796,466 A | 1/1989 | Farmer | |
| 4,843,881 A | 6/1989 | Hubbard | |
| 4,876,887 A | 10/1989 | Mickler | |
| 4,922,233 A | 5/1990 | Twerdochlib | |
| 4,938,079 A | 6/1990 | Goldberg | |
| 4,942,763 A | 7/1990 | Harpster | |
| 4,984,460 A | 1/1991 | Isoda | |
| 5,020,919 A | 6/1991 | Suomi | |
| 5,056,047 A | 10/1991 | Sonergeld | |
| 5,064,604 A | 11/1991 | Barton | |
| 5,067,094 A | 11/1991 | Hayes | |
| 5,078,006 A | 1/1992 | Maresca, Jr. et al. | |
| 5,161,410 A | 11/1992 | Davey et al. | |
| 5,189,904 A | 3/1993 | Maresca, Jr. et al. | |
| 5,191,793 A | 3/1993 | Drexel et al. | |
| 5,201,212 A | 4/1993 | Williams | |
| 5,226,333 A | 7/1993 | Hess | |
| 5,228,329 A | 7/1993 | Dennison | |
| 5,233,868 A | 8/1993 | Coats et al. | |
| 5,259,243 A | 11/1993 | Drexel et al. | |
| 5,285,673 A | 2/1994 | Mudd | |
| 5,287,876 A | 2/1994 | Takahashi | |
| 5,299,594 A | 4/1994 | Lord et al. | |
| 5,316,035 A | 5/1994 | Collins et al. | |
| 5,335,555 A | 8/1994 | Guizot et al. | |
| 5,343,737 A | 9/1994 | Baumoel | |
| 5,347,861 A | 9/1994 | Satoh | |
| 5,375,455 A * | 12/1994 | Maresca, Jr. | G01M 3/2892 73/40.5 R |
| 5,402,111 A | 3/1995 | Hubbard, Jr. | |
| 5,410,912 A | 5/1995 | Suzuki | |
| 5,415,033 A | 5/1995 | Maresca et al. | |
| 5,417,110 A | 5/1995 | Wood | |
| 5,437,180 A | 8/1995 | Sowinski | |
| 5,453,944 A * | 9/1995 | Baumoel | G01F 15/066 703/2 |
| 5,461,910 A | 10/1995 | Hodson et al. | |
| 5,515,295 A | 5/1996 | Wang | |
| 5,525,040 A | 6/1996 | Andreae et al. | |
| 5,610,323 A | 3/1997 | Ashworth | |
| 5,676,132 A | 10/1997 | Tillotson et al. | |
| 5,685,194 A | 11/1997 | McCulloch et al. | |
| 5,705,753 A | 1/1998 | Hastings et al. | |
| 5,741,968 A | 4/1998 | Arai | |
| 5,750,893 A | 5/1998 | Murata et al. | |
| 5,763,774 A | 6/1998 | Ha et al. | |
| 5,764,539 A | 6/1998 | Rani | |
| 5,869,758 A | 2/1999 | Huiberts | |
| 5,883,815 A * | 3/1999 | Drakulich | G01M 3/002 340/501 |
| 5,918,268 A | 6/1999 | Lukas et al. | |
| 5,936,156 A | 8/1999 | Roberts et al. | |
| 5,948,969 A | 9/1999 | Fierro et al. | |
| 6,023,969 A | 2/2000 | Feller | |
| 6,047,250 A | 4/2000 | Beaudoin et al. | |
| 6,085,588 A | 7/2000 | Khadikar et al. | |
| 6,098,455 A | 8/2000 | Nukui et al. | |
| 6,101,451 A | 8/2000 | Smith et al. | |
| 6,105,607 A | 8/2000 | Caise et al. | |
| 6,125,695 A | 10/2000 | Alvesteffer et al. | |
| 6,217,211 B1 | 4/2001 | Hesky | |
| 6,234,152 B1 | 5/2001 | Fritz et al. | |
| 6,240,775 B1 | 6/2001 | Uramachi et al. | |
| 6,348,869 B1 | 2/2002 | Ashworth | |
| 6,354,150 B1 | 3/2002 | Rudent et al. | |
| 6,411,192 B1 | 6/2002 | Landis | |
| 6,430,944 B1 | 8/2002 | Ozawa | |
| 6,437,692 B1 | 8/2002 | Petite et al. | |
| 6,474,155 B1 | 11/2002 | Berkcan et al. | |
| 6,487,904 B1 | 12/2002 | Myhre | |
| 6,508,235 B2 | 1/2003 | Fabre | |
| 6,547,435 B1 | 4/2003 | Grosswig et al. | |
| 6,588,268 B1 | 7/2003 | Yamagishi et al. | |
| 6,626,037 B1 | 9/2003 | Wado et al. | |
| 6,647,777 B1 | 11/2003 | Kotaka et al. | |
| 6,658,931 B1 | 12/2003 | Plumb et al. | |
| 6,672,154 B1 | 1/2004 | Yamagishi et al. | |
| 6,681,582 B2 | 1/2004 | Suzuki et al. | |
| 6,681,625 B1 | 1/2004 | Berkcan et al. | |
| 6,779,919 B1 | 8/2004 | Staniforth et al. | |
| 6,834,556 B2 | 12/2004 | Cain et al. | |
| 6,837,271 B1 | 1/2005 | Saint | |
| 6,866,089 B2 | 3/2005 | Avila | |
| 6,883,369 B1 | 4/2005 | Myhre | |
| 6,891,838 B1 | 5/2005 | Petite et al. | |
| 6,914,893 B2 | 7/2005 | Petite | |
| 7,031,851 B2 | 4/2006 | Sherikar | |
| 7,053,767 B2 | 5/2006 | Petite et al. | |
| 7,076,373 B1 | 7/2006 | Munsterhuis et al. | |
| 7,084,778 B2 | 8/2006 | Shoub | |
| 7,103,511 B2 | 9/2006 | Petite | |
| 7,308,824 B2 | 12/2007 | Trescott et al. | |
| 7,358,860 B2 | 4/2008 | Germouni et al. | |
| 7,468,661 B2 | 12/2008 | Petite et al. | |
| 7,490,625 B1 | 2/2009 | Johnson et al. | |
| 7,536,900 B2 | 5/2009 | Nakamura et al. | |
| 7,623,028 B2 | 11/2009 | Kates | |
| 7,697,492 B2 | 4/2010 | Petite | |

(56) References Cited

U.S. PATENT DOCUMENTS

| | | |
|---|---|---|
| 7,711,500 B1 | 5/2010 | Killion et al. |
| 8,183,359 B2 | 5/2012 | Chakraborty |
| 8,290,721 B2 | 10/2012 | Wehrs et al. |
| 8,413,615 B2 | 4/2013 | Tsuge |
| 8,643,716 B1 | 2/2014 | Kalokitis et al. |
| 8,882,345 B2 | 11/2014 | Wallace |
| 8,910,530 B2 | 12/2014 | Gaarder |
| 8,912,530 B2 | 12/2014 | Yang et al. |
| 8,935,106 B2 | 1/2015 | Balogh et al. |
| 8,935,110 B2 | 1/2015 | Hsieh et al. |
| 9,146,172 B2 | 9/2015 | Trescott |
| 9,212,966 B2 | 12/2015 | Scheucher |
| 9,633,552 B2 | 4/2017 | Janchookiat |
| 9,939,346 B2 | 4/2018 | Jerez |
| 9,982,799 B2 | 5/2018 | Hassell et al. |
| 9,982,829 B2 | 5/2018 | Smyth et al. |
| 10,185,543 B2 | 1/2019 | Vilermo et al. |
| 10,428,495 B2 | 10/2019 | Halimi |
| 10,508,966 B2 * | 12/2019 | Tooms ................ G01M 3/2807 |
| 2001/0027684 A1 | 10/2001 | Lotters et al. |
| 2001/0032503 A1 | 10/2001 | Schrittenlacher |
| 2001/0052261 A1 | 12/2001 | Lull et al. |
| 2002/0130780 A1 | 9/2002 | McQueen et al. |
| 2002/0147425 A1 | 10/2002 | Briggs et al. |
| 2003/0048190 A1 | 3/2003 | Landis |
| 2003/0079553 A1 | 5/2003 | Cain et al. |
| 2003/0115952 A1 | 6/2003 | Mayer et al. |
| 2003/0196487 A1 | 10/2003 | Ariyoshi |
| 2003/0221483 A1 | 12/2003 | McMillan et al. |
| 2004/0025585 A1 | 2/2004 | Seki et al. |
| 2004/0031331 A1 | 2/2004 | Blakley et al. |
| 2004/0045352 A1 | 3/2004 | Kamiunten et al. |
| 2004/0064270 A1 | 4/2004 | Luchner |
| 2004/0139799 A1 | 7/2004 | Sudolcan et al. |
| 2004/0149027 A1 | 8/2004 | Gimson |
| 2004/0194544 A1 | 10/2004 | Tokushisa et al. |
| 2004/0225458 A1 | 11/2004 | Sherikar |
| 2004/0255667 A1 | 12/2004 | Konzelmann et al. |
| 2005/0005683 A1 | 1/2005 | Wolford et al. |
| 2005/0072225 A1 | 4/2005 | Kanke et al. |
| 2005/0081620 A1 | 4/2005 | Ito et al. |
| 2005/0155421 A1 | 7/2005 | Koike et al. |
| 2005/0155663 A1 | 7/2005 | Dhellemmes et al. |
| 2005/0188776 A1 | 9/2005 | Kunter et al. |
| 2005/0193802 A1 | 9/2005 | Tipler |
| 2005/0222782 A1 | 10/2005 | Kottenstette et al. |
| 2005/0223793 A1 | 10/2005 | Markus |
| 2005/0229714 A1 | 10/2005 | Willigen |
| 2006/0010973 A1 | 1/2006 | Brown |
| 2006/0027267 A1 | 2/2006 | Fritze |
| 2006/0108003 A1 | 5/2006 | Bradford et al. |
| 2006/0161311 A1 | 7/2006 | Vinson et al. |
| 2006/0161357 A1 | 7/2006 | Munsterhuis et al. |
| 2006/0162442 A1 | 7/2006 | Matsumoto et al. |
| 2006/0207320 A1 | 9/2006 | Yamada et al. |
| 2006/0213263 A1 | 9/2006 | Kawanishi et al. |
| 2006/0225507 A1 | 10/2006 | Paulson |
| 2006/0230826 A1 | 10/2006 | Nakamura et al. |
| 2006/0234414 A1 | 10/2006 | Van Der Weil |
| 2006/0272830 A1 | 12/2006 | Fima |
| 2006/0283236 A1 | 12/2006 | Trescott et al. |
| 2007/0039662 A1 | 2/2007 | Shuey |
| 2007/0047616 A1 | 3/2007 | Izumiura et al. |
| 2007/0137297 A1 | 6/2007 | Gehman et al. |
| 2007/0160108 A1 | 7/2007 | Kent |
| 2007/0174016 A1 | 7/2007 | Ding et al. |
| 2007/0181554 A1 | 8/2007 | Nakano et al. |
| 2007/0219650 A1 | 9/2007 | Wang et al. |
| 2007/0290134 A1 | 12/2007 | Key et al. |
| 2007/0295081 A1 | 12/2007 | Orban et al. |
| 2008/0008223 A1 | 1/2008 | Guillet |
| 2008/0013291 A1 | 1/2008 | Bork |
| 2008/0016958 A1 | 1/2008 | Matsumoto et al. |
| 2008/0023196 A1 | 1/2008 | Crawley et al. |
| 2008/0034861 A1 | 2/2008 | Bognar |
| 2008/0047339 A1 | 2/2008 | Hasebe |
| 2008/0092644 A1 | 4/2008 | Hasebe |
| 2008/0115565 A1 | 5/2008 | Yanagi et al. |
| 2008/0121022 A1 | 5/2008 | Kolke et al. |
| 2008/0133152 A1 | 6/2008 | Nitschke et al. |
| 2008/0168783 A1 | 7/2008 | Kojima et al. |
| 2008/0210002 A1 | 9/2008 | Kamiunten et al. |
| 2008/0282791 A1 | 11/2008 | Nakano et al. |
| 2008/0289410 A1 | 11/2008 | Pape et al. |
| 2008/0289411 A1 | 11/2008 | Schrag et al. |
| 2008/0289412 A1 | 11/2008 | Huck |
| 2008/0295590 A1 | 12/2008 | Sukegawa et al. |
| 2008/0307879 A1 | 12/2008 | Borst et al. |
| 2009/0000372 A1 | 1/2009 | Matsumoto et al. |
| 2009/0007968 A1 | 1/2009 | Knecht et al. |
| 2009/0025473 A1 | 1/2009 | Imai et al. |
| 2009/0071625 A1 | 3/2009 | Lyon |
| 2009/0094999 A1 | 4/2009 | Leatherbarrow |
| 2009/0116535 A1 | 5/2009 | Rund |
| 2009/0120206 A1 | 5/2009 | Matsubara |
| 2009/0201969 A1 | 8/2009 | Krauss et al. |
| 2009/0234513 A1 | 9/2009 | Wiggins |
| 2009/0308140 A1 | 12/2009 | Haseloh et al. |
| 2010/0037688 A1 | 2/2010 | Inoue et al. |
| 2010/0045951 A1 | 2/2010 | Martens et al. |
| 2010/0089118 A1 | 4/2010 | Mayer et al. |
| 2010/0089459 A1 | 4/2010 | Smirnov et al. |
| 2010/0110437 A1 | 5/2010 | Furtaw et al. |
| 2010/0139390 A1 | 6/2010 | Gimson et al. |
| 2010/0147068 A1 | 6/2010 | Neuhaus et al. |
| 2010/0206090 A1 | 8/2010 | Stack |
| 2010/0223991 A1 | 9/2010 | Maraoka et al. |
| 2010/0265096 A1 | 10/2010 | Cornwall et al. |
| 2010/0280769 A1 | 11/2010 | Levy |
| 2011/0025511 A1 | 2/2011 | Wein |
| 2011/0061841 A1 | 3/2011 | Zolock et al. |
| 2011/0098944 A1 | 4/2011 | Pfau et al. |
| 2011/0100114 A1 | 5/2011 | De Corral |
| 2011/0178736 A1 | 7/2011 | Westra et al. |
| 2011/0209526 A1 | 9/2011 | Wagner |
| 2011/0295540 A1 | 12/2011 | Mäkinen |
| 2011/0296910 A1 | 12/2011 | Lopez et al. |
| 2011/0301848 A1 | 12/2011 | Garcia et al. |
| 2011/0308300 A1 | 12/2011 | Bandaru et al. |
| 2012/0067542 A1 | 3/2012 | Frach et al. |
| 2012/0097253 A1 | 4/2012 | Eutsler |
| 2012/0180877 A1 | 7/2012 | Trescott |
| 2012/0191381 A1 | 7/2012 | Takakura et al. |
| 2012/0192642 A1 | 8/2012 | Speldrich et al. |
| 2012/0192644 A1 | 8/2012 | Asano et al. |
| 2012/0206272 A1 | 8/2012 | Borlee |
| 2012/0232809 A1 | 9/2012 | Steckling |
| 2012/0245884 A1 | 9/2012 | Wohrle |
| 2012/0279316 A1 | 11/2012 | Gaarder |
| 2012/0304746 A1 | 12/2012 | Gerhardt |
| 2012/0324985 A1 | 12/2012 | Gu et al. |
| 2012/0329166 A1 | 12/2012 | Skarping et al. |
| 2013/0014577 A1 | 1/2013 | Tam et al. |
| 2013/0031973 A1 | 2/2013 | Kirst et al. |
| 2013/0041234 A1 | 2/2013 | Grinstein et al. |
| 2013/0041588 A1 | 2/2013 | Johnson et al. |
| 2013/0066568 A1 | 3/2013 | Alonso |
| 2013/0081449 A1 | 4/2013 | Li et al. |
| 2013/0085688 A1 | 4/2013 | Miller et al. |
| 2013/0098150 A1 | 4/2013 | Sella |
| 2013/0106616 A1 | 5/2013 | Gustafsson et al. |
| 2013/0174649 A1 | 7/2013 | Hains et al. |
| 2013/0276549 A1 | 10/2013 | Gaarder |
| 2013/0332103 A1 | 12/2013 | Houldsworth |
| 2014/0034145 A1 | 2/2014 | Burt |
| 2014/0046605 A1 | 2/2014 | McHugh et al. |
| 2014/0049008 A1 | 2/2014 | Ziegler |
| 2014/0109882 A1 | 4/2014 | Hoegl et al. |
| 2014/0196802 A1 * | 7/2014 | Guy .................... G01M 3/2807 137/486 |
| 2014/0260549 A1 | 9/2014 | Dudar et al. |
| 2014/0261693 A1 | 9/2014 | Geerligs et al. |
| 2014/0290335 A1 | 10/2014 | Shanks |
| 2014/0290355 A1 | 10/2014 | Booten et al. |

(56) References Cited

U.S. PATENT DOCUMENTS

| | | |
|---|---|---|
| 2014/0298919 A1 | 10/2014 | Milley et al. |
| 2014/0306828 A1 | 10/2014 | Trescott et al. |
| 2014/0348205 A1 | 11/2014 | Shaw et al. |
| 2014/0360262 A1 | 12/2014 | Asano et al. |
| 2014/0376594 A1 | 12/2014 | Daily et al. |
| 2015/0006092 A1 | 1/2015 | Grohmann |
| 2015/0020587 A1 | 1/2015 | Milley et al. |
| 2015/0027221 A1 | 1/2015 | Aizawa et al. |
| 2015/0091721 A1 | 4/2015 | Zinevich |
| 2015/0120133 A1 | 4/2015 | Dudar et al. |
| 2015/0122009 A1 | 5/2015 | Berkcan et al. |
| 2015/0134277 A1 | 5/2015 | Van Doorn |
| 2015/0153208 A1 | 6/2015 | Arnold et al. |
| 2015/0192442 A1 | 7/2015 | Olin |
| 2015/0219522 A1 | 8/2015 | Tseng et al. |
| 2015/0268264 A1 | 9/2015 | Nelson |
| 2015/0300856 A1 | 10/2015 | Pfau et al. |
| 2015/0300908 A1 | 10/2015 | Laramee et al. |
| 2015/0310678 A1 | 10/2015 | Ito |
| 2015/0316401 A1 | 11/2015 | Popp et al. |
| 2015/0337679 A1 | 11/2015 | Everwyn et al. |
| 2015/0376874 A1 | 12/2015 | Breedlove |
| 2016/0011031 A1 | 1/2016 | Asano et al. |
| 2016/0025536 A1* | 1/2016 | Madsen ............... G06F 17/18 702/45 |
| 2016/0084693 A1 | 3/2016 | Lang et al. |
| 2016/0138988 A1 | 5/2016 | Hansmann et al. |
| 2016/0161940 A1 | 6/2016 | Max |
| 2016/0163177 A1 | 6/2016 | Klicpera |
| 2016/0187175 A1 | 6/2016 | Suzuki et al. |
| 2016/0245681 A1 | 8/2016 | Maginnis et al. |
| 2016/0265685 A1 | 9/2016 | Hassell et al. |
| 2016/0265955 A1 | 9/2016 | Easey et al. |
| 2016/0320245 A1 | 11/2016 | Herbron |
| 2016/0334045 A1 | 11/2016 | Smyth et al. |
| 2017/0138022 A1 | 5/2017 | Trescott et al. |
| 2017/0184432 A1 | 6/2017 | Umezawa et al. |
| 2017/0247863 A1 | 8/2017 | Kobayashi et al. |
| 2017/0343401 A1 | 11/2017 | Arnold et al. |
| 2017/0356774 A1 | 12/2017 | Gaberthuel |
| 2018/0010978 A1 | 1/2018 | Bailey |
| 2018/0031439 A1 | 2/2018 | Tooms et al. |
| 2018/0038722 A1 | 2/2018 | Ozaki et al. |
| 2018/0058891 A1 | 3/2018 | Kobayashi et al. |
| 2018/0135808 A1 | 5/2018 | André et al. |
| 2018/0238747 A1 | 8/2018 | Choi et al. |
| 2018/0291911 A1 | 10/2018 | Ward et al. |
| 2018/0313714 A1 | 11/2018 | Bailey |
| 2020/0003646 A1 | 1/2020 | Krywyj |
| 2020/0033063 A1 | 1/2020 | Rajagopaian et al. |

FOREIGN PATENT DOCUMENTS

| | | |
|---|---|---|
| CN | 104373820 B | 3/2017 |
| DE | 3827444 A1 | 2/1990 |
| DE | 19858307 A1 | 6/2000 |
| DE | 19921256 A1 | 11/2000 |
| DE | 10017958 A1 | 12/2000 |
| DE | 102004061261 A1 | 6/2006 |
| DE | 102007037394 A1 | 2/2009 |
| DE | 102012022991 A1 | 5/2014 |
| DE | 102013006874 A1 | 10/2014 |
| DE | 202014100330 U1 | 5/2015 |
| DE | 102014114848 A1 | 4/2016 |
| EP | 0989396 A2 | 3/2000 |
| EP | 1006500 A2 | 6/2000 |
| EP | 1247082 A2 | 10/2002 |
| EP | 1431717 A1 | 6/2004 |
| EP | 1643230 B | 4/2006 |
| EP | 2000784 A1 | 12/2008 |
| EP | 2000788 A1 | 12/2008 |
| EP | 2126531 A1 | 12/2009 |
| EP | 2253897 A1 | 11/2010 |
| EP | 2518465 A2 | 10/2012 |
| EP | 2682719 A1 | 1/2014 |
| EP | 2840362 A1 | 2/2015 |
| EP | 3067671 A1 | 9/2016 |
| EP | 3268702 A1 | 1/2018 |
| ES | 2354673 A1 | 3/2011 |
| FR | 2318410 A1 | 2/1977 |
| FR | 2763665 A1 | 11/1998 |
| GB | 1246670 A | 9/1971 |
| GB | 1504334 A | 3/1978 |
| GB | 1517740 A | 7/1978 |
| GB | 1604170 A | 12/1981 |
| GB | 2104958 A | 3/1983 |
| GB | 2289760 A | 11/1995 |
| GB | 2452043 A | 2/2009 |
| GB | 2475257 A | 5/2011 |
| GB | 2559737 A | 8/2012 |
| GB | 2516770 A | 2/2015 |
| GB | 2536364 A | 9/2016 |
| GB | 2537013 | 10/2016 |
| GB | 2545830 A | 6/2017 |
| GB | 2546018 A | 7/2017 |
| GB | 2546126 A | 7/2017 |
| GB | 2533936 A | 10/2017 |
| GB | 2549209 A | 10/2017 |
| GB | 2559836 A | 8/2018 |
| GB | 2562695 A | 11/2018 |
| IL | 47511 A | 7/1977 |
| IN | 2017/17036197 A | 12/2017 |
| JP | 56079230 A | 6/1981 |
| JP | S 57-198840 A | 12/1982 |
| JP | S 58-86417 A | 5/1983 |
| JP | S 61-26829 A | 2/1986 |
| JP | 61195326 A | 8/1986 |
| JP | 8054268 A | 2/1996 |
| JP | H 0854268 A | 2/1996 |
| JP | 2001091369 A | 4/2001 |
| JP | 2007127065 A | 5/2007 |
| JP | 2018-036101 A | 3/2018 |
| RU | 2232379 C | 7/2004 |
| WO | WO 9626425 A1 | 8/1996 |
| WO | WO 9726520 A1 | 7/1997 |
| WO | WO 98/08069 A1 | 2/1998 |
| WO | WO 0125743 A2 | 4/2001 |
| WO | WO 0198736 A1 | 12/2001 |
| WO | WO 2004/020958 A1 | 3/2003 |
| WO | WO 03/029759 A1 | 4/2003 |
| WO | WO 03/052356 A1 | 6/2003 |
| WO | WO 2004025241 A1 | 3/2004 |
| WO | WO 2004/063679 A1 | 7/2004 |
| WO | WO 2005047828 A1 | 5/2005 |
| WO | WO 2006/058863 A1 | 6/2006 |
| WO | WO 2007/063110 A1 | 6/2007 |
| WO | WO 2008102104 A1 | 8/2008 |
| WO | WO 2009024746 A2 | 2/2009 |
| WO | WO 2009/051588 A | 4/2009 |
| WO | WO 10103521 A2 | 9/2010 |
| WO | WO 2010114408 A1 | 10/2010 |
| WO | WO 2010/142999 A2 | 12/2010 |
| WO | WO 10139914 A1 | 12/2010 |
| WO | WO 2011107101 A1 | 9/2011 |
| WO | WO 2012/035483 A2 | 3/2012 |
| WO | WO 2012033908 A1 | 3/2012 |
| WO | WO 2013/110603 A1 | 8/2013 |
| WO | WO 2014/173414 A1 | 10/2014 |
| WO | WO 2014/194982 A2 | 12/2014 |
| WO | WO 2014/203246 A1 | 12/2014 |
| WO | WO 2015/000487 A1 | 1/2015 |
| WO | WO 2015/019081 A1 | 2/2015 |
| WO | WO 2015/039664 A1 | 3/2015 |
| WO | WO 2015028629 A1 | 3/2015 |
| WO | WO 2015/093941 A1 | 6/2015 |
| WO | WO 2015097407 A1 | 7/2015 |
| WO | WO 2015/119139 A1 | 8/2015 |
| WO | WO 2015/139760 A1 | 9/2015 |
| WO | WO 2015/171196 A1 | 11/2015 |
| WO | WO 2015/178904 A1 | 11/2015 |
| WO | WO 2015166265 A1 | 11/2015 |
| WO | WO 2015166429 A1 | 11/2015 |
| WO | WO 2015178904 A1 | 11/2015 |

(56) References Cited

FOREIGN PATENT DOCUMENTS

| WO | WO 2015/192857 A1 | 12/2015 |
|---|---|---|
| WO | WO 2016/044866 A4 | 3/2016 |
| WO | WO 2016/096498 A1 | 6/2016 |
| WO | WO 2016/102124 A1 | 6/2016 |
| WO | WO 16110696 A1 | 7/2016 |
| WO | WO 2016110696 A1 | 7/2016 |
| WO | WO 2016/124931 | 8/2016 |
| WO | WO 2016/124931 A1 | 8/2016 |
| WO | WO 2016/140019 A1 | 9/2016 |
| WO | WO 2016146500 A1 | 9/2016 |
| WO | WO 2017045819 A1 | 3/2017 |
| WO | WO 2017/118834 A1 | 7/2017 |
| WO | WO 2016/067558 A1 | 9/2017 |
| WO | WO 2018/007802 A1 | 1/2018 |
| WO | WO 2018/010746 A1 | 1/2018 |

OTHER PUBLICATIONS

English-language abstract of CN 103016958 A; 2 pages.
English-language abstract of DE 102004061261 A1; 2 pages.
English-language abstract of DE 102013006874 A1; 1 page.
English-language abstract of DE 19858307 A1; 1 page.
English-language abstract of DE 19921256 A1; 1 page.
English-language abstract of DE 202014100330 U1; 1 page.
English-language abstract of DE 3827444 A1; 2 pages.
English-language abstract of EP 0989396 A2; 2 pages.
English-language abstract of EP 1643230 B; 2 pages.
English-language abstract of EP 2518465 A2; 2 pages.
English-language abstract of ES 2354673 A1; 1 page.
English-language abstract of FR 2763665 A1; 1 page.
English-language abstract of WO 0198736 A1; 2 pages.
English-language abstract of WO 10139914 A1; 2 pages.
English-language abstract of WO 2004025241 A1; 2 pages.
English-language abstract of WO 2015097407 A1; 2 pages.
English-language abstract of WO 9626425 A1; 2 pages.
English-language abstract of Chinese Patent Application Publication No. CN 20269053 U, published Jan. 23, 2013; 1 page.
English-language abstract of German Patent Application Publication No. DE 10017958 A1 Dec. 21, 2000; 1 page.
English-language abstract of German Patent Application Publication No. DE 102007037394 A1 Feb. 12, 2009; 1 page.
English-language abstract of German Patent Application Publication No. DE 102012022991 A1, published May 28, 2014; 1 page.
English-language abstract of German Patent Application Publication No. DE 102014114848 A1, Apr. 14, 2016; 2 pages.
English-language abstract of French Patent Application Publication No. FR 2318410 A1, published Feb. 2, 1977; 1 page.
English-language abstract of Japanese Patent Application Publication No. JP 2001091369 A, published Apr. 6, 2001; 1 page.
English-language abstract of Russian Patent No. RU 2232379 C, published Jul. 10, 2004; 1 page.
English-language abstract of International Patent Application Publication No. WO 98/008069 A1, published Feb. 26, 1998; 1 page.
English-language abstract of International Patent Application Publication No. WO 2006/058863 A1, published Jun. 8, 2006; 1 page.
English-language abstract of International Patent Application Publication No. WO 2007/063110 A1, published Jun. 7, 2006; 2 pages.
English-language abstract of International Patent Application Publication No. WO 2013/110603 A1, published Aug. 1, 2013; 1 page.
English-language abstract of Japanese Patent Application Publication No. JP 56079230 A, published Jun. 29, 1981; 2 pages.
English-language abstract of Japanese Patent Application Publication No. JP 61195326 A, published Aug. 29, 1986; 2 pages.
English-language abstract of Japanese Patent Application Publication No. JP 8054268 A, published Feb. 27, 1996; 1 page.
English-language abstract of International Patent Application Publication WO 2004/020958 A1, published Mar. 11, 2004; 2 pages.
U.S. Office Action directed to U.S. Appl. No. 15/541,856, dated Jul. 17, 2019; 16 pages.
"Leak Detection and Automatic Refrigerant Pump Down," Panasonic, 5 pages, found to be available on Nov. 24, 2015, retrieved from http://aircon.panasonic.eu/GB_en/happening.
"Temperature Detection," Neptune Oceanographics, found to be available on Nov. 24, 2015, 1 page, retrieved from https://www.neptuneoceanographics.com/thermal-leak-detection.
Glennen, "LeakBot and HomeServe Labs Fight Leaky Pipes," Insurance Business Magazine, published on Jul. 15, 2016, 2 pages.

* cited by examiner

FLUID FLOW DETECTION APPARATUS

FIELD OF THE INVENTION

The present application generally relates to fluid flow detection apparatuses and methods for detecting a water leak in a pipe system of a building.

BACKGROUND TO THE INVENTION

Being able to detect fluid flow in a pipe has many useful applications. A key one is detecting the presence of leaks in a pipe system. Detecting flow in a system when all taps and valves are closed will usually indicate the presence of a leak in the system being monitored.

It is an object of some embodiments of the present invention to provide a preferably non-invasive method of detecting fluid flow in a pipe system.

It is also desirable in some embodiments to be able to monitor flow rates—or lack thereof remotely from a central control unit or monitoring station.

Advantageously, an improved flow detector may detect a water flow or leak accurately and/or reliably. This is desirable for both low flow rates and high flow rates, e.g., catastrophic leakages such as from a burst pipe. Such detection with high speed and/or with minimum false alarms to a user is generally desirable. The flow detector is preferably manufactured at low cost.

For use in understanding the present invention, the following disclosures are referred to:
US2010/206090 A1 (Stack);
EP2840362 (Kamstrup);
WO2015/097407 A1 (GRDF)
US2012/206272 A1 (Borlee);
U.S. Pat. No. 9,146,172 B2 (Trescott);
U.S. Pat. No. 7,308,824 B2 (Trescott);
http://www.aircon.panasonic.eu/GB_en/happening/4679/ found to be available at 24.11.15;
http://www.neptuneoceanographics.com/thermal-leak-detection.php found to be available at 24.11.15;
WO01/25743 A2 (Espensen);
WO2011/107101 A1 (Klokker);
U.S. Pat. No. 5,918,268 A (Lukas); and
U.S. Pat. No. 5,415,033 A (Maresca).

SUMMARY

Aspects of the present invention are defined below. Preferred embodiments are defined in the appended dependent claims.

According to a first aspect of the present invention, there is provided a fluid flow detection apparatus for detecting a water leak in a pipe system of a building, the apparatus configured to perform a low flow test and a high flow test and to output a leak signal indicating one of a high flow, a low flow and no flow based on a result of at least one said test, wherein the apparatus has: a first temperature sensor to detect ambient temperature; a second temperature sensor to detect pipe temperature, the second temperature sensor adjacent or in thermal contact with a pipe of the pipe system; at least one input line, configured to receive a time series of ambient temperature indicators from the first temperature sensor and a time series of pipe temperature indicators from the second temperature sensor; and a processor configured to perform said low flow and high flow tests, wherein the processor is configured to perform the low flow test by: determining that a low flow is present, if absolute values of temperature difference indicators of a monitoring period remain above a difference threshold, wherein each said temperature difference indicator represents a difference between a said received first temperature indicator and a said received second temperature indicator, and wherein the processor is configured to perform the high flow test by: estimating, based on received pipe temperature indicators at respective difference maxima between the received ambient and pipe temperatures, a temperature profile of water entering the pipe; and determining that a high flow is present by detecting, based on the pipe temperature indicators, if the pipe temperature approaches the estimated water temperature profile.

The apparatus, which may be referred to as e.g. a water flow detector, fluid detection device or fluid flow detector system, may be a system and/or comprise at least a device for fitting to the pipe and having at least the pipe temperature sensor. Advantageously, the apparatus applies different techniques of detecting low (e.g. dripping tap) and high (generally full or catastrophic) flows, which may be assumed to be leaks. In combination, these techniques may allow more accurate, reliable and/or faster leak detection. Preferably, false alarms are reduced. The leak signal may be output as an audio and/or visual indicator locally to the pipe, sent to a remote hub and/or to a remote user device such as a mobile phone.

The monitoring period may be a first monitoring period, and the pipe temperature indicators used for the high flow test corresponding to a second monitoring period. The first and second monitoring periods may be the same periods, may or may not overlap, and either may encompass the other.

The apparatus may receive and/or record pipe and ambient (air) temperature, Tp and Ta, at a specific sample rate (for example a new sample pair every e.g. 100 seconds). The data received on the input line(s) (e.g., connector(s), IC pin(s) or PCB wire(s) or bus(ses)) is preferably stored in memory. Such memory may effectively provide a window of data (e.g., a buffer storing temperature indicators) that the processor (generally one or more ICs, local and/or remote to the pipe temperature sensor, e.g. distributed for example locally and/or in a remote hub) looks back over and performs tests on to determine if there is a leak; the data looked over may be received during the monitoring period. For low flow the monitoring period may have a predetermined duration such as 2.7 hrs, which may correspond to a time series of a set number, e.g., 100, of samples (air and pipe temperature indicator pairs). For high flow, a different window length may be used. For example, the time period during which the stored temperature indicators used in the high flow test are received may have a predetermined duration such as 20 minutes, which may correspond to a set number, e.g., 12, of samples (air and pipe temperature indicator pairs). Generally such a monitoring period for the high flow test may be shorter than the monitoring period for the low flow test. Preferably the high flow test uses some of the same stored samples as the low flow test. The samples used by the tests are preferably received during a predetermined time of expected low usage, preferably a night time e.g. between 12 pm and 5 am. For the low flow test, a temperature difference indicator may represent a difference between temperature indicators of a pair, e.g., relating to air and pipe temperatures of substantially (e.g., exactly) the same instant of time.

Regarding mentions herein of receiving/received temperatures/temperature indicators, this could involve storing the time series in a memory such as a buffer for successive pairs of pipe and ambient temperature indicator samples or respective buffers for the pipe and ambient temperature indicators. Equally, the data may not be stored as time series, as processing of the temperature indicators may be done on-the-fly (for example, for the curvature check mentioned below, the gradient may be determined by fitting a line to the stored data but this is not essential. Further regarding detailed description below, the processor may for example perform any curvature and/or gradient, check if it is below a threshold and then maintain a flag of whether it has been below the threshold for more than the length of time (e.g., a length of the quiet period), and then calculate a preferably final temperature difference or other delta when the criteria are met).

The apparatus may start a said low and/or high flow leak test at every new incoming sample pair. In other words, a new monitoring periods start at the time of each new sample pair, the processor for example then looking back over the last e.g. 100 samples for low flow, and/or looking back over the last e.g. 12 samples for high flow.

For the high flow test, the water temperature estimation may involve e.g. interpolating between the minima and/or fitting a curve or curve to the minima. The stored pipe temperature indicators at respective difference maxima may indicate minimum pipe temperatures, if Tambient (Ta or Tair) is generally higher than Tpipe (Tp); or maxima if Ta is generally lower than Tp. The water temperature estimation may not proceed until it is detected that the device is fitted to the pipe. The detected approach of the pipe temperature may be to the estimated water temperature profile, e.g., relating to a convergence.

Regarding a low flow test, the processor of an embodiment may be configured to perform a validity check to determine, based on the stored ambient temperature indicators of the monitoring period, that a low flow test is invalid when ambient temperature variation is not smooth and not stable, the processor configured to, if the validity check indicates invalidity, inhibit output of a said leak signal indicating a low flow. Such a check may be a Ta (ambient temperature) smoothness and/or stability check. As for any validity check described herein, the relevant leak test may be one that has, is or will be performed, so that the validity check may prevent signal based on a test that has been performed, or prevent performance of the test.

The smoothness and/or stability may in such an embodiment be determined based on a comparison of stored said ambient temperature indicators to a straight line fit to said stored ambient temperature indicators. This may involve checking how well a straight line fits to Ta, for example by checking that the residuals and/or mean square residual are both less than respective thresholds.

Further in such an embodiment, stability may be detected when at least one of: a (preferably absolute) average gradient of said ambient temperature indicators is not outside a predetermined range (e.g. the gradient of a line fitted to Ta over the e.g. 100 samples is within positive and negative bounds: Agrad−<gradient(Ta)<Agrad+); and a difference between minimum and maximum said ambient temperature indicators is less than a threshold (for example when the range of Ta values over the e.g. 100 samples is detected as being less than a threshold). The predetermined range may be adjusted, e.g., scaled by the processor, depending on a difference between estimated incoming water temperature and an indicated ambient temperature.

(We however note that in any embodiment, stability may be measured/determined using a measure (e.g. average; standard deviation; maximum) of differences compared to a straight line fit to the subject data, e.g. based on maximum residuals to a (preferably straight line) fit. Thus, pipe temperature instability may be determined if at least one residual of the stored pipe temperatures relative to a straight line fit to the stored pipe temperatures exceeds a threshold, and/or if a mean square of such residuals exceeds a threshold. In contrast, smoothness may be measured/determined based on curvature, for example whether a temperature has any kinks, e.g. any peaks detectable for example with a second (or higher) order differential filter).

A different validity check may be performed to determine, based on the stored pipe temperature indicators of the monitoring period, that a low flow test is invalid when the stored pipe temperature indicators of the monitoring period comprise at least one peak, the processor configured to, if the validity check indicates invalidity, inhibit output of a said leak signal indicating a low flow. This may be referred to as a Tp curvature check. The presence of at least one such peak indicate that the pipe temperature is not stable.

Such peak(s) may be detected by applying a second (or higher) order differential filter to the pipe temperature indicators of the monitoring period and determining that a peak is present if the output of the filter does exceeds a threshold.

For a different validity check, the processor may be configured to determine that a low flow test is invalid when an average gradient of said temperature difference indicators across the monitoring period indicates divergence of the ambient and pipe temperatures and exceeds a threshold gradient, the processor configured to, if the validity check indicates invalidity, inhibit output of a said leak signal indicating a low flow. This may be referred to as an approach check.

Another validity check may determine that a low flow test is invalid if the stored ambient and pipe temperature indicators of the monitoring period cross, the processor configured to, if the validity check indicates invalidity, inhibit output of a said leak signal indicating a low flow. This may be referred to as a crossing check. A crossing of the temperature indicators may be detected by looking for substantially equal pipe and ambient temperatures in any temperature indicator pair sample, and/or for where a sign (+/−) of the differences between the ambient and pipe temperatures changes between consecutive samples.

A validity check may be performed to determine that a low flow test is invalid if, in an end subset of the ambient and pipe temperature indicators of the monitoring period (e.g. including final generally consecutive indicators/pair samples), at least one of i) and ii) is detected: i) an average gradient of said absolute differences across the end subset is outside a predetermined range; and ii) an average gradient of the stored pipe temperatures across the end subset is outside a predetermined range, the processor configured to, if the validity check indicates invalidity, inhibit output of a said leak signal indicating a low flow. This may be referred to as an end check. (A further criteria may be that iii) a peak/dip (generally represents any transient usage) of pipe temperature indicators is present in the end subset. An end check may also require that ambient temperature has been stable in a predetermined time interval covering such a detected usage.

More generally, the processor may be configured to detect a transient usage (e.g., tap event) by detecting a peak of pipe temperature indicators received from the pipe temperature sensor after the low flow test has been performed, the apparatus configured to inhibit output of a leak signal indicating a low flow until a said transient usage is detected. In this regard, any peak mentioned herein may be absolute, e.g., positive- or negative-going, i.e., a 'peak' may be a dip or trough. Any such peak may be detected as a high rate of curvature point in the pipe temperature, e.g. by applying a second order differential filter and determining if the output exceeds a threshold.

After the low flow test has detected a low flow and no said validity check has determined invalidity of the low flow test, and while a said leak signal indicating the detected low flow has not been output, an embodiment may monitor further said temperature difference indicators and prevent the outputting of the leak signal indicating the detected low flow if a said further temperature difference is less than the difference threshold. This may be referred to as at least a part of a post-monitoring period check.

Similarly, after the low flow test has detected a low flow and no said validity check has determined invalidity of the low flow test, and while a said leak signal indicating the detected low flow has not been output, the embodiment may monitor further said temperature difference indicators and prevent the outputting of the leak signal indicating the detected low flow if an average gradient of at least a subset of absolute said further temperature differences is outside a predetermined range. This may also be referred to as at least a part of a post-monitoring period check.

There may be provided the fluid flow detection apparatus wherein, if a said low flow test detects low flow and no result of a said validity check indicates invalidity of the low flow test, increment a consecutive leak counter, the processor further configured to reset the consecutive leak counter, e.g. to zero, if a said low flow test detects no flow, wherein the apparatus is configured to output a said leak signal indicating low flow when the counter indicates more than a threshold number of consecutive leak detections.

The apparatus may be configured to perform at least one said low flow test during a respective said monitoring period, wherein the or each said monitoring period is an expected low usage time of a respective 24 hour interval. The time is preferably during night at a location of the pipe, e.g., after 12 pm or 1 pm and before 4 am or 5 am. The respective intervals may mean a low flow test is carried out on each one of a predetermined number (e.g. 3) of consecutive days. The processor may not know the actual day, date and/or time. The apparatus may identify a suitable monitoring period by detecting a period of suitable length where previously no changes in the pipe temperature have indicated that there may be other water usage.

The processor may be configured to output a signal indicating a worsening leak, if temperature difference values of consecutive said monitoring periods are increasing, wherein each said temperature difference value is based on at least a last said temperature difference indicator (e.g. an average of preferably consecutive last temperature difference indicators) of a respective monitoring period.

The apparatus may be configured to determine the difference threshold based on at least one of: at least one environmental condition of a geographical region (e.g. country, county or city) comprising the pipe system and/or remote processing system.) comprising the pipe system, the at least one environmental condition comprising at least one of a ground temperature and an air temperature; time of year; which floor of a building has the pipe; geographical location of the pipe system. The determination may be done at a remote hub and/or at a device local to the pipe. The information for determining the difference threshold may be received and/or detected at a remote hub or other part of the processor, and may be updated preferably in real time.

Regarding the floor of the building, this information may be advantageous, bearing in mind that water generally comes out of the ground cold and may warm on the way up to e.g. a flat on a 4-6th floor. Warming is generally due to convective flow in a large diameter pipe extending between/across floors. This may affect the average difference between Ta and Tp at a location of the pipe temperature sensor on any non-ground floor level. Therefore, it may be advantageous that the processor, in relation to any average difference between Ta and Tp that is used in a leak detection algorithm, sets the average difference to be smaller for higher floors, e.g., the average difference has a component that is inversely proportional to the floor number. The geographical location of the pipe system may affect an expected ambient and/or ground temperature.

There may further be provided the fluid flow detection apparatus, wherein the processor comprises a processor part (e.g. ECU, sub-system) local to the pipe and a processing part remote (e.g. remote station or unit, and/or central hub) from the pipe and configured to receive temperature data from the local processor part, wherein said temperature data indicates at least a said temperature difference of the monitoring period, wherein the remote processor part is configured to perform said determination that a low flow is present based on the difference threshold and said received temperature data. The raw temperature data may comprise unprocessed and/or averaged stored ambient and/or pipe temperature indicators of the monitoring period, the (preferably absolute) temperature difference indicators, a last such temperature difference indicator of the monitoring period, and/or at least one Tp and/or Ta value(s) at the last detected transient usage. The remote processing part may then effectively control the sensitivity of the fluid flow detection apparatus.

In an embodiment of the fluid flow detection apparatus, the processor may be configured to determine a value of a parameter that is proportional to a (preferably absolute) ratio of a difference between stored first and second temperature indicators and a difference between a stored ambient temperature indicator and a water temperature, wherein the processor is configured to determine the water temperature based on the estimated water temperature profile, wherein the first and second temperature indicators (preferably corresponding, i.e., a pair received for substantially the same instant of time) and water temperature indicate substantially coincident temperatures; the processor configured to determine a said approach of the pipe temperature toward the estimated water temperature profile when a said determined parameter value (preferably for a time since a last detected transient usage) exceeds a threshold. The parameter may be referred to as a Q measure. The threshold may be, e.g., substantially 0.6, 0.75, or 0.9. The stored temperatures indicators may be those of a second monitoring period as referred to above, and may be stored in one or more corresponding buffers.

In some circumstances, if no water usage is detected for an extended period of time, the water temperature estimate may become out of date so that will recalibration may be desirable after water usage next occurs. This may be enabled by detection of transient usage(s) as described above, e.g., using a differential filter.

The processor may be configured to determine a said determined parameter value based on each of the stored pipe temperature indicators and to determine a said approach of the pipe temperature toward the estimated water temperature profile when all of the determined parameter values exceed the threshold.

A further development may be advantageous in respect of how long property has been empty before a high flow alert should be sent.

The processor may be configured to determine a said determined parameter value based on each of the stored pipe temperature indicators, the processor is configured to detect a water usage (e.g., transient usage such as a tap on event) and to determine a duration of a said high flow, the processor configured to perform a said water usage detection by detecting (for example by detecting curvature as described above, e.g. using a differential filter) a peak of pipe temperature indicators received from the pipe temperature sensor (it may also be required that such a peak occurs when ambient temperature is stable); a timer to measure a time from a last detected said water usage, wherein the timer is configured to reset (e.g. to zero) in response to a next detected said water usage; and a timer to measure how duration of a said detected high flow by timing how long: maximum deviation of the pipe temperatures (preferably currently incoming and/or stored Tp indicators) from the estimate water profile remains within a predetermined range; current said parameter values of the pipe temperatures remain above a threshold value; and the pipe temperature remains smooth, wherein the processor is configured to, when the measured duration of the detected high flow exceeds a defined period (as for other predetermined/predefined periods/intervals/durations described herein, non-zero), indicate a type of high flow if the measured time since the last detected water usage is greater than a predefined time duration. The predetermined range is greater than zero and may extend either or both sides (+/−) relative to the profile. A current parameter value may be based on a most recent Tp indicator. The smoothness, as described above, may be determined when there is no peak, e.g., detected curvature above threshold, preferably based on a second differential filter.

The processor may be configured to detect a transient usage (e.g., tap on event) by detecting a peak of the stored pipe temperature indicators, and to inhibit a said leak signal indicating a high flow if, based on the stored indicators, the ambient and pipe temperatures crossed after a last detected said transient usage. Thus, a high flow may not be indicated if the pipe and air temperatures have crossed since the last time it was detected that a tap was switched on. The peak detection may, as described above, be based on curvature, e.g., using a differential filter. As further described above, a crossing may be detected when substantially equal corresponding Tp and Ta values, and/or a change in sign (+/−) of consecutive differences between ambient and pipe temperatures, are detected.

There may further be provided the fluid flow detection apparatus, wherein the processor is configured to detect a transient usage by detecting a peak of the stored pipe temperature indicators, and to inhibit a said leak signal indicating a high flow if more than a predetermined number (one or more, or a percentage such as substantially 5 or 10%) of said detected peaks comprise a crossing (detectable in an embodiment as substantially equal corresponding Tp and Ta values and/or a change of sign of consecutive differences—see above) of the stored ambient and pipe temperatures. Thus, a high flow may not be indicated if a number or percentage of tap events that have resulted in a crossing is too large.

The processor may be configured to inhibit a said leak signal indicating a high flow if, based on the stored indicators, a minimum absolute difference between corresponding (i.e., relating to substantially the same instant of time; the time preferably since a last detected transient usage) stored first and second temperature indicators is less than a threshold, e.g., e.g., 0.2 deg C. (as for other thresholds mentioned herein, the threshold is preferably non-zero). Thus, a high flow may not be indicated if a minimum absolute difference between Ta and Tp over the subject stored temperature indicators (preferably in buffer(s)) is greater than, e.g., 0.2. This may prevent triggering leak detection output if the temperature difference is less than a defined leak threshold.

The processor may be configured to inhibit a said leak signal indicating a high flow if an average gradient of the stored pipe temperatures (preferably relating to times since a last detected transient usage) is outside a predetermined range. Thus, a high flow may not be indicated if the pipe temperature over the subject stored pipe temperature indicators is not relatively flat, for example as measured by a straight line fitted to data in a buffer.

The processor may be configured to inhibit a said leak signal indicating a high flow if at least one of: at least one residual of the stored pipe temperatures relative to a straight line fit to the stored pipe temperatures exceeds a threshold; and a mean square said residual exceeds a threshold. This may be a pipe temperature stability test.

The processor may be configured to detect a transient usage by detecting a peak (detectable as defined above for example using a differential filter) of the stored pipe temperature indicators, and configured to inhibit a said leak signal indicating a high flow if a transient usage has been detected based on the stored temperature indicators and/or within a predetermined period of time. Thus, a high flow may not be indicated if there tap on events, or other water usage events, have been detected in the subject stored pipe temperature indicators, e.g., in a corresponding buffer.

There may further be provided the fluid flow detection apparatus claim, wherein the processor is configured to detect a transient usage by detecting a peak (detectable as defined above for example using a differential filter) of the stored pipe temperature indicators, and to perform a validity check to determine that the high flow test is invalid if, based on the stored pipe temperature indicators, a difference between a minimum and a maximum pipe temperature since a last detected said transient usage is greater than a threshold difference, the processor configured to, if the validity check indicates invalidity, inhibit output of a said leak signal indicating a high flow. This may be referred to as at least a part of a false alarm rejection test. The inhibition may prevent outputting of a leak signal based on test that has been, or is being performed, or prevent performance of such a test.

Similarly, the processor may be configured to perform a validity check to determine that the high flow test is invalid when, based on an average gradient of the stored ambient temperature indicators, a projected ambient temperature profile intersects the estimated water temperature profile, the processor configured to, if the validity check indicates invalidity, inhibit output of a said leak signal indicating a high flow. This may be referred to as at least a part of a false alarm rejection test. The inhibition may prevent outputting of a leak signal based on a completed or ongoing high flow test, or prevent performance of such a test.

According to another aspect of the present invention, there is provided a fluid flow detection apparatus, the apparatus for detecting a water leak in a pipe system of a building, the apparatus configured to perform a test to detect a said leak and to output a leak signal indicating a result of the test, wherein the apparatus has: a first temperature sensor to detect ambient temperature; a second temperature sensor to detect pipe temperature, the second temperature sensor adjacent or in thermal contact with a pipe of the pipe system; and at least one input line, configured to store a time series of ambient temperature indicators from the first temperature sensor and a time series of pipe temperature indicators from the second temperature sensor, wherein the processor is configured to detect a potential transient usage when: rate of curvature of the stored pipe temperature indicators exceeds a threshold (this may be detected by peak detection as described above); and ambient temperature variation is smooth throughout a time duration (of preferably predetermined length) comprising the exceeding rate of curvature, and wherein: the apparatus is configured to inhibit performance of a said test until a predetermined number (as for any predetermined number herein, preferably non-zero; e.g., 3) of said potential transient usages has been detected. This may effectively perform a pipe fit check that determines that a device comprising at least the pipe temperature sensor is not correctly fitted to a pipe (preferably a mains water supply pipe) until it has seen a predetermined number of a potential transient usages. Such an apparatus may prevent outputting of a leak signal based on a completed or ongoing leak (low and/or high flow) test, or prevent performance of such a test, until a correct fit is detected. The smoothness may be detected based on curvature of the ambient temperature indicators being less than a threshold, a gradient of temperature indicator values within a predetermined range and/or variation of such indicator values less than a threshold, more preferably however at least based on residuals as described above. The detection that ambient temperature variation is smooth may perform the Ta smoothness and/or stability check as described above. Moreover, the fluid flow detection apparatus is preferably further as described above in relation to any preceding aspect(s) of the invention.

The processor may further be configured to indicate that a whole or part of the apparatus comprising at least the second temperature sensor is not fitted to the pipe, until the predetermined number of said potential transient usages has been detected.

According to another aspect of the present invention, there is provided a fluid flow detection apparatus for detecting a water leak in a pipe system of a building, the apparatus may be configured to perform a test to detect a said leak and to output a leak signal indicating a result of the test, wherein the apparatus has: a first temperature sensor to detect ambient temperature; a second temperature sensor to detect pipe temperature, the second temperature sensor adjacent or in thermal contact with a pipe of the pipe system; and at least one input line, configured to store a time series of ambient temperature indicators from the first temperature sensor and a time series of pipe temperature indicators from the second temperature sensor, wherein the processor is configured to indicate that a whole or part of the apparatus comprising at least the second temperature sensor is not fitted to the pipe when: an offset (preferably consistent and/or average) between the stored ambient and pipe temperature indicators is detected, wherein the offset is one of a time and a phase offset. This may similarly effectively perform a pipe fit check. Such a fluid flow detection apparatus is preferably further as described above in relation to any preceding aspect(s) of the invention.

The fit indication preferably indicates that the apparatus part is fitted to a water filled pipe as the additional thermal mass of the pipe may induce a phase lag in the measured pipe temperature relative to when the sensor is in free air. Additionally, there may be provision where the usage patterns over a series of days, such as the time and/or frequency of flow detections, is compared to a typical usage pattern for a property. This may then be used to indicate that the sensor is connected to a pipe supplying the entire property as opposed to another type of pipe such as an appliance (e.g. dishwasher, washing machine or basin) inlet or outlet pipe which would generally show substantially less frequent water usage than the pipe supplying the entire building.

According to another aspect of the present invention, there is provided a fluid flow detection apparatus for detecting a water leak in a pipe system of a building, the apparatus configured to perform a flow test and to output a signal indicating a result of the flow test, wherein the apparatus has: a first temperature sensor to detect ambient temperature; a second temperature sensor to detect pipe temperature, the second temperature sensor adjacent or in thermal contact with a pipe of the pipe system; at least one input line, configured to store a time series of ambient temperature indicators from the first temperature sensor and a time series of pipe temperature indicators from the second temperature sensor; and a processor configured to perform said flow test, wherein the flow test comprises determining a flow rate and a confidence level associated with the flow rate, based on at least one of: a difference at a start of a monitoring period, the difference between a said stored ambient temperature indicator and a said stored pipe temperature indicator; a difference between said start stored pipe temperature indicator and a said stored pipe temperature indicator at the end of the monitoring period; a difference between the said start stored ambient temperature indicator and a said stored ambient temperature at the end of the monitoring period; a difference between said end stored ambient temperature indicator and said end stored pipe temperature indicator; a (preferably absolute) difference between said end stored ambient temperature indicator and an average of an end subset of said stored ambient temperature indicators; an indicator of average gradient of an end subset of said stored pipe temperature indicators, wherein the apparatus is configured to determine the result of the flow test dependent on the determined flow rate and a confidence level. The average gradient indicator may be based on a straight line fit. The average gradient indicator may for example represent a (preferably absolute) difference between the end stored pipe temperature indicator and an average of an end subset of said stored pipe temperature indicators. Such a fluid flow detection apparatus is preferably further as described above in relation to any preceding aspect(s) of the invention. The differences and indicators may relate to tAirStart, tAirEnd, tPipeStart, tPipeEnd, tAirMid, tPipeMid as referred to in the detailed description.

There may further be provided the apparatus configured to output a said leak signal based on a result of at least one said test and a flow classification determined since the result, wherein the processor is configured to determine the flow classification based on time series of pairs of a said determined flow rate and a said determined confidence level, the pairs preferably being of consecutive said monitoring periods of respective e.g. 2.7 hours with no other water usage, wherein the flow classification is selected from any one or more of: intermittent leak; borderline leak; consistent leak; and no leak, wherein the apparatus is configured to determine the result of the flow test dependent on the determined flow classification. Such a flow classification may be used to provide a supplementary test for confirmation after a leak is detected and before the leak signal is output. The determination of flow classification may be based a pattern of the pairs. The consecutive monitoring periods may be for each period of no e.g. 2.7 hours with no other water usage and each occur preferably at night.

In such an embodiment, the processor may be configured to indicate that flow is indeterminate (this may be a "can't test" classification), if the stored ambient temperature indicators are not stable and/or not smooth and at least one of: a maximum amplitude variation (e.g., such variation between maximum and minimum indicators across the monitoring period) of the stored ambient temperature indicators of the monitoring period exceeds a threshold; and a frequency of such variation of the stored ambient temperature indicators of the monitoring period exceeds a threshold frequency.

According to another aspect of the present invention, there is provided a fluid flow detection apparatus for detecting a water leak in a pipe system of a building fluid flow detection apparatus for detecting a water leak in a pipe system of a building, the apparatus configured to perform a flow test and to output a signal indicating a result of the flow test, wherein the apparatus has: a first temperature sensor to detect ambient temperature; a second temperature sensor to detect pipe temperature, the second temperature sensor adjacent or in thermal contact with a pipe of the pipe system; at least one input line, configured to store a time series of ambient temperature indicators from the first temperature sensor and a time series of pipe temperature indicators from the second temperature sensor; and a processor configured to perform said flow test, wherein the processor is configured to record time indications of respective sharp changes in the pipe temperatures; wherein the processor is configured to perform, based on a comparing the recorded time indications to an expected pattern on time indications, at least one of: indicate that a whole or part of the apparatus comprising at least the second temperature sensor is not fitted to a mains water supply pipe; and indicate occupancy of the building. Such a fluid flow detection apparatus is preferably further as described above in relation to any preceding aspect(s) of the invention. Such an embodiment may exploit usage data. A sharp change of stored pipe temperatures may be a peak/dip, and/or represent a transient usage, detectable as described above, and/or at least have a higher than threshold gradient or curvature. The expected pattern may be determined or selected based on a known number of people occupying the building. Additionally or alternatively, the expected pattern may be based on patterns of time indications recorded at one or more similar buildings (e.g. known to have the same number of occupants and/or in a same geographical region). The occupancy may be binary, e.g., occupied or not, and/or a number of occupants, and preferably further indicate time spans and/or durations when the building is occupied or unoccupied.

According to a yet another aspect of the present invention, there is provided a method for detecting a water leak in a pipe system of a building, the method comprising performing a low flow test and a high flow test and outputting a leak signal indicating one of a high flow, a low flow and no flow based on a result of at least one said test, wherein the method comprises: receiving, and storing, time series of samples of ambient temperature and pipe temperature, wherein each pipe temperature is a temperature of an external surface of a pipe of the pipe system; performing said low flow test by determining that a low flow is present, if absolute values of temperature differences between the ambient and pipe temperatures of respective said samples of a first monitoring period are above a difference threshold; and performing the high flow test by: estimating a temperature profile of water entering the pipe, based on identifying at least one temperature difference maximum of a second monitoring period, wherein each said difference maxima is a maximum temperature difference between said ambient and pipe temperatures of a said stored sample; and determining that a high flow is present by detecting, based on the stored pipe temperatures of the second monitoring period, if the pipe temperature is approaching the estimated water temperature profile. Each such (preferably absolute) maximum may be a transient maximum temperature difference within the second monitoring period.

The receiving may further comprising storing the time series of samples in memory, e.g., buffer(s). Thus, each received sample or received temperature may be referred to as a stored sample or temperature.

It is noted that 'flow' and 'leak' may be used interchangeably in relation to the method, a leak being a specific form of a flow.

The above aspects and optional features generally relate to fluid flow detection apparatuses. However, other aspects may provide corresponding methods to perform the functions of such apparatus.

A processor of an embodiment may comprise a controller which includes a microprocessor, working memory and program memory coupled to one or more of the components of the system. The or each processor may be implemented in any known suitable hardware such as a microprocessor, a Digital Signal Processing (DSP) chip, an Application Specific Integrated Circuit (ASIC), Field Programmable Gate Arrays (FPGAs), etc. The or each processor may include one or more processing cores with each core configured to perform independently. The or each processor may have connectivity to a bus to execute instructions and process information stored in, for example, a memory.

To perform the method functions, embodiments of the invention may further provide processor control code to implement the above-described system and control procedures, for example on an embedded processor. The code may be provided on a carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

BRIEF DESCRIPTION OF THE DRAWINGS

Embodiments of the invention will now be described with reference to the accompanying drawings in which:

FIG. 16 shows Tp, Ta traces including a pipe temperature crossing above air temperature since last tap on;

FIG. 23 shows Ta and Tp traces, wherein pipe temperature crosses above air temperature since a last tap on.

DETAILED DESCRIPTION OF PREFERRED EMBODIMENTS

To understand embodiments, it is useful to note that in a pipe system, if there is no flow of fluid in the pipe system, the temperature of the fluid in the pipe, sufficiently distant from any other sources of heating or cooling, will approach ambient temperature over a period of time. By determining the ambient temperature of air or other medium around the pipe system and the temperature of the fluid in the system, it is possible to determine if fluid is flowing in the pipe system. If the temperature of the fluid in the pipe system is monitored over a period and compared to ambient temperature and the two values approach each other and maintain a predetermined difference or less for a predetermined time, a no flow condition can be determined to exist. If the temperature differences remain outside a predetermined set of parameters, it can be assumed there is a flow in the pipe system.

In such systems there are periods when it can be anticipated there will not be any fluid flow. This lack of flow will provide sufficient time for the fluid temperature to approach close to or converge to the ambient temperature. Such periods can be, for example, overnight or at weekends.

Embodiments of the invention will now be described in more detail with reference to the drawings in which like references refer to like features in the various figures.

Figure 1:
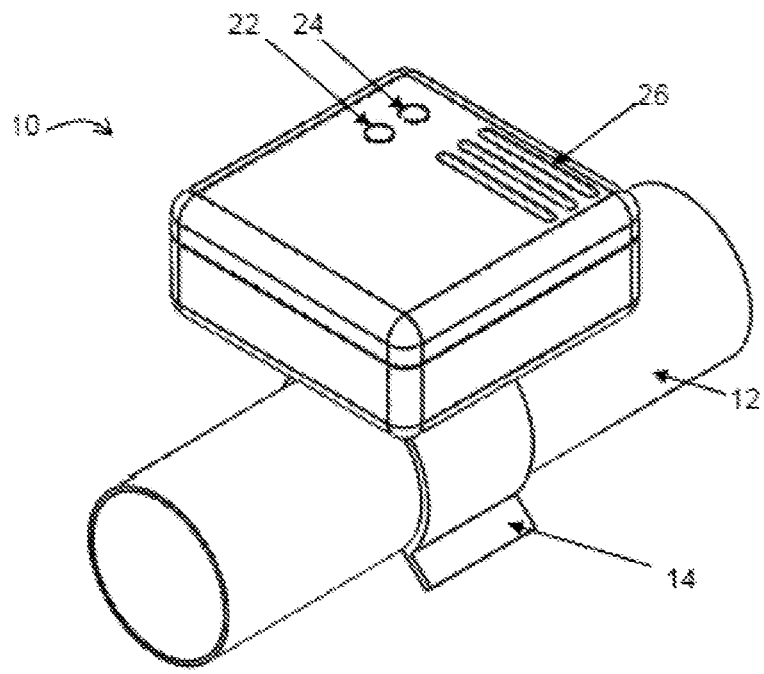
FIG. 1 shows an example of a flow detector device attached to a pipe.

FIG. 1 shows an example of a fluid flow detection device according to an embodiment of the present invention. The device is contained within a housing 10, is attachable to a pipe 12 by means of a biasable pipe clip 14. This particular device is used as a water flow detector for a domestic or office environment. Larger scale devices and housings could be used for a factory, but frequently factories operate for large portions of a day and may not have long enough periods of zero flow for satisfactory operation and require more sophisticated and complex monitoring systems.

Figure 2:
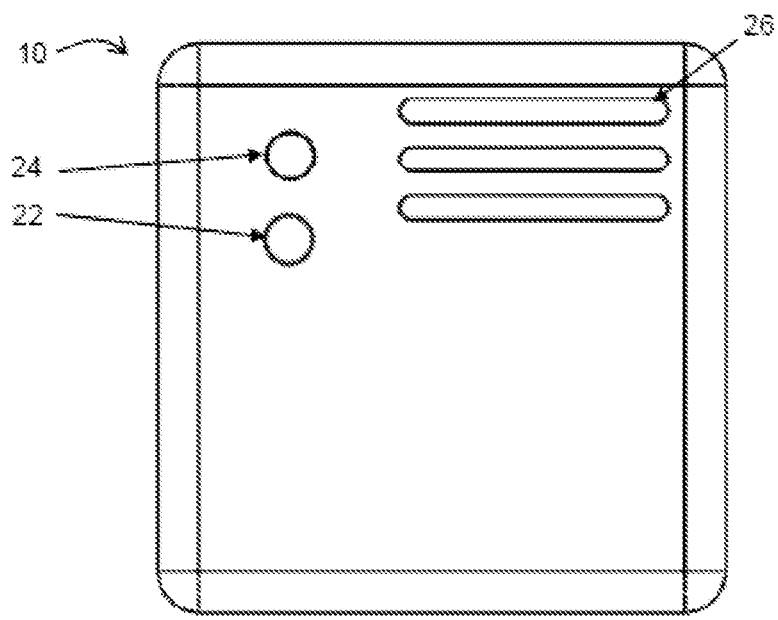
FIG. 2 shows a top view of the detector device.

FIG. 2 shows a top view of the device which may conveniently include indicator or display elements to show the state of operation of the device. These could include a system operation indicator 22 an alarm indicator 24, or a loud speaker 26 from which an audible alarm could be emitted.

Figure 3:
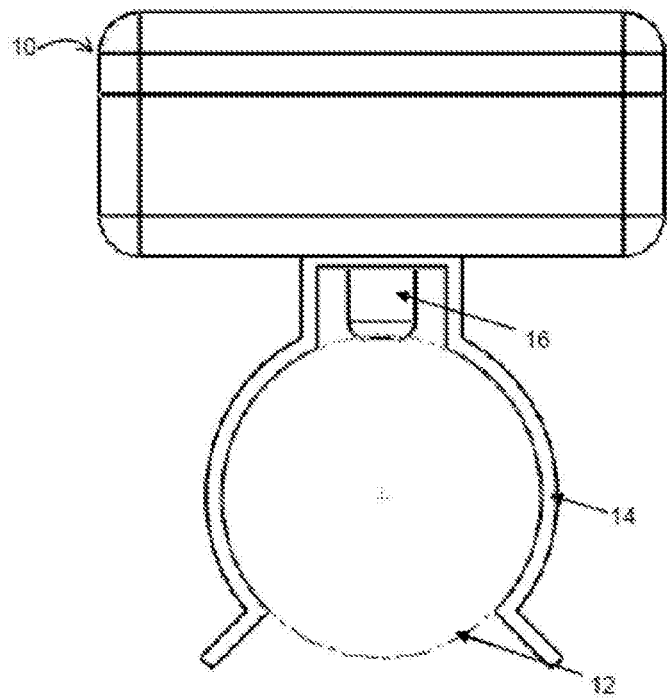
FIG. 3 shows a side elevation indicating how contact may be made with the pipe.

FIG. 3 shows a side elevation of the housing 10 secured to a pipe 12 by connector 14. A temperature sensor 16 extends from the case of the housing and is shown contacting the pipe 12 to determine the outer temperature of the pipe 12.

Figure 4:
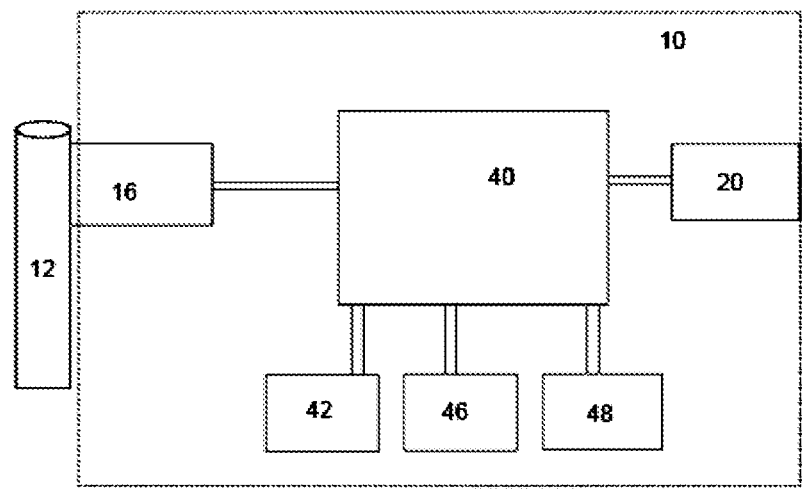
FIG. 4 shows a block diagram of the inter-connection of the components.

FIG. 4 shows a block diagram of the components comprising the device and their inter connections. The housing 10 encloses an electronic control unit (ECU) 40 for monitoring temperatures, time and controlling the device. The ECU may be a whole or part of a processor of an embodiment. The device is powered by a power supply 42, normally comprising one or more batteries. The selection of batteries will be chosen to provide long life in the environment in which the device is installed. Temperature sensor 16 is shown as in contact with pipe 12 to measure the temperature of the pipe. Ambient temperature is measured by temperature sensor 20. An alarm unit 46 can include a visible alarm means, typically an LED, or an audible means or driver therefor. For some applications, a wireless connection 48 will also be provided, so enabling the device to periodically transmit data to a remote station and so send an alarm signal when needed. The wireless connection could also receive information or data from a remote station.

In another example embodiment of the invention, the power could be supplied by a mains network. In a further example, a more sophisticated power supply system is provided in which the power supply comprises a mains power supply connected with one or more batteries.

Suitable temperature sensors are for example (preferably Resol) FKP6 PT1000 temperature sensors or thermistors such as Negative Temperature Coefficient (NTC) thermistors. Other devices which have been found to work well can be found in the class of PT1000 platinum sensors.

Overview of Operation

We firstly consider example startup features of an embodiment of the fluid flow detection apparatus (system or device), which may alternatively be referred to as a fluid flow detector or leak detector. When the batteries are first inserted, the device may check if it has previously been calibrated. If it has not previously calibrated then it enters the calibration state. If it has already calibrated it may jump to waiting to detect a pipe.

When the device enters a calibration state it may wait for stable temperatures on both sensors. It then may take an average of the difference between the two sensors, and store that as a calibration offset applied to all future readings. On completion of calibration, it may generate a status message for example sent to a remote hub or processor unit.

Once calibrated, the device preferably will not attempt to recalibrate itself when the batteries are changed. If the software is reflashed however, recalibration may (or may not) be performed.

Figure 12:
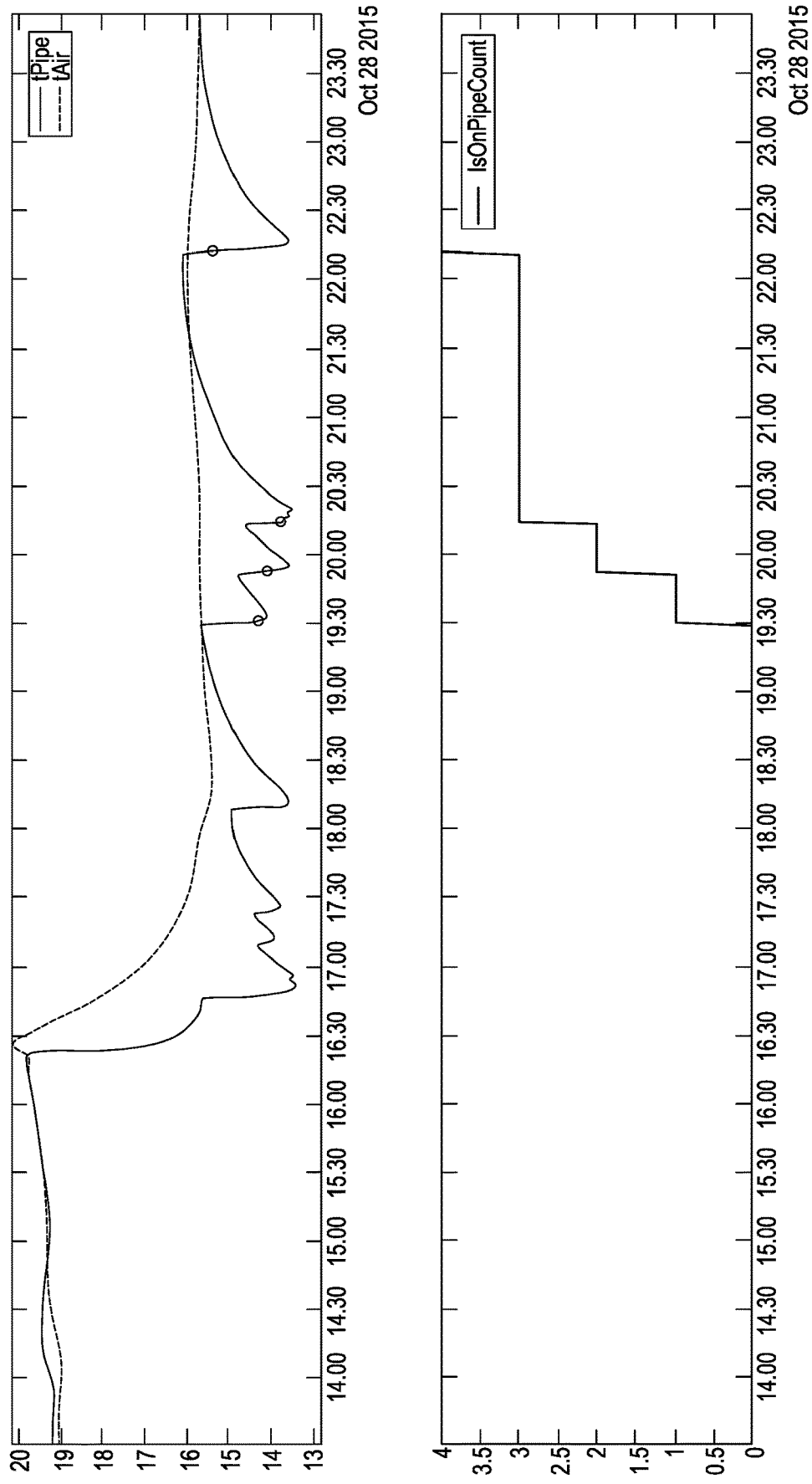
FIG. 12 illustrates 'on pipe' events (circles on the pipe temperature trace of the upper plot also showing the ambient temperature profile) and an 'on pipe' count (low plot).

It is desirable that the device knows when the device (or at least a unit(s) comprising the temperature sensors) has been fitted successfully on a pipe. This may be achieved by counting 'on-pipe events'. These are sharp peaks in the pipe temperature that do not coincide with a sharp peak in air temperature (otherwise a sharp peak in pipe temperature could indicate for example that the detector was being taken out of a box). These are shown by the circles in FIG. 12, which illustrates 'on pipe' events (upper chart) and the 'on pipe' counter (lower). A running count of these events may be kept by the ECU and if the count meets or exceeds a threshold e.g. three, then the device is assumed to be on-pipe. The count may be decremented by 1 every e.g. 28 hours, so if it is handled during shipping or prior to installation, the device is less likely to inadvertently detect it as a pipe fit. Once a successful fit on a pipe is detected, the device will assume it stays on the pipe unless the batteries are removed.

When the startup, calibration and/or pipe fit detect procedures are complete, monitoring for a leak may begin. Once the device has confirmed it is 'On Pipe', it may trigger a Low Flow leak detection algorithm to start, a High Flow leak detection algorithm to start and the data logging to start. It may also trigger a message so that for example a network operator knows that the detector is now fitted to a pipe. The data logging may stop after a predefined period to conserve battery and network costs.

Low Flow Detection

For detecting a low flow or small leak, an embodiment of the fluid flow detection apparatus (preferably operating as in overview above) may record a set number, e.g. 100, of samples of each of the ambient temperature $T_a$ (received or stored in the form of a first or ambient temperature indicator) and pipe temperature $T_p$ (received or stored in the form of a first or ambient temperature indicator) over a monitoring period of generally predetermined duration, e.g. 2.7 hrs. Based on tests, if $T_a$ and $T_p$ are going to converge, they will do so within 2.7 hrs. (N.b. a 'sample' may comprise a corresponding pair of $T_a$, $T_p$ indicators).

The apparatus performs an initial flow determination based on the difference between $T_p$ and $T_a$ (represented by one or more temperature difference indicators) during the monitoring period. However, this initial flow determination may only be performed if the data measured during the monitoring period meets (preferably all) main criteria:

1. $T_a$ is smooth and stable;
2. $T_p$ curvature check passed;
3. Convergence check passed;
4. Crossing check passed; and/or
5. End check passed.

Details of the example procedures or validity checks for checking that such criteria are met are described below.

1. $T_a$ Smoothness and Stability Check

Determine if $T_a$ is smooth and/or stable, based on a comparison of measured $T_a$ values to a straight line fit to $T_a$.

Determine if $T_a$ is stable, for example by ensuring no sharp curvatures are present (e.g. using differential filter as described herein) and/or (more preferably) by ensuring that
an average gradient, e.g., the gradient of the line fitted to $T_a$ over the set number of e.g. 100 samples, is within positive and negative bounds: Agrad−<gradient(Ta)<Agrad+; and
the range of Ta values over the set number of samples is less than a threshold (the range may be a difference between minimum and maximum Ta over the monitoring period).

2. $T_p$ Curvature Check

A second differential filter is applied to the $T_p$ samples to effectively amplify kinks in $T_p$. The apparatus may then look for any peak(s) in the filtered $T_p$ data, which may indicate a flow event such as a tap-on event that may cause the pipe temperature to drop or rise rapidly.

In more detail, performing the $T_p$ curvature check may involve the following.

Convolve the measured $T_p$ values with a (typically U- or V-shaped) filter that has the effect of providing the second differential of $T_p$ (i.e. curvature); this effectively amplifies any kinks in $T_p$. If the modulus of the convolution result has remained below a threshold, this may be taken to mean that no 'tap-on' events have occurred and there has also been no change such as central heating coming on/off that is sufficient to affect leak detection in an embodiment, the value of a Boolean "Ready for leak test" parameter may be set depending on the result of the convolution.

If both of (1) ($T_a$ smoothness and stability check) and (2) ($T_p$ curvature check) hold true continuously throughout the monitoring period based on the set number of e.g. 100 samples, the device may set a parameter "Ready for leak test"=true. Otherwise, the device may discards the current e.g. (100) samples and start measuring a new characteristic/curve (e.g. a new set of 100 samples). In other words, a restart of the e.g. 2.7 hr monitoring period, and thus the recording of a new set of samples, may be triggered at any detected kink(peak) in the $T_p$ (filtered) data.

3. Approach Check

Determine that $T_a$ and $T_p$ are approaching (e.g. converging or tending towards each other) based on an average gradient, e.g., grad($T_p$−$T_a$), relative to a threshold gradient, by:
determine the modulus of ($T_p$−$T_a$)=$dT_{pa}$ across the set number of e.g. 100 samples.
fit a straight line to the $dT_{pa}$ values.
determine the gradient of the straight line fit to $dT_{pa}$, i.e., grad($T_p$−$T_a$)
ensure grad($T_p$−$T_a$) is less than a positive threshold
In other words,
accept negative gradients: $dT_{pa}$ decreasing ($T_p$ and $T_a$ approaching, e.g. converging)
accept zero and small positive gradients: $dT_{pa}$ not changing—substantially flat e.g. $T_p$ and $T_a$ are tracking reject positive gradients above a threshold: $dT_{pa}$ increasing above a threshold rate ($T_p$ and $T_a$ are diverging)

Thus, the approach check is not passed if $T_p$ and $T_a$ diverging.

$T_a$ and $T_p$ may not approach one another because, e.g., the central heating has turned on (off) during the monitoring period so that $T_a$ rises (falls) more quickly than $T_p$, when $T_p$ is below (above) $T_a$ (depending on the ground temperature relative to ambient/room temperature). The ambient temperature may rise (fall) faster than the pipe temperature because the thermal mass of the pipe is greater than the thermal mass of the air.

In an embodiment the approach check must hold true before a leak can be determined. The initial flow determination (below) may then be performed to decide that a leak exists if a difference between $T_a$ and $T_p$ exceeds a threshold. If the difference is due to the heating going on or off, this may not be a leak and so such cases are preferably rejected.

If non-approach (e.g. non-convergence) is detected, this may be used to prevent a low flow leak detection being triggered, i.e., leak detection output based on a low flow test is inhibited.

4. Crossing Check $T_a$ and $T_p$ may cross if, e.g., the central heating turns off during the night and, because the thermal mass of the pipe is greater than the thermal mass of air, the pipe cools more slowly than the ambient/air. The apparatus may look to see if $T_a$ and $T_p$ cross anywhere during the (e.g. 2.7 hr) monitoring period.

If the temperatures have crossed, this may be used to prevent a low flow leak detection (and/or leak signal based thereon) being triggered.

5. End Check

The End check is used to see if something has happened 'at the last minute', i.e., in a final or end subset of samples of the monitoring period (e.g. the last 25 samples of the 100 samples/2.7 hrs), to cause a leak detection based on the current monitoring period to be invalid. The 'something' could be, e.g.:
(a) a tap-on event or other cause of a kink in $T_p$;
(b) $T_a$ starts to diverge from $T_p$ for example due to central heating coming on; and/or
(c) $T_p$ starts diverging from $T_a$.

The End check may specifically involve checking that:
A. the gradient of a line fitted to the temperature difference over e.g. 25 points just prior to the end of the e.g. 100 samples is within positive and negative limits; and/or.
B. the gradient of a line fitted to pipe temperature over the last e.g. 20 samples of the e.g. 100 samples is within positive and negative limits.

For A:
Determine the modulus of $(T_p-T_a)=dT_{pa}$ across the 25 samples.
Fit a straight line to the $dT_{pa}$ values.
Determine the gradient of the straight line fit to $dT_{pa}$, i.e., grad($T_p-T_a$)
Compare grad($T_p-T_a$) to positive and negative bounds, i.e. $\Delta$grad$-$<grad($T_p-T_a$)<$\Delta$grad+. $\Delta$grad$-$ and $\Delta$grad+ are proportional to the last value of $dT_{pa}$ so that larger gradients are accepted if the final value of $dT_{pa}$ is large.

In other words,
reject negative gradients that are steeper than a negative threshold: $dT_{pa}$ decreasing ($T_p$ and $T_a$ may then be approaching, e.g., converging, locally near the end of the 100 samples)
accept zero and small negative and positive gradients: $dT_{pa}$ not changing—substantially flat—$T_p$ and $T_a$ are tracking locally near the end of the 100 samples.
reject positive gradients that are steeper than a positive threshold: $dT_{pa}$ increasing above a rate ($T_p$ and $T_a$ are diverging locally near the end of the 100 samples)

If grad($T_p-T_a$) is not within the limits then this may be used to prevent a leak detection being triggered. This is desirable because this may be caused by an event, e.g., tap on, such that it is not possible to determine with confidence that there is a leak.

For B:
point may be added. During the wait, it may be required that, e.g., two further post-monitoring check(s) are passed otherwise the current leak test is (at least effectively) cancelled or aborted and the wait to take action may be abandoned.

a. At any time during the wait to take action, the final y-value of a line fitted to the temperature difference over e.g. 25 points just prior to the end of the e.g. 100 samples is preferably not less than the difference threshold (see Initial Flow Determination). If it is, the wait to take action is abandoned and the leak test is cancelled/aborted.

b. an average gradient, e.g., the gradient of a line fitted to the (preferably absolute) temperature difference, over the subset of e.g. 25 points just prior to the end of the e.g. 100 samples that were taken before the tap-on (or other transient usage) is preferably still within a predetermine range defined by positive and/or negative limits (i.e. End check A still be valid). If it is not, the leak test is cancelled/aborted.

For a:
Determine the modulus of $(T_p-T_a)=dT_{pa}$ across the e.g. 25 samples.
Fit a straight line to the $dT_{pa}$ values.
Determine the final y-value of the straight line fit to $dT_{pa}$
Compare the final y-value to the difference threshold
This may be used to cancel a leak if the temperature difference is dipping (or about to dip) below the difference threshold (i.e. the pipe and air temperatures are approaching or closing up).

For b:
See End Check A. This may be used to cancel a leak test if $T_p$ and $T_a$ are not tracking locally near the end of the e.g. 100 samples just before the tap-on. This is desirable because otherwise it may be more difficult to determine with confidence that there is a leak.

Action on the Leak

If the leak has not been cancelled, then the apparatus may increment a consecutive leak counter.

Final Flow Determination
Fit a straight line to $T_p$ across the e.g. 25 samples
Determine the gradient of the straight line fit i.e. grad($T_p$)
Compare grad($T_p$) to positive and negative bounds, i.e. $T_p$grad$-$<grad($T_p$)<$T_p$grad+.

In other words,
Reject negative gradients that are steeper than a negative threshold: $T_p$ falling faster than a rate (locally near the end of the e.g. 100 samples)
Reject positive gradients that are steeper than a positive threshold: $T_p$ rising faster than a rate (locally near the end of the e.g. 100 samples)

If grad($T_p$) is not within the limits then this may be used to prevent a leak detection being triggered. This is desirable because this may be caused by an event, e.g., tap on, such that it is not possible to determine with confidence that there is a leak.

Initial Flow Determination

If (preferably all) the main criteria have been met, then the initial flow determination may be performed based on whether the modulus of the temperature difference, i.e., $|T_p-T_a|$ (temperature difference indicator) has been above a difference threshold over the whole of the monitoring period (e.g. 2.7 hrs). If the absolute difference, i.e., $|T_p-T_a|$ has been above a difference threshold over the whole of the e.g. 2.7 hr period then a leak may be flagged.

The apparatus may wait to take action in response to the leak detection until the next tap-on event is detected. It may alert the user to the leak by beeping if it has seen e.g. 3 consecutive leaks. Preferably the alert cannot occur at night, when the user is asleep. Thus, the apparatus may wait for the next tap-on event as a signal that the user is awake. The tap-on event may be detected when the modulus of the pipe temperature curvature (see $T_p$ curvature check) exceeds a threshold. This threshold is larger than the curvature threshold used in the $T_p$ curvature check. The larger threshold allows for the detection of tap-on events. The smaller threshold may be used in the $T_p$ curvature check to exclude both tap-on events and any other pipe temperature fluctuations that mean that conditions are not stable enough to perform a leak test.

Post-Monitoring Period Check

During the wait to take action in response to the leak detection, the e.g. stored 100 samples of each of the ambient temperature $T_a$ and the pipe temperature $T_p$ may continue to be updated with new data. When the oldest value expires, a new data If the apparatus has wireless connectivity, e.g., through Wifi, cellular and/or ultra-narrow band (UNB), then it may send a data message to a central hub, for example when "Ready for leak test" stops being true. The message may comprise:

the last $T_p$, $T_a$ values, i.e, at the end of the e.g. 2.7 hrs monitoring period;

the values of $T_p$ and $T_a$ at the last $T_p$ minimum (i.e., at the last recorded tap-on event); and/or average $T_p$, $T_a$ of the last 25 samples from the end of the 2.7 hrs.

This may mean there is no need to locally set the sensitivity of the apparatus with regard to the local environment, e.g., a hot air temperature and low ground temperature in a certain region of France at any particular time of year. Geographical considerations can be taken into account remotely, by applying a more appropriate difference threshold to give a final flow determination at the remote hub.

If there is no Acknowledgement of such a message, and the e.g. 3 preceding, consecutive monitoring periods all resulted in a leak determination, then the apparatus may issue an audio and/or visual alarm, e.g. beep. This may use the consecutive leak counter to reduce false alarms due to random, non-continuous events such as a dripping tap or toilet. Generally, if the cause of the leak determination is one that merits concern, then it will be there every night, so the apparatus can wait until there is sufficient certainty before e.g. beeping to alert a user.

When the central hub receives the data message, it may analyse the temperature data with regard to:

Time of year;

Floor of building, e.g., $10^{th}$ floor of a block of flats; and/or

Geographical Location.

The hub may then determine an appropriate final difference threshold to apply to the $T_p-T_a$ at the end of the monitoring period (e.g. the 2.7 hr point).

The central hub may also check if the temperature difference values of $T_p-T_a$ at the end (e.g. 2.7 hr) points as received in message(s) from the same fluid flow detection apparatus are increasing and, if so, flag a worsening leak.

Additional or alternative features may be implemented in an embodiment of the fluid flow detection apparatus to detect a low flow or small leak, as may be understood from the following.

A low flow algorithm may attempt to detect low flow leaks such as a dripping tap. It may work on the premise that the temperature of a water pipe should tend to the surrounding air temperature if no water is flowing through it. The algorithm may exploit this idea by determining the difference in pipe and air temperature during quiet periods where no water is being used by a household or building, for example overnight. If no leak is present during a quiet period, the air and pipe temperatures as measured by the temperature sensors (e.g. thermistors) will generally tend to be close together. If, on the other hand, a low flow leak is present during a quiet period, there will generally be a noticeable difference between the air and pipe temperatures.

Figure 13:
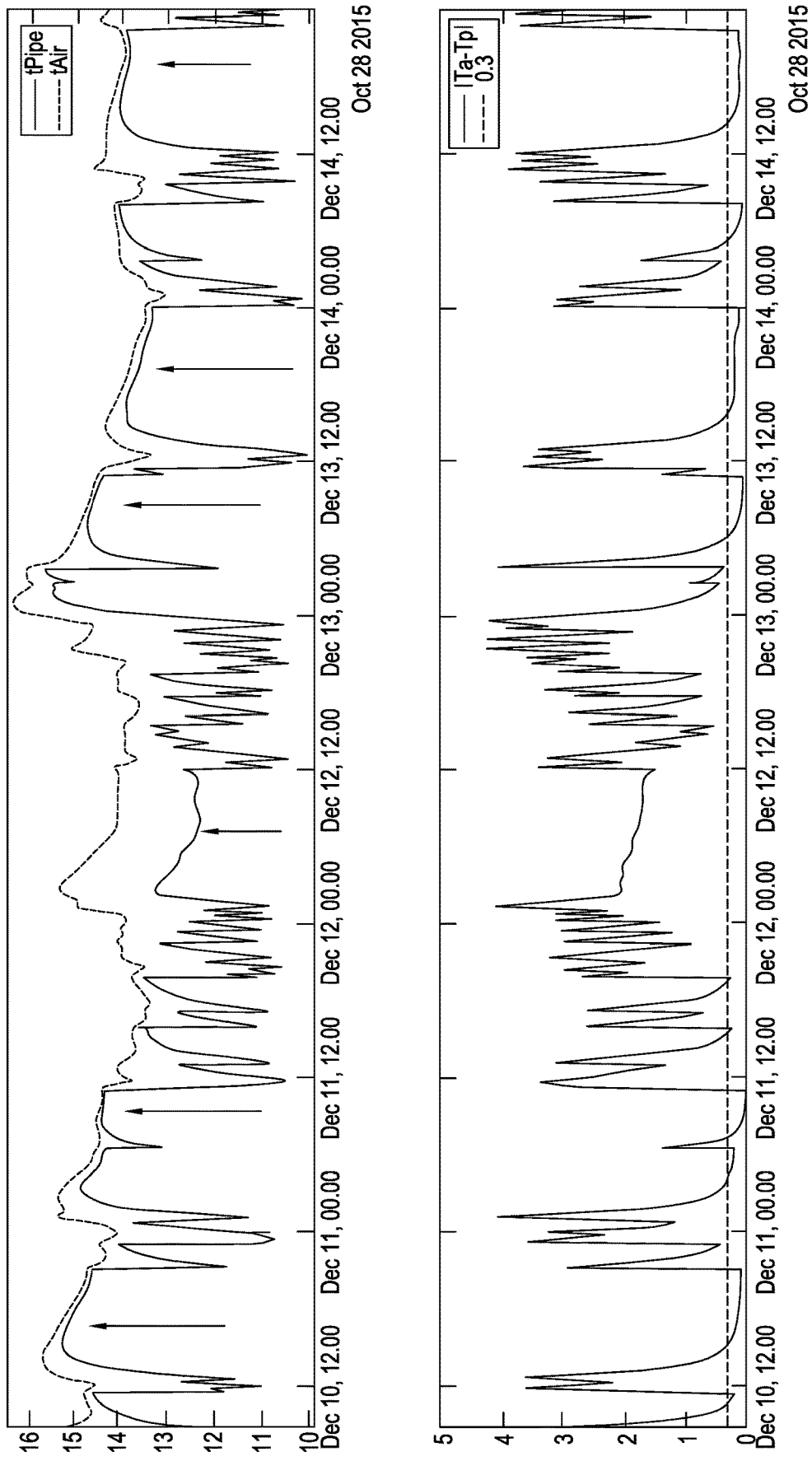
FIG. 13 illustrates pipe and air temperature (top chart) and absolute (modulus of Tp−Ta) temperature difference (lower chart, also have a horizontal dashed line at the y-axis value 0.3).

We refer to FIG. 13, which illustrates pipe and air temperature (top chart) and absolute temperature difference (lower chart). Quiet periods with no leaks ($1^{st}$, $2^{nd}$ and $4^{th}$-$6^{th}$ arrows from left) and with a leak ($3^{rd}$ arrow from left) are shown. During the no leak quiet periods the absolute temperature difference is small. During the leak quiet period the absolute temperature difference is noticeable.

The apparatus sample may the pipe and air temperature every e.g. 100 seconds. The low flow algorithm may diagnose a leak by looking at a window of the sampled data called a buffer. The window that it looks over may be e.g. 101 samples long. So every time that the apparatus samples new data, it may look back over the last e.g. 101 samples and determine firstly if this is a quiet period and, secondly, if it is a quiet period then is there is a leak present. It may do this by performing a number of different tests on the data in the buffer. Example such tests are described later (Quiet period test and Leak Test) after some additional functional definitions.

Sometimes it is possible for a low flow leak to be intermittent. This may occur for example if a tap is not switched off properly periodically. In such a case, the algorithm may detect a leak during one quiet period, that will subsequently resolve itself at the next quiet period. This is not a true leak. Thus, to filter these occurrences out, it is preferred that a leak exists for a threshold number e.g. 3, of consecutive quiet periods before the algorithm confirms a leak and acts on it, for example by generating an audio alarm if the device is not within wireless coverage. A running counter of consecutive leaks may therefore be kept.

Figure 14:
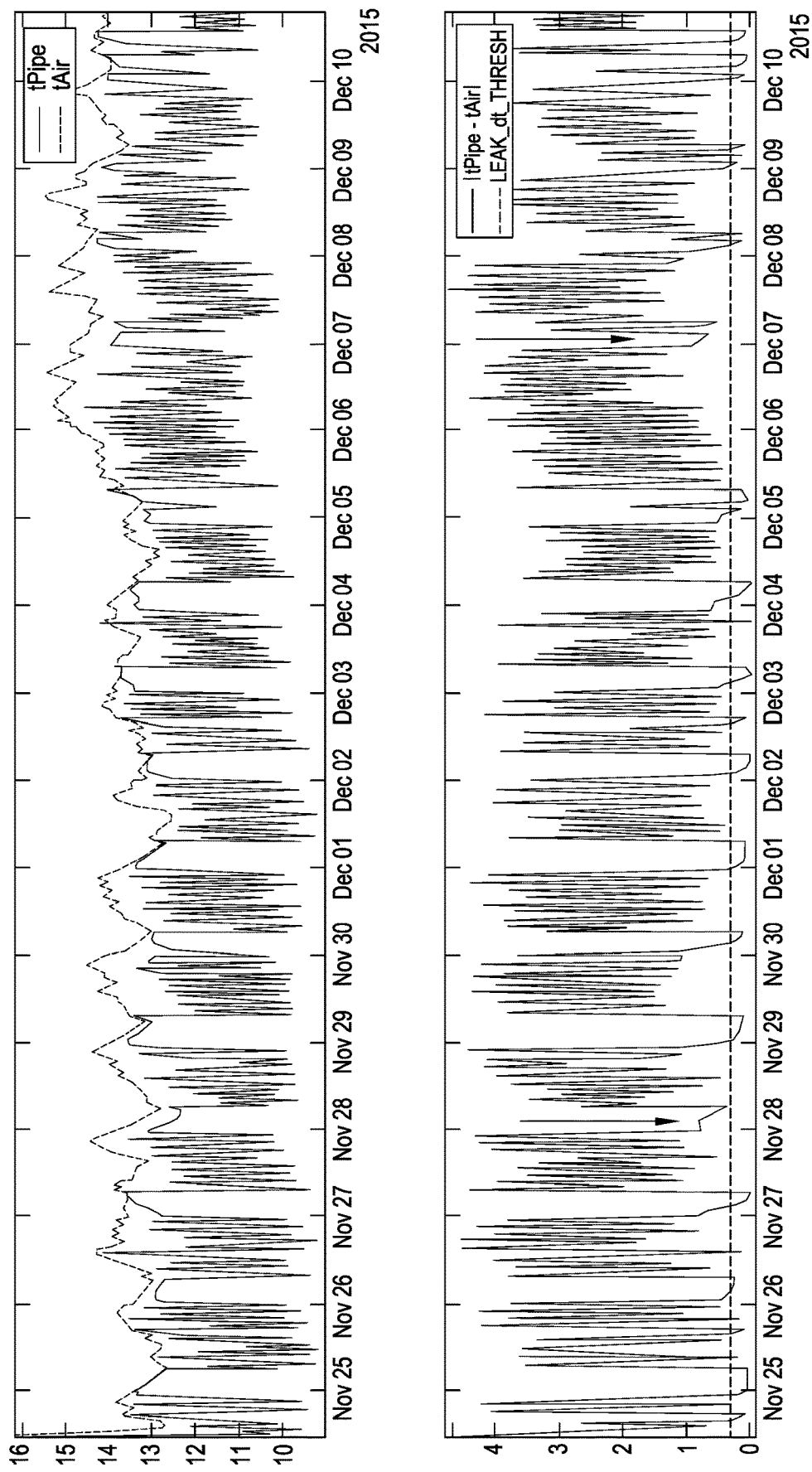
FIG. 14 shows a "leak" during one quiet period that resolves itself at the next quiet period. The upper plot again shows Tp, Ta traces and the lower plot showing the absolute (modulus of Tp−Ta) temperature difference and a dashed line representing a leak detection threshold.

We refer to FIG. 14 which shows a "leak" during one quiet period that resolves itself at the next quiet period. Pipe and air temperature is shown (upper chart), and absolute temperature difference is shown (lower chart). At the arrows the temperature difference during the quiet period is noticeable (indicating a leak), however during the quiet periods thereafter there is no noticeable difference.

Figure 15:
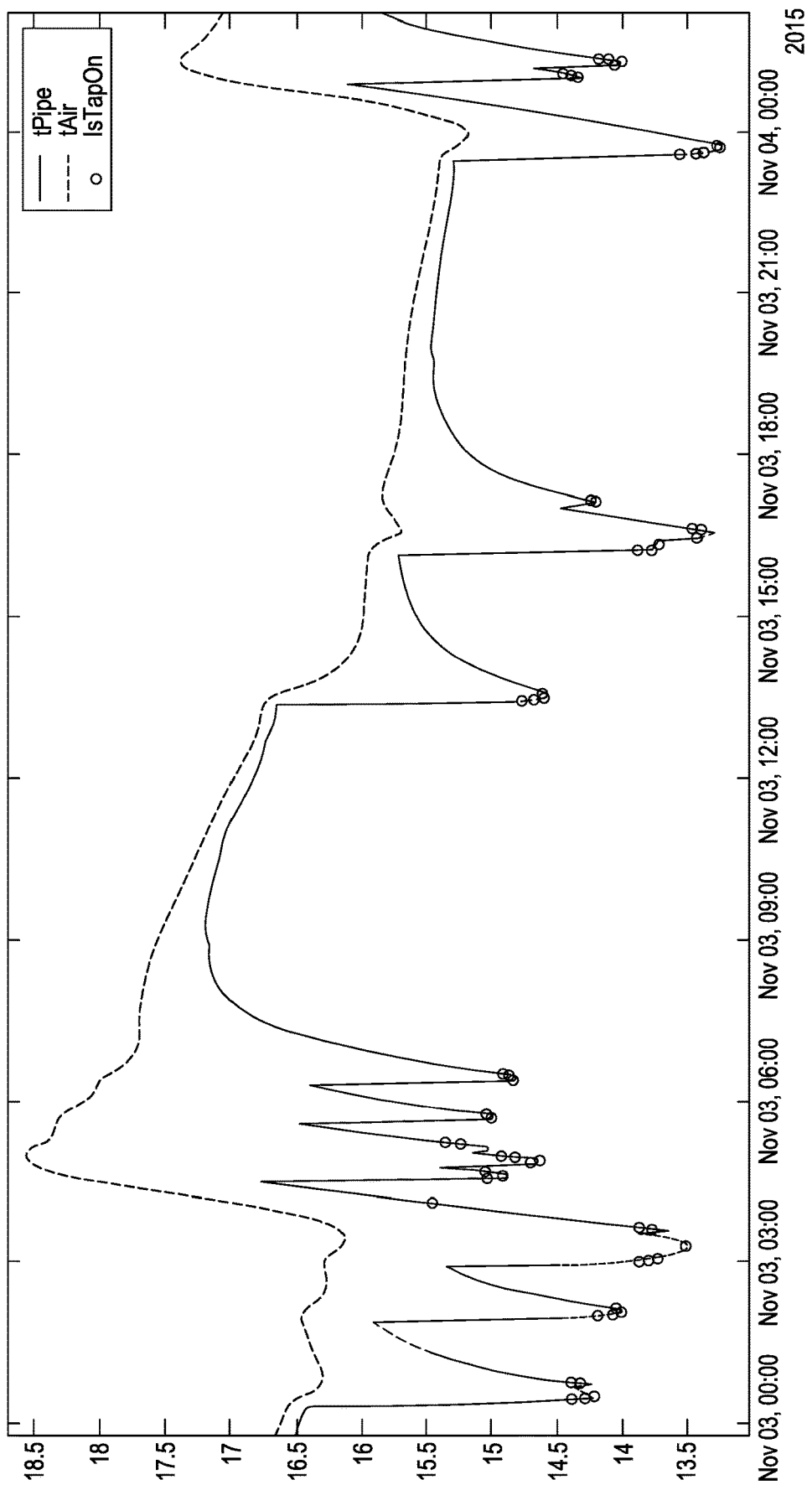
FIG. 15 shows Ta, and 'Tap on' events represented as circles on a Tp trace.

Regarding detecting a tap-on event, the low flow algorithm may rely on the detection of distinct periods of water usage, for example where a tap is switched on and then switched off some minutes later. Such periods are referred to as tap on events. They may be characterised by sharp downward (or upward) spikes in the pipe temperature, shown by the circles in FIG. 15. These tap on events will generally bound a quiet period, and as such may be used to determine the start and end of this interval.

Figure 16:
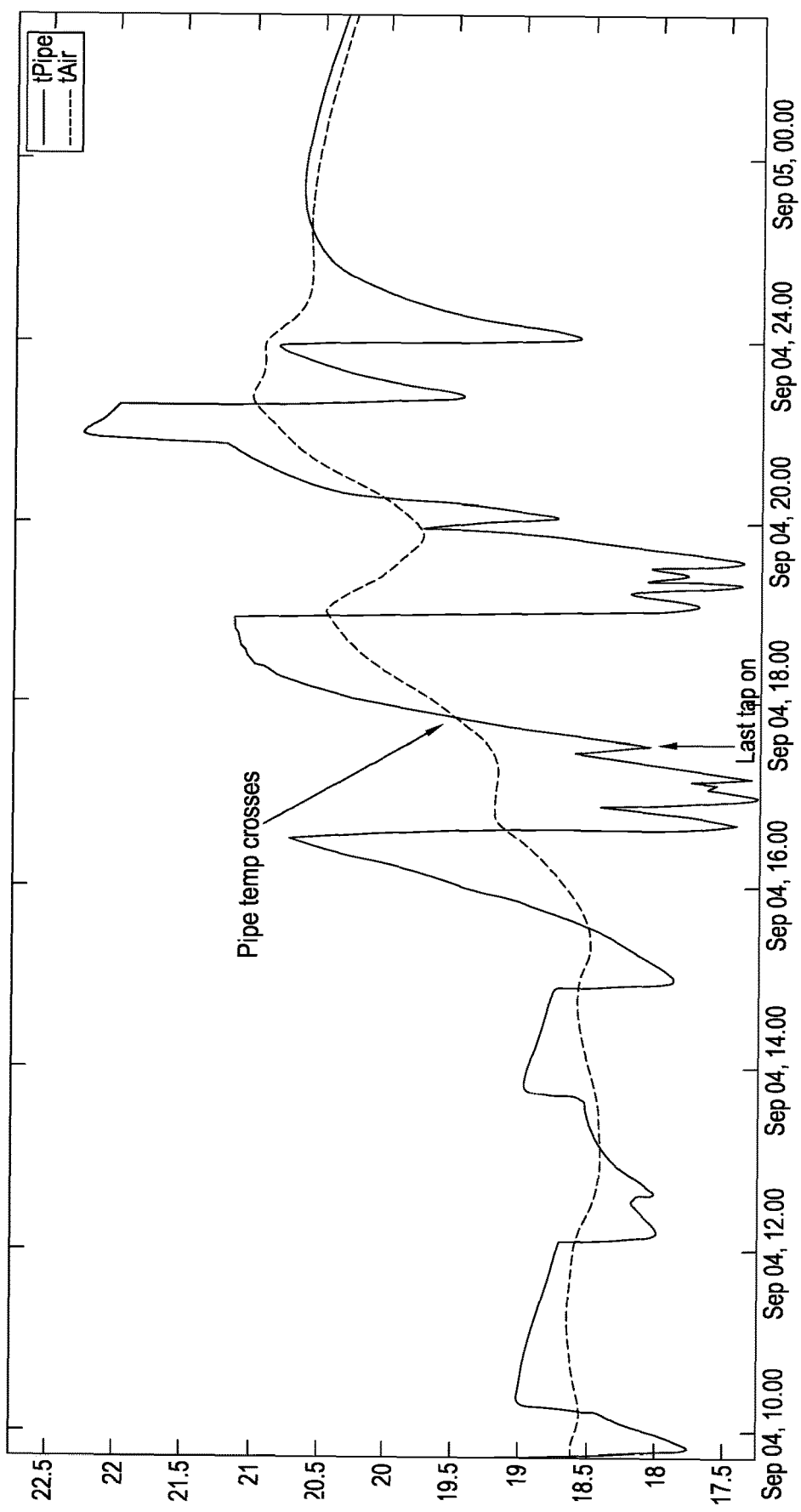

Detecting temperature crossing since last tap on may be advantageous: If the device is fitted next to a hot pipe a phenomenon can occur where the pipe temperature crosses above the air temperature. In such cases the behaviour of the pipe temperature is not typical and may look like a low flow leak when one is not occurring. The algorithm may attempt to ignore cases like these by looking for pipe and air temperature crossings since the last tap on. If it detects a crossing, it may set a temperature-crossing flag to true. We refer to FIG. 16, which shows pipe temperature crossing above air temperature since last tap on.

Detecting too many crossings may be similarly beneficial. If too many temperature crossings occur then it may be that the device is fitted incorrectly, for example it is fitted where the cold pipe is running next to a hot pipe which can cause false alarms such that its data is not to be relied on. The algorithm may therefore determine if the temperatures has crossed by more than certain threshold number since the last alert. If this is true, a crossings-over-threshold flag may be set to true in a next alert message.

Quiet Period Test:

A leak test will generally only be performed during a quiet period, e.g., if the air and pipe temperatures in the buffer meet (preferably all) the following criteria:
(1) the air temperature is stable (i.e. relatively flat);
(2) the pipe temperature does not show any kinks (i.e. no tap on events or other water usage);
(3) there was a sufficient difference in air and pipe temperature at the last tap on event; and/or
(4) the air and pipe temperature values in the buffer are within acceptable (real world) predefined limits.

Leak Test:

A leak may be flagged if preferably all of the following are true:
(1) the monitoring period is in a quiet period;
(2) there is a noticeable difference in air and pipe temperature, e.g. the minimum absolute temperature difference between air and pipe over the buffer is greater than a threshold e.g. 0.3 deg C.;
(3) the temperature difference over the buffer is stable;
(4) the pipe temperature is not approaching, e.g., converging, locally towards the air temperature at the end of the buffer;
(5) pipe temperature is flat over the end of the buffer;
(6) air and pipe temperature have not crossed since the last tap on (the temperature-crossing flag is false).

A low flow leak alert message will be sent, for example as soon as the last quiet period is over (that is, the criteria for the quiet period are no longer met). If no leak has been detected in this quiet period, an unacknowledged low flow alert message may be sent. If on the other hand a leak was detected in this quiet period, an acknowledged low flow alert message may be sent. In either message, the last values of the above-mentioned temperature-crossing flag and/or crossings-over-threshold flag may be sent in the message.

Once a leak is diagnosed, the algorithm may wait to act on it until it detects the first tap on event after the quiet period. If at any time during the wait, the algorithm detects that the temperature difference has dipped below the leak threshold (as preferably measured by the intercept of a line fitted to the temperature difference at the end of the buffer), the leak result of test may be cancelled and the wait abandoned.

If a leak detection result is still pending when a tap on event is detected after the quiet period, the algorithm may attempt to act on it. It may continue to wait however, if a leak has been reported in the last e.g. hour. It may also not act if too many crossings have been detected (the crossings-over-threshold flag is true) or if the device has not yet been detected as being fitted on a pipe.

If a leak has not been reported in the last e.g. 1 hour, there have not been too many crossings and the device is on pipe, then if the pipe temperature was still not tending or converging locally towards the air temperature just before the tap on event, this is treated as a valid leak and the consecutive leak counter may be incremented (in an embodiment, if there has been no acknowledgment from the low flow leak alert message). Otherwise, if the pipe temperature has subsequently started approaching or converging, the leak is cancelled and the counter is not incremented.

The consecutive leak counter may reset, e.g. zeroed, if (preferably all of):
the low flow alert message is acknowledged;
at the end of the quiet period, if the temperatures have crossed or the absolute temperature difference at that point is lower than e.g. 0.3; and/or
a leak test or result is cancelled.

When the consecutive leak counter reaches a threshold count/number e.g. 3, a preferably audible alert may be generated. Such an audible alert may be silenced by pressing a button on the device. When pressed, the alarm may not sound (or otherwise activate) again for e.g. 24 hours. When the consecutive leak counter reaches the threshold count/number it may be decremented by one so that if a leak occurs again the following quiet period the alert will be repeated preferably unless masked by an acknowledged message receipt or e.g. 24 hour silence.

Figure 17:
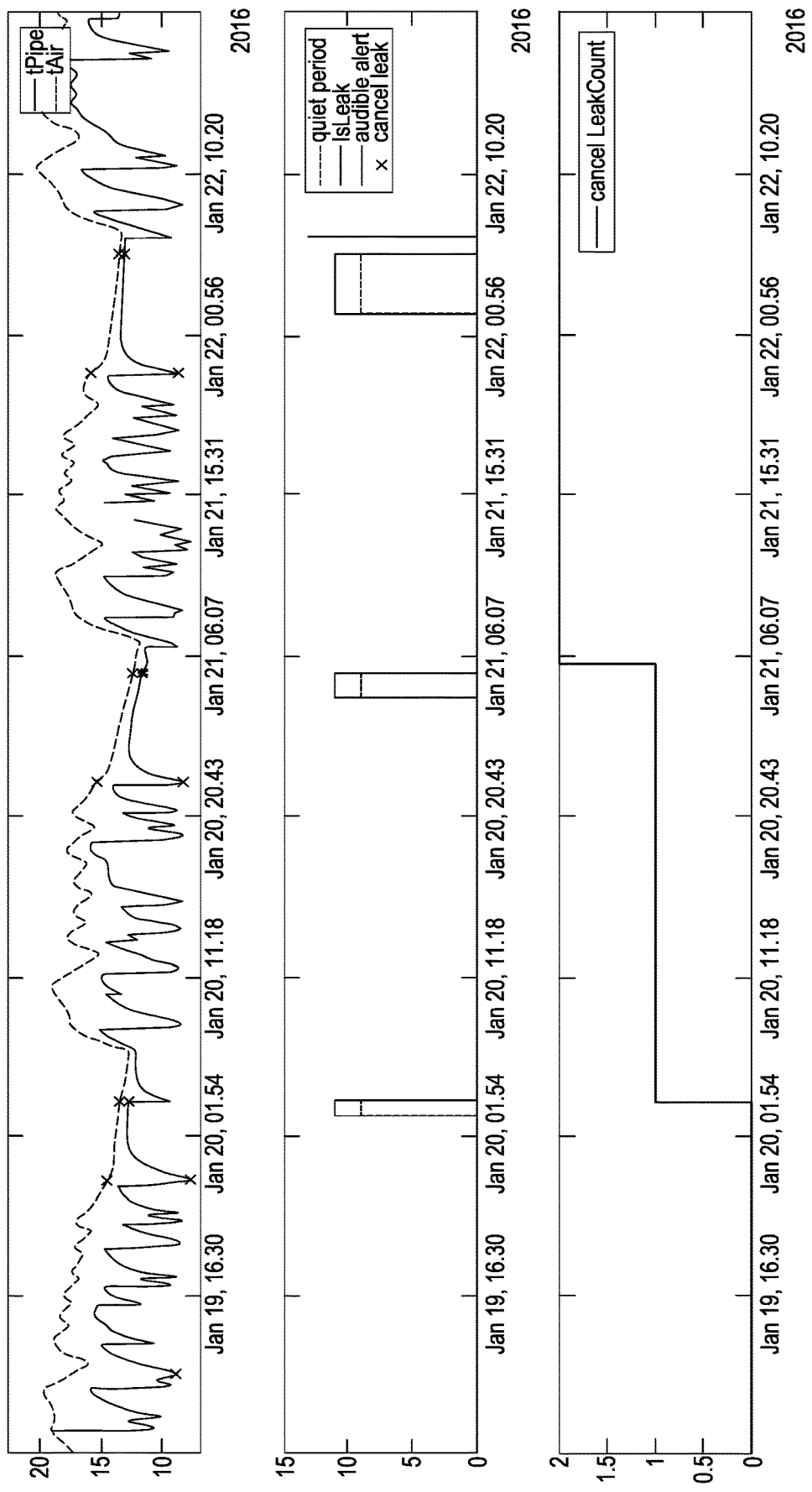
FIG. 17 shows an example of the low flow leak functionality when a leak exists for consecutive quiet periods. The upper subplot shows Tp, Ta traces. The middle subplot indicates quiet period (yellow), leak detection (purple), and instances of an audible alert (brown). The lower subplot shows a consecutive leak count.

FIG. 17 shows an example of the low flow leak functionality when a leak exists for a threshold number of e.g. 3 consecutive quiet periods. The first subplot shows pipe (lower trace) and air (upper trace) temperature with the start and end of quiet periods marked by crosses and stars. The second subplot shows quiet periods (yellow), leaks flagged (purple) and where an audible alert would occur if there was no acknowledgment to any alert messages (brown). The third subplot shows the consecutive leak counter. Once the counter reaches (in this example) 3 at the point where the audible alarm occurs it is immediately decremented and thus appears to remain at 2.

If enabled, the device may send a logging message every e.g. 14 samples (roughly every e.g. 23 minutes). The logging message may contain every alternate sample of the air and pipe temperatures.

The device may also send status, calibration and hardware fault messages.

High Flow Detection

For detecting a high flow (this may be a full flow), an embodiment of a fluid flow detection apparatus may operate for example as described below. The embodiment may further operate as described in overview above, and/or further perform low flow detection as described above.

Figure 18:
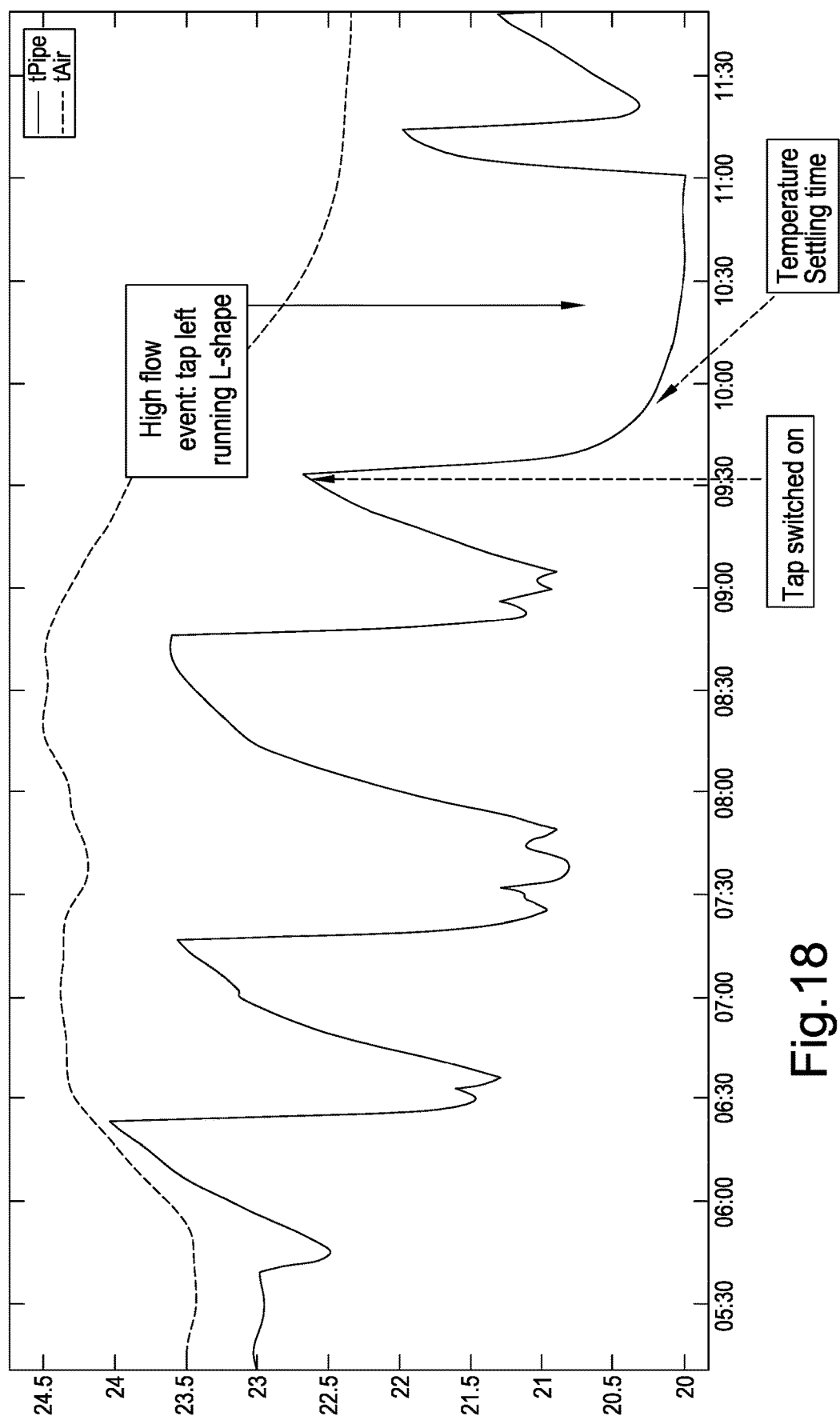
FIG. 18 shows Ta and Tp traces for a high flow event.

The high flow algorithm implemented by the processor, e.g., ECU, may attempt to detect water events such as a burst pipe. A high flow event may be simulated by turning a tap on full bore and leaving the water running. The constantly running water chills the pipe so that a large difference between pipe and air temperature is measured by the temperature sensors (e.g. thermistors). In the example of FIG. 18, a tap was left running for about an hour. The pipe temperature (low, unsteady trace) decreases once the tap has been switched on and then flattens off to a relatively constant value that tends to the temperature of the supply water, forming a characteristic "L-shape".

The processor may sample the pipe and air temperature every e.g. 100 seconds. Advantageously, the high flow algorithm may look for an "L-shape" (similarly as shown in FIG. 18) in this sampled data using a window of samples called a buffer. The window that it looks over may be, e.g., is 13 samples long, corresponding to ≈13*100/60≈22 minutes. So every time that the processor samples new data, it may look back over the last e.g. 13 samples and, based on the shape of the pipe temperature, try to make a decision as to whether or not there is a high flow event occurring. It may do this by performing a number of different tests on the data in the buffer. If all the tests pass, then a high flow leak may be diagnosed. Because the water temperature typically takes 10 minutes to reach a stable temperature (shown as the temperature settling time in FIG. 18), the actual length of the high flow required to trigger the alert may be between 5 and 20 minutes (depending on flow rate, pipe size and temperatures) longer than the time corresponding to the length of the buffer.

Figure 19:
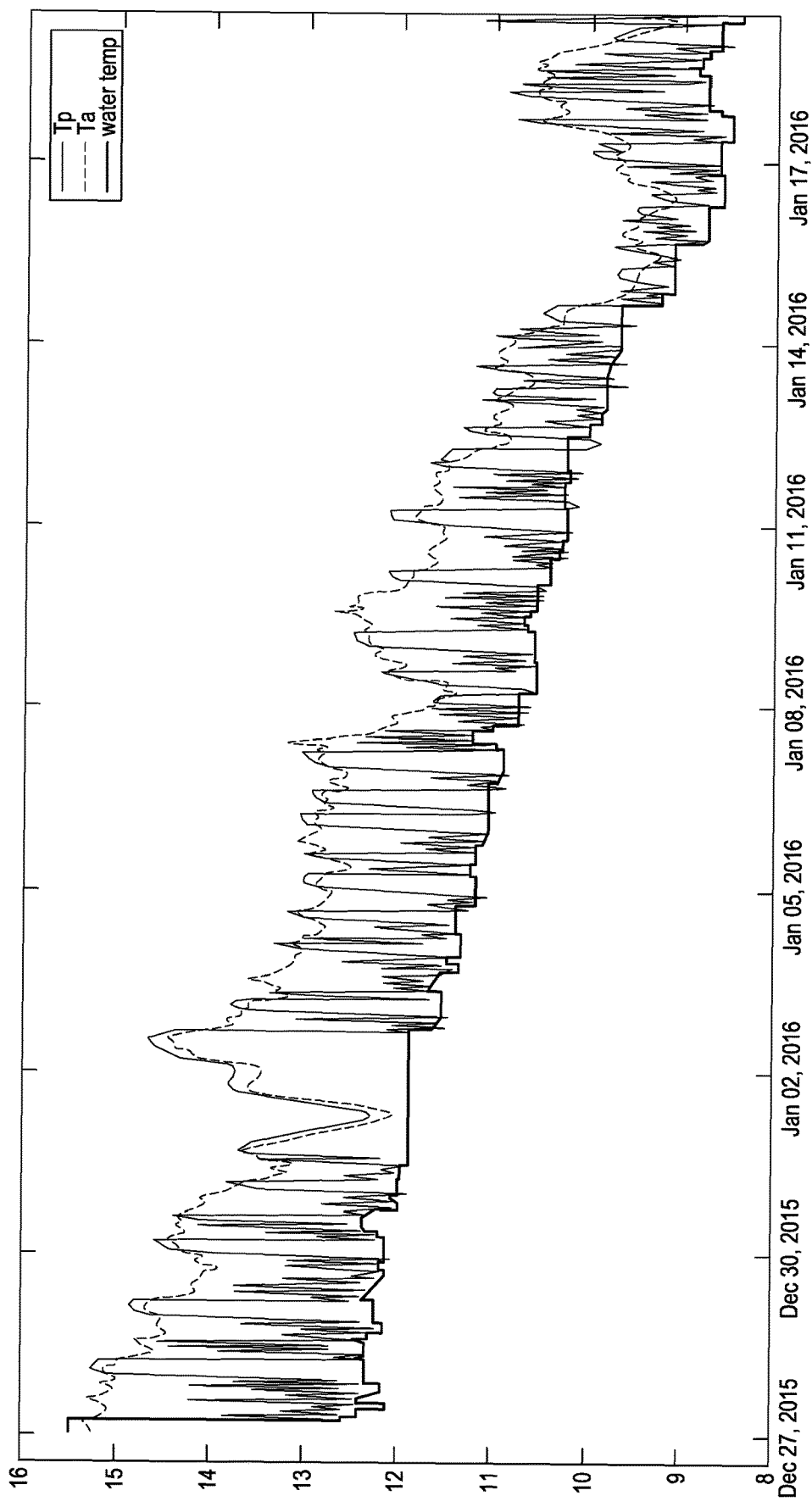
FIG. 19 shows estimated water temperature (bold line compared to the Tp pipe temperature and Ta air temperature traces).

One of the test(s) that the high flow algorithm may perform in order to diagnose a high flow leak is to check if the pipe temperature is tending to the incoming (supply) water temperature. The high flow algorithm may therefore attempt to estimate the temperature of the supply water with a water temperature estimator. This may pick out one or more transient temperature difference maxima, for example by identifying the lowest points (or highest if the incoming water is warmer than the ambient air) in the pipe temperature, smoothing them and using that to predict the water temperature, shown by the estimated water temperature profiled (bold line) in FIG. 19.

An embodiment may need to have seen water usage (preferably prior to the high flow test) in order to estimate the water temperature. The processor may await detection of such water usage (e.g. using transient usage detection by the processor as described herein to detect, e.g., a tap on event), and may then further await a detection that the device (having at least the pipe temperature sensor) is correctly fitted to a mains supply pipe (and not to, e.g., an inlet or outlet pipe of an appliance such as a dishwasher, washing machine or basin), before proceeding with the high flow test and/or water temperature estimation. In an embodiment, if no water usage is detected for an extended period of time (for example in a holiday home) then the water temperature estimate may become out of date as the temperatures change, and the apparatus may need to see more usage to recalibrate.

To see if the pipe temperature tends to water temperature, indicating a high flow event, the algorithm may calculate a value of a parameter known as the Q measure at, e.g., every, sample. The Q measure is a ratio of the difference between air and pipe temperature and air and water temperature.

Figure 20:
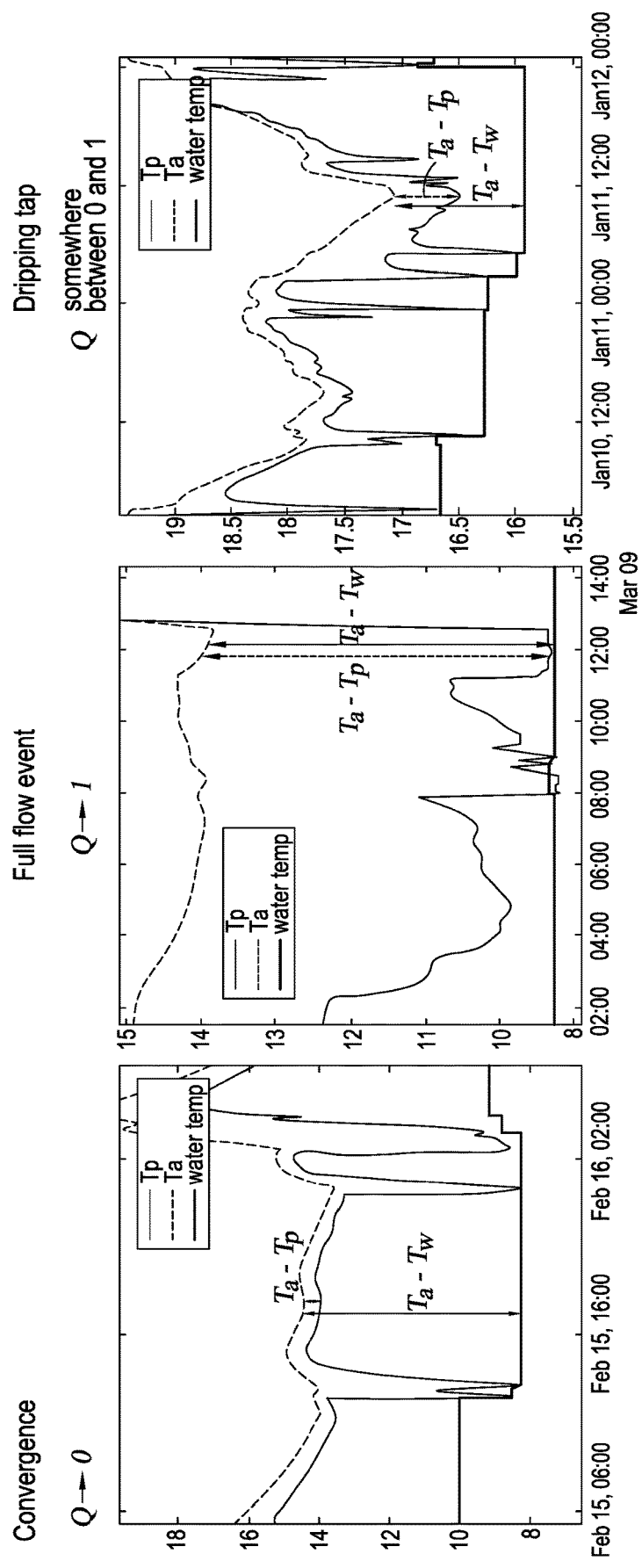
FIG. 20 shows determining the Q measure. Each subplot shows Tp, Ta and estimated water temperature (bold).

We refer to FIG. 20, which shows likely values of Q for three different cases: (1) a quiet period where no water is being used—on the left, (2) a high flow event—in the middle and (3) somewhere in between e.g. a dripping tap—on the right. For the case where no water is being used during a quiet period the value of Q may tend to zero. This is because generally the numerator will be small and the denominator large. For the high flow case Q may tend to 1. This is because generally the numerator will tend to the denominator when pipe temperature tends to water temperature. For a dripping tap, Q may be somewhere between zero and 1. Thus, looking for values of Q near 1 may indicate possible high flow events. More generally, looking for values of Q that exceed one or more threshold(s) (e.g., 0.75, 0.8, 0.9 or 0.95 for high flow) may indicate no flow, low flow or high flow according to the threshold.

Figure 21:
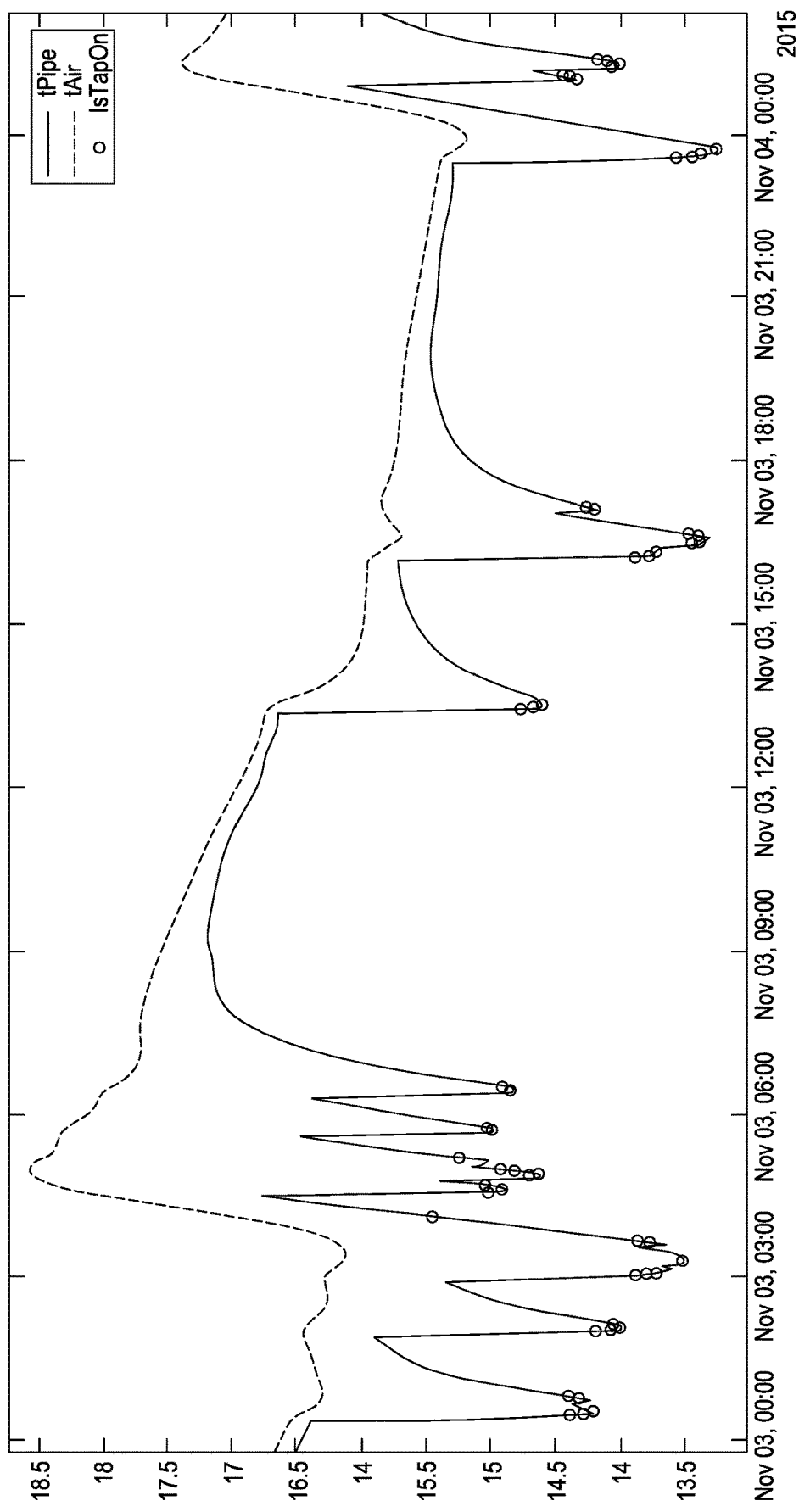
FIG. 21 shows Ta, and Tap on events indicated by circles on Tp.

Test(s) that the high flow algorithm performs may rely on the detection of tap-on events. These may occur when water is being used briefly, e.g. when someone switches on the tap(s). They are generally characterised by peaks, which may be in the form of sharp downward spikes in the pipe temperature as shown for example by the circles in FIG. 21.

Figure 22:
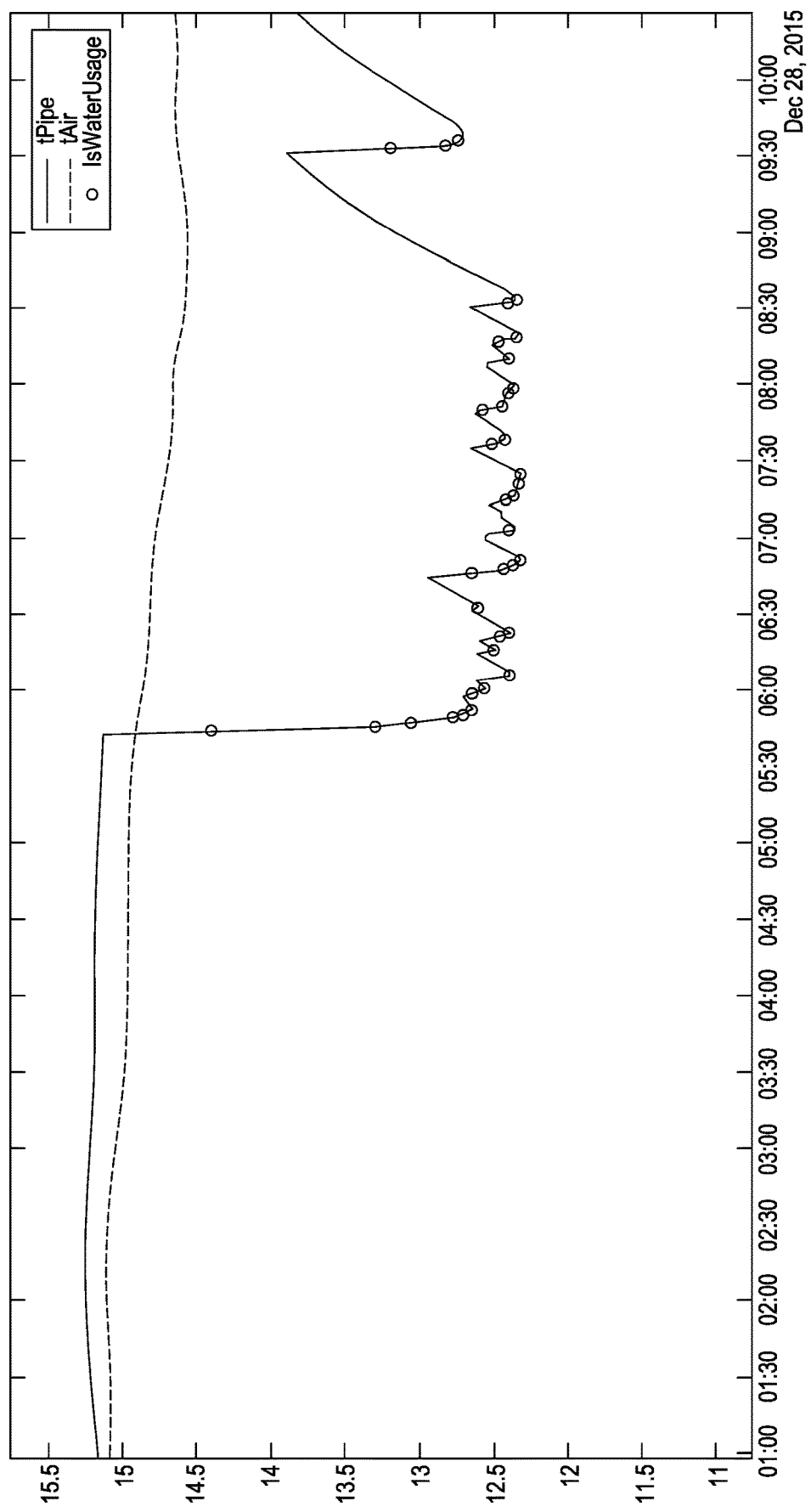
FIG. 22 shows Ta, and water usage events indicated by circles on Tp.

Regarding detecting water usage, sometimes lots of on-off water usage close together can start to look like a high flow event. It may have a similar L-shape, but a true high flow event will generally be much smoother. Continuous water usage is more likely to have zigzags along the bottom of the L-shape where the water is being switched on and off. The algorithm may try to ignore continuous water usage by looking for water usage events, examples of which are shown by the circles in FIG. 22).

If too many temperature crossings of the air and pipe temperatures occur then it may be that the device (having at least the pipe temperature sensor) is fitted incorrectly—for example it is not on a mains water supply pipe (e.g., is on an appliance pipe such as to a washing machine or dishwasher, or basin, or is not on any pipe) and so the temperature data should not be relied on for leak detection. The processor may therefore determine the percentage of tap events that have resulted in a temperature crossing.

Figure 23:
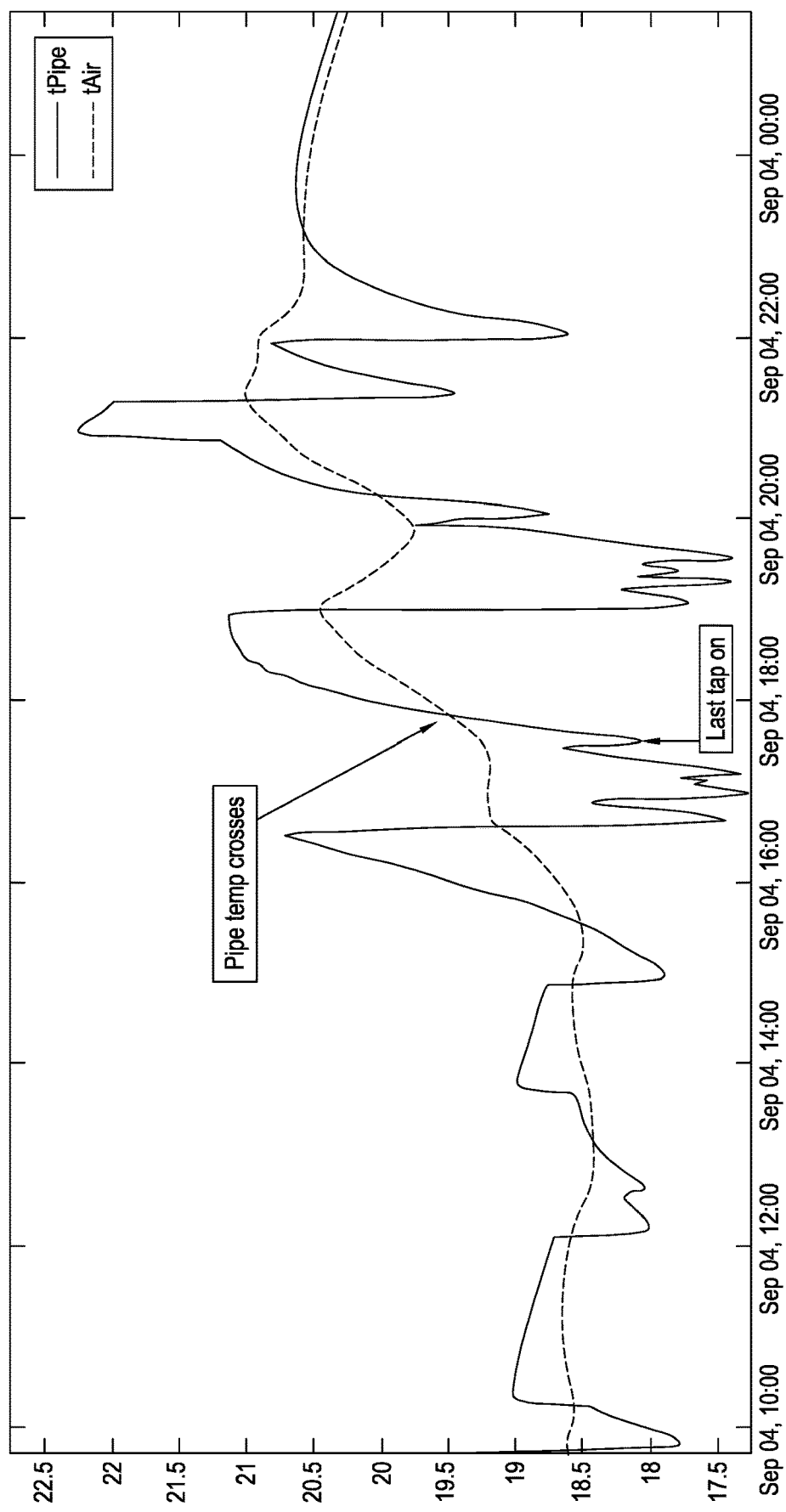

We refer to FIG. 23, which shows pipe temperature crossing above air temperature since last tap on.

Example high flow criteria, any one or more of which may be used to determine whether a high flow test should be performed/continued or a result therefore acted upon for example to output a leak signal, are below:
1. the pipe and air temperature should not have crossed since the last time the algorithm detected that a tap was switched on;
2. the number or percentage of tap events that have resulted in a temperature crossing should not be large, e.g., not exceed a predetermined number;
3. the minimum absolute difference between pipe and air temperature over the buffer should be greater than a threshold such as 0.2 deg C. This may prevent triggering if the temperature difference is less than a defined leak threshold;
4. the pipe temperature over the buffer should be relatively flat (for example as measured by a straight line fitted to the data in the buffer), e.g. an average gradient is outside a predetermined range, (preferably mean square) residual(s) do not exceed a threshold, and/or there is no Tp peak;
5. there should be no tap on events in the buffer;
6. all values of Q over the buffer should be greater than a threshold Q value, e.g., 0.75, 0.8, 0.9 or 0.95; and/or
7. there should be no water usage events in the buffer.

Figure 24:
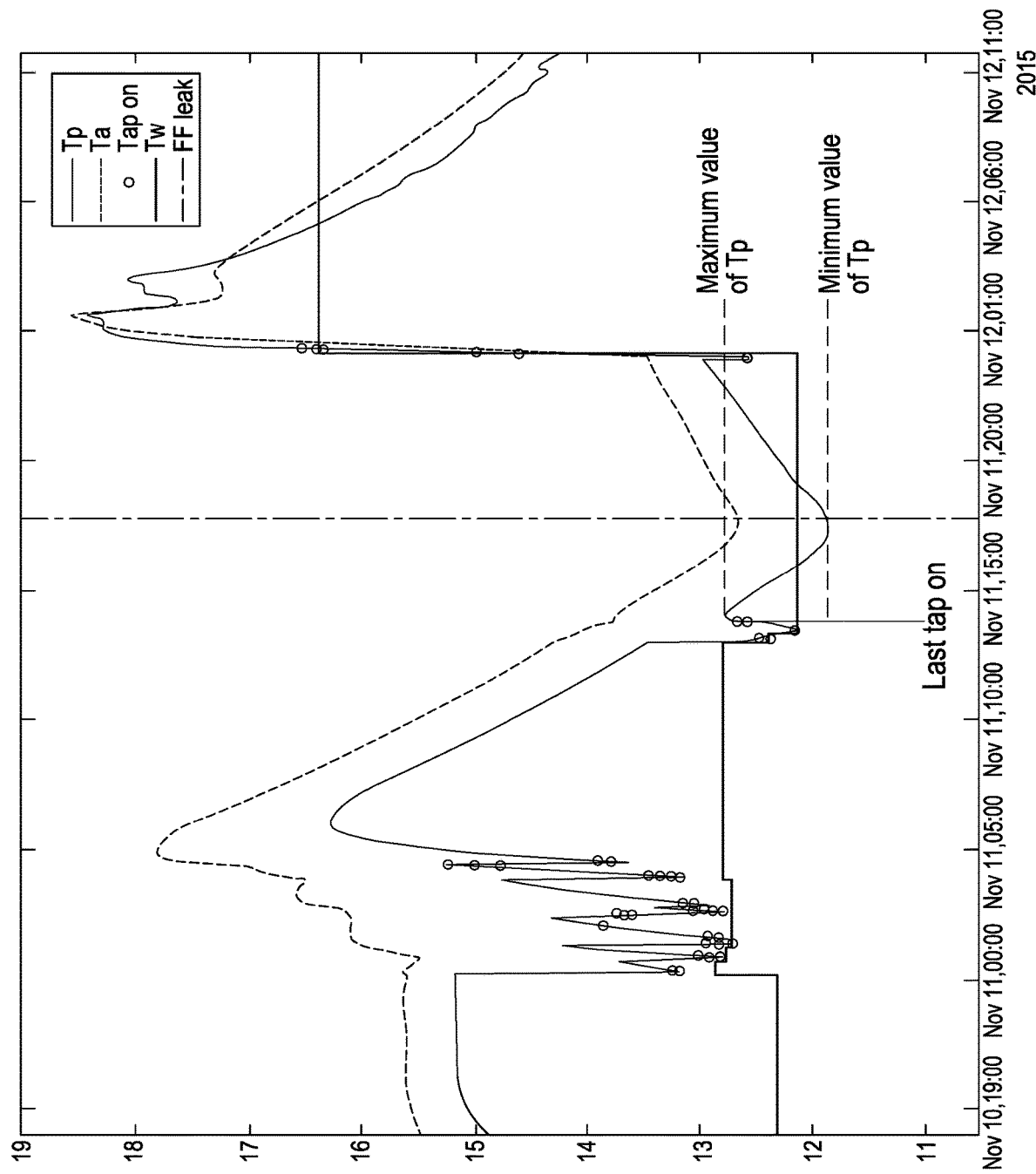
FIG. 24 relates to a false alarm, and shows Tp, Ta, tap on events (indicated by circles), estimated water temperature Tw (stepping, darker trace), and a leak indication (vertical line).

We now turn to false alarm rejection. By using the criteria or entry condition(s) above, high flow events may be successfully, e.g., validly, detected and a high flow leak can be flagged. Sometimes the pipe and air temperature fall together during a quiet period. During this time the water temperature may not be updated as no water may be being used. An example is shown in FIG. 24. Because pipe temperature (Tp) falls towards the water temperature (Tw), Q exceeds the threshold for a high flow leak. To reject events such as this, a (preferably two-fold) strategy may be used:
(1) The pipe temperature range since the last detected transient usage or tap on is measured. This is the maximum value of pipe temperature since the last tap on event minus the minimum value of pipe temperature since the last tap on event. If the range is large, e.g., greater than a threshold difference, then a high flow leak is preferably not flagged as this is likely to be a false alarm.

(We refer to FIG. 24, which relates to a false alarm); and/or (2) A projected ambient temperature may be determined based on an average gradient of Ta indicators, e.g., by determining a straight line fit to the air/ambient temperature and projecting forwards e.g. a time interval of 2 hours. The water temperature is also projected forwards by the time interval (e.g. 2 hours) as its last value. If the projected air temperature is likely to intersect the projected water temperature, then a leak is not flagged as this is a probable false alarm.

Figure 25:
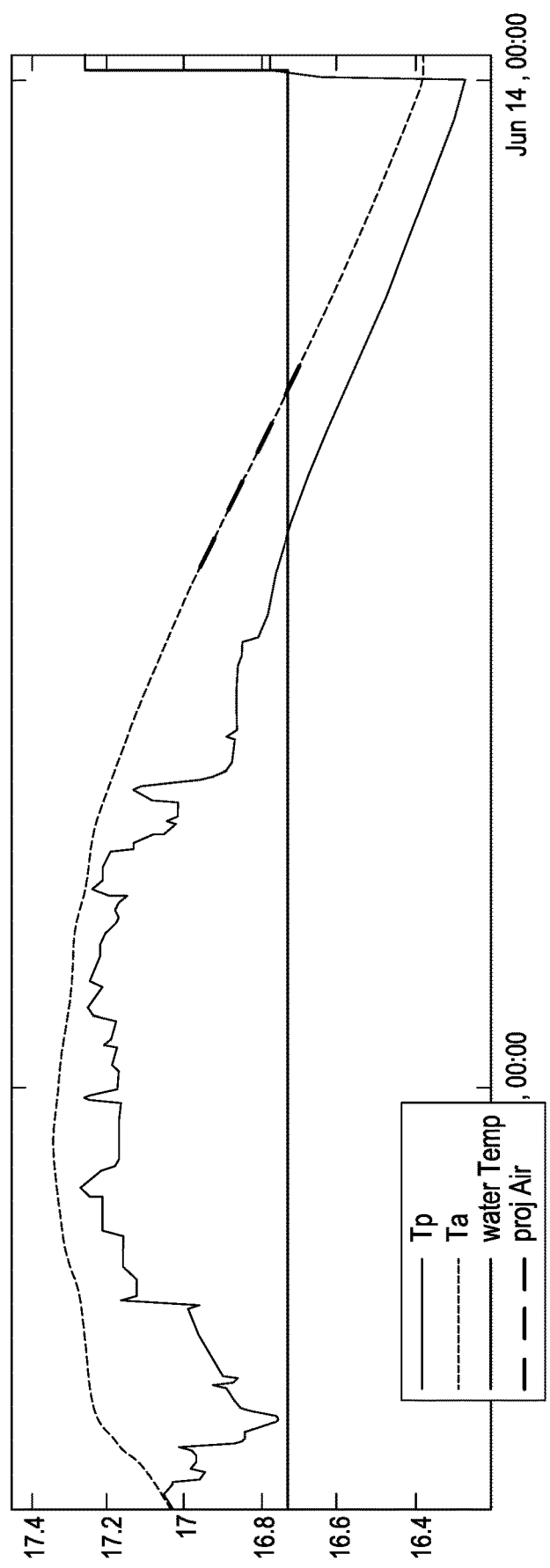
FIG. 25 shows projected air and water temperature false alarm rejection.

We refer to FIG. 25, which shows projected air and water temperature false alarm rejection.

If all tests and/or criteria pass and no false alarm rejection occurs, then a high flow leak may be flagged. The leak may also be reported by sending a High Flow Alert Message. An alert message may only be sent if one has not already been sent in e.g. the last hour.

As soon as the leak is flagged a timer/counter may be started to time a delay, e.g., ≈30 minutes. If the delay or maximum count is reached, and:

(1) the alert message has not been acknowledged; and
(2) the high flow leak condition is still present, then the alarm may be issued, e.g., an audible alarm will sound.

Figure 26:
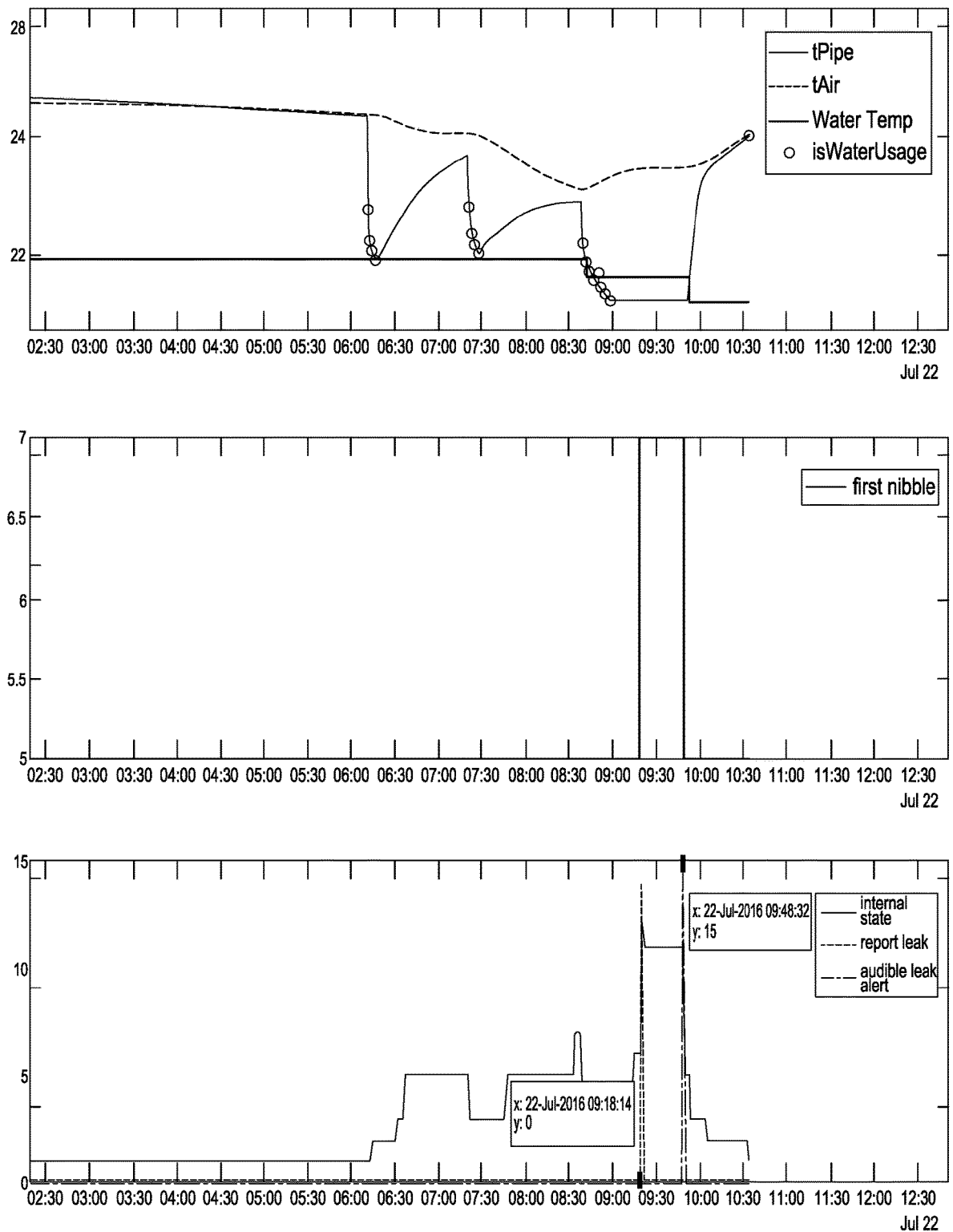
FIG. 26 relates to a high flow leak, and shows Tp, Ta, Tw and water usage indicators (circles in upper subplot). In the lower subplot the read substantially vertical lines indicate occurrence of a leak report, and the yellow vertical lines indicate occurrence of a preferably audible leak alert.

We refer to FIG. 26, which shows a high flow leak showing a status change (status going to 7 in the centre plot), the point where an alert message (e.g. using wireless communication) is preferably be sent to report a leak and the point where the device may beep if no acknowledgement is received; this may be an audible leak alert.

Figure 27:
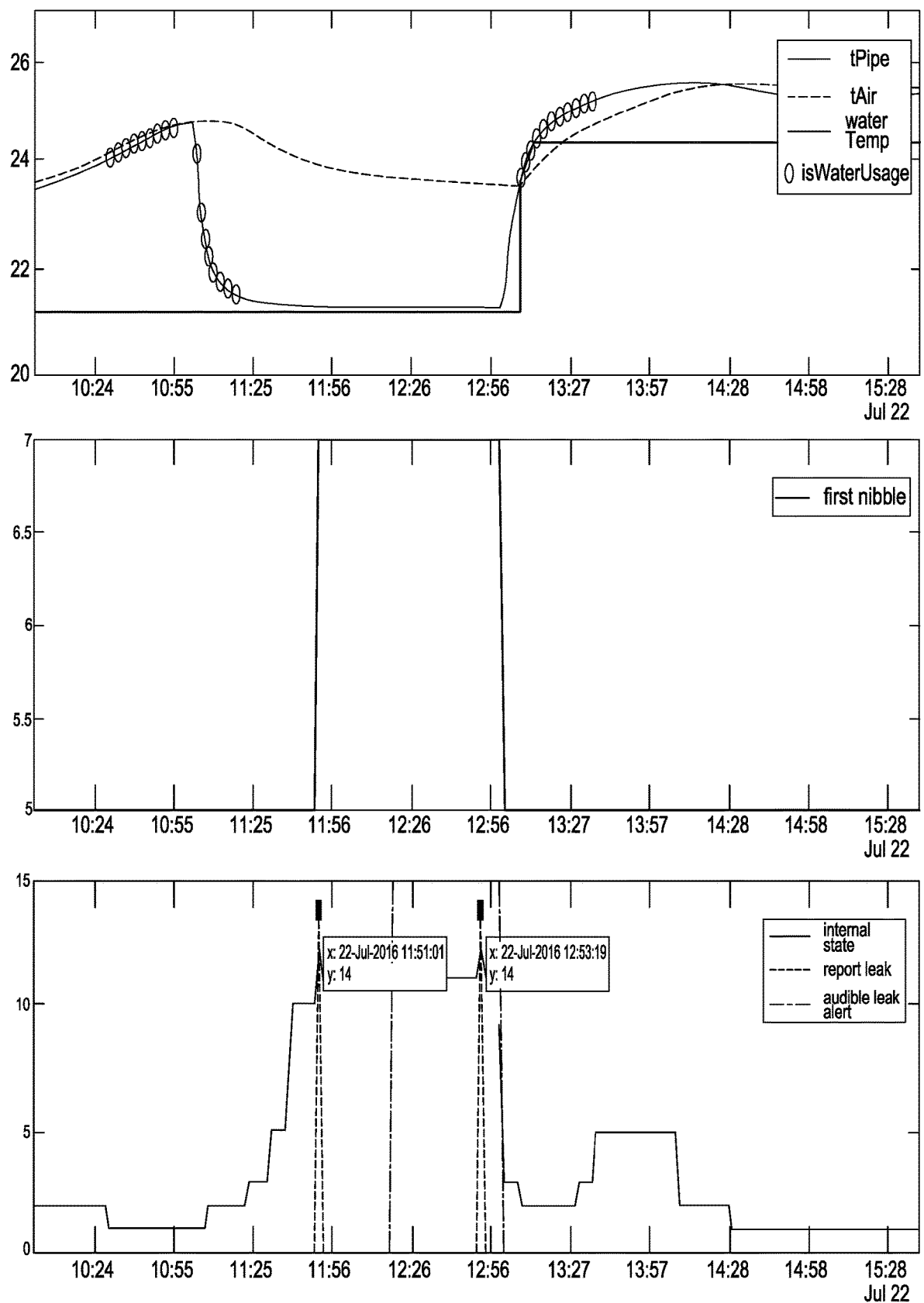
FIG. 27 show repeated high flow alert message, and shows Tp, Ta, Tw and water usage indicators (circles in upper subplot). In the lower subplot the read substantially vertical lines indicate occurrence of a leak report, and the yellow vertical lines indicate occurrence of a preferably audible leak alert.

Regarding repeated messages, if the high flow leak remains, another high flow alert message may be sent later (e.g., an hour later)—see FIG. 27 relating to reporting a leak.

Flow/Leak Confirmation

The leak detection(s) (low and/or high flow) described above may in an embodiment be supplemented by a confirmatory procedure based on classification, as described below. In this case, a leak detection may only be indicated, e.g., by audio and/or visual alarm or message to a user, dependent on the classification.

Experience has shown that household plumbing does not always fall neatly into a leak/no leak classification based on an overnight test, due to a number of factors.

A leak test result may therefore be put in at least one of at least a subset of one or more of the following classes:

Intermittent Leaks—these may be observed in up to 20% of properties where there is flow one night but not the next. This may be due to a tap not switching off fully or a toilet valve not reseating after a flush. Because an actual leak will generally run continuously, these types of leak may be recognised and the processor may discriminate between actual and intermittent leaks. A simple filter for this may force the system to look for a threshold number of e.g. 3 consecutive leaks before alerting. However some intermittent leaks will run for >3 days.

Borderline Leaks—these may appear as very low flow leaks that are on the cusp of an (effective) leak sensitivity threshold of an apparatus. They may appear to oscillate between leak/no leak based on a threshold, but are generally not the same as intermittent leaks. They are generally either a low flow leak, or the result of some other chilling or heating factor, for example conduction through the pipe.

Can't Test—these relate to conditions where the leak detection may not work, for example where the location of the pipe temperature sensor, e.g., a stopcock, is next to a constantly fluctuating heat source.

Leak—consistently above threshold

No leak—consistently below threshold.

Figure 28:
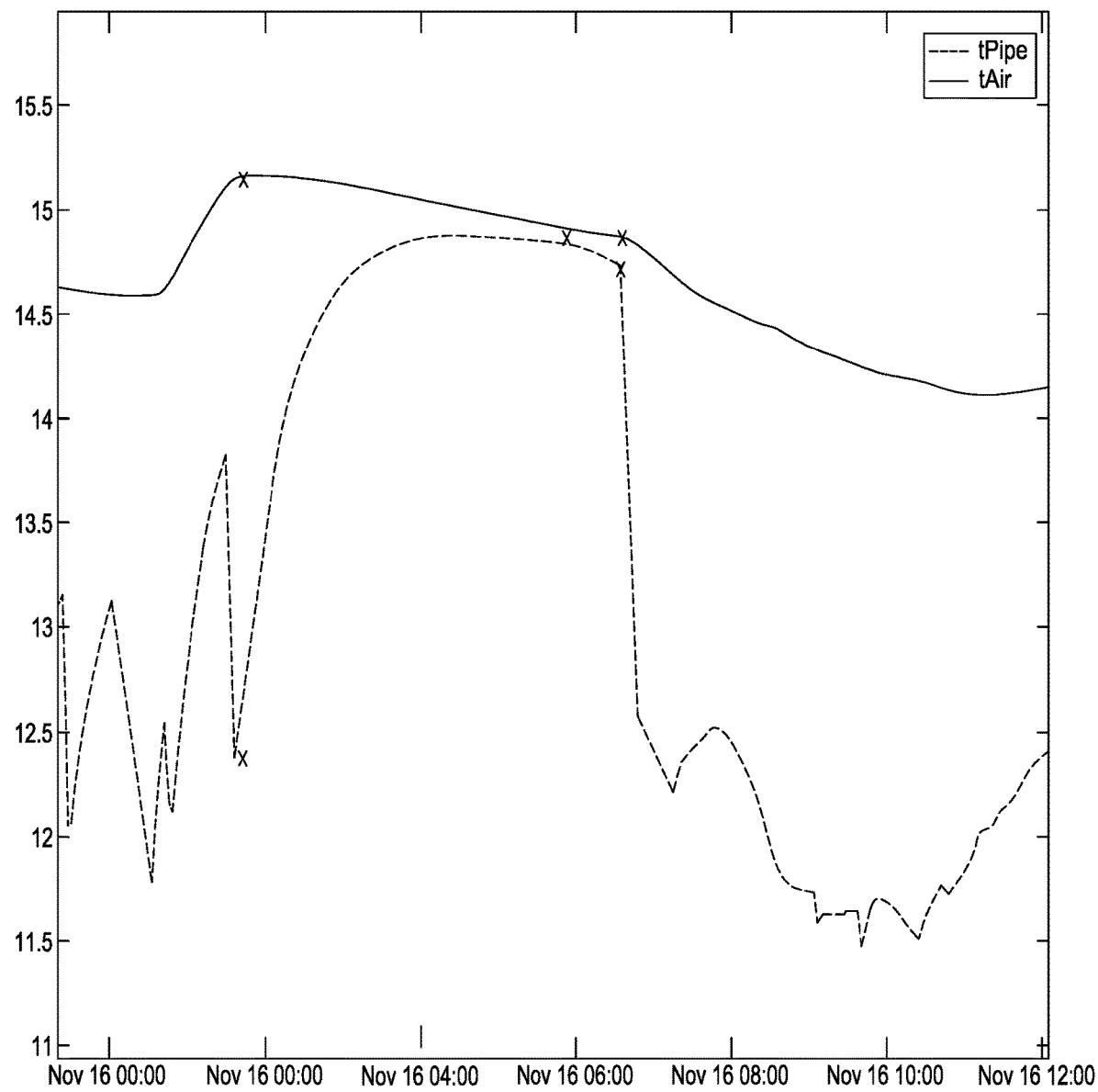
FIG. 28 shows example air and pipe temperature traces.

Regarding steps to classification, the processor may generate an alert based on the temperatures it sees over a 'quiet period' where it has seen no water usage. The salient temperatures are typically the air and pipe temperature at the start of the quiet period (tAirStart and tPipeStart), the end of the quiet period when water is used again (tAirEnd and tPipeEnd) and/or the mean of the temperatures for a period before the end of the quiet period, typically 30 minutes or so (tAirMid and tPipeMid) as this indicates whether the temperatures have stabilised if they are similar to tAirEnd and tPipeEnd. When the device comprising the second temperature sensor is connected via a bandwidth constrained channel (such as via UNB communication or SMS) then it may transmit these values to a hub. The 'x's on the graph of FIG. 28 show example salient points that may be sent back to characterise the temperature profile. If more bandwidth is available then more, e.g., all, temperature samples may be sent back.

Based on the values of tAir and tPipe, then a classification may be made of the flow over this quiet period. This may have two components; the rate of flow and/or a confidence value attached to the rate of flow measurement, which indicates how much confidence the algorithm may have in the flow metric.

This is described below on the assumption that the water entering the property is colder than the ambient air temperature. However the algorithm can also work inverted by applying symmetrical logic if the water temperature is warmer than the air. The thresholds for the comparators may all be dependent upon the installation and the climatic conditions, but the values shown are indicatively correct.

The skilled person may determine appropriate flow and confidence indications depending on details of particular implementation. It is further noted that the numerical values provided in the classification table below are merely by way of example; the skilled person may select different values depending on a particular implementation.

| Starting Delta tAirStart-tPipeStart | Pipe Temp Overall Variation tPipeStart-tPipeEnd | Air Temp Overall Variation tAirStart-tAirEnd | Final Delta tAirEnd-tPipeEnd | Air Temp Final Variation Abs (tAirMid-tAirEnd) | Pipe Temp Final Variation Abs (tPipeMid-tPipeEnd) | Flow | Confidence |
|---|---|---|---|---|---|---|---|
| Very High (>2 C.) | High (>0.7 C.) | Low (<0.5 C.) | Low (<0.2 C.) | Low (<0.1 C.) | Low (<0.1 C.) | Zero | High |

-continued

| Starting Delta tAirStart-tPipeStart | Pipe Temp Overall Variation tPipeStart-tPipeEnd | Air Temp Overall Variation tAirStart-tAirEnd | Final Delta tAirEnd-tPipeEnd | Air Temp Final Variation Abs (tAirMid-tAirEnd) | Pipe Temp Final Variation Abs (tPipeMid-tPipeEnd) | Flow | Confidence |
|---|---|---|---|---|---|---|---|
| High (>1 C.) | High (>0.7 C.) | Low (<0.5 C.) | Low (<0.2 C.) | Low (<0.1 C.) | Low (<0.1 C.) | Zero | Medium |
| High (>1 C.) | High (>0.7 C.) | Low (<0.5 C.) | Mid (<0.4 C.) | Low (<0.1 C.) | Low (<0.1 C.) | Low | Medium |
| High (>1 C.) | Medium (>0.5 C.) | Low (<0.5 C.) | Medium (>0.4 C.) | Low (<0.1 C.) | Low (<0.1 C.) | Low | High |
| Very High (>2 C.) | Low (>0.3 C.) | Low (<0.5 C.) | High (>1 C.) | Low (<0.1 C.) | Low (<0.1 C.) | High | High |
| High (>1 C.) | Low (>0.3 C.) | High (>0.5 C.) | High (>0.6 C.) | High (>0.1 C.) | Low (<0.1 C.) | High | Medium |
| High (>1 C.) | High (>0.7 C.) | Low (<0.5 C.) | Mid (<0.4 C.) | Low (<0.1 C.) | High (>0.1 C.) | Low | Low |
| High (>1 C.) | High (>0.7 C.) | Low (<0.5 C.) | Mid (<0.4 C.) | High (>0.1 C.) | Low (>0.1 C.) | Low | Low |

This gives example classification of the flow over any one quiet period. The classes may be High/Medium/Low or −1 to 1 or 0 to 100% any other metric whether continuous or discrete.

The pattern of the Flow and Confidence classes over a period of N nights (might be 2-14 nights or more) may then be used to classify the leak as one of the above (No Leak/Intermittent/BorderLine/Leak).

If the device consistently gets high flow with medium or high confidence, then it may be classified as a leak with high confidence.

If the device consistently gets zero flow with medium or high confidence, then it may be classified as a no leak. This state may be recorded. Devices with a high confidence of no leak may then have a low threshold number for consecutive leaks set, for example 2 or 3 nights, so that if a leak does start the user may be informed sooner with a higher degree of confidence.

If the device gets Zero flow with High or Medium confidence then gets a Low or High flow with high or medium confidence, then subsequently gets a Zero flow with High or Medium confidence, then the device may indicate an Intermittent classification. This state may be recorded, and the threshold number for consecutive leaks set higher, for example 7 nights, or a value based on the mean of previous observed numbers of consecutive leaks plus a multiple of the standard deviation of the number of consecutive leaks. For example a threshold based on mu+2.35 sd (mu representing the mean temperature difference; sd referring to standard deviation) will give a 99% probability of it being a real leak assuming the number of consecutive leaks observed due to an intermittent leak is normally distributed.

The borderline classification may be based on seeing more than a defined proportion of flows classified as low flow and medium or high confidence.

The 'can't test' classification may be based on separate criteria, where the temperatures is/are never stable enough to get a quiet period. This may then be classified further. If the air temperature is stable but the quiet periods are too short, then a 'can't test due to too high water usage' class may be indicated. If the air temperature is not stable, then the amplitude and frequency of the temperature changes over the quiet period may be measured. If the amplitude is high then it may be due to excessive heating (indicated by too high amplitude temperature cycling and/or too high absolute temperatures as might be experienced if the device is next to a boiler), in which case a 'can't test excessive heating' class may be indicated. If there is too frequent temperature cycling (for example if the device is behind a fridge which switches it's compressor on every 30 minutes) then a 'can't test frequent heating class' may be indicated.

Pipe Fit Check

The apparatus may perform a check to determine if the device comprising at least the pipe temperature sensor has been fitted correctly, e.g., to a water pipe (preferably a mains water supply pipe rather than an appliance pipe). The fit check may look to see if the curvature of Ta and $T_p$ are different, i.e., are they moving together or are they diverging/approaching, e.g., converging. Specifically, if according to the pipe fit check:

$T_a$ is stable; and $T_p$ dips a predetermined number e.g. 3 times, e.g., due to tap-on events, this may mean there have been e.g. 3 water usages. Whereas, if $T_a$ and $T_p$ both dipped then this could simply mean that a new device comprising the temperature sensors had just been taken out of it's packaging (box) such that both sensors had been exposed to a new air temperature at the same time. The check may require e.g. 3 $T_p$ dips, in order to prevent any flow determination being made when, e.g., a user has simply put their finger over the $T_p$ sensor when taking the device out of its packaging.

The apparatus may transmit the determination of the e.g. 3 usages to a remote unit such as a central hub. This information may be used to reassure that the device has been fitted on a pipe.

Usage Patterns

The apparatus may look at the water usage pattern based on $T_p$ over, e.g., 24 hrs, for example looking for curvature that exceeds a high curvature threshold. The processor may constantly look for a downward/upward kink (peak, e.g., dip) in $T_p$. If such a curvature exceeding a curvature threshold is seen, the usage information may be recorded, e.g., "saw water usage at 8:14 am". When many such kinks are found, the series of such usage information may be recorded. The series may be transmitted to the remote unit, e.g., central hub, that may determine:

normal usage, e.g., usage detections are too infrequent, e.g., may mean that the device having the pipe temperature sensor is connected to a washing machine (or for example dishwasher or basin) inlet/outlet rather than to the mains water supply; and either the device is not on a pipe, or the user is on holiday. In this case, the remote unit/central hub may contact the user, e.g., by SMS, to ask.

The remote unit/central hub may also determine based on the series:

what time the user gets home, e.g., from work—this information may be used to determine what is the best time for sending messages to the user.

Usage Data

The apparatus use the time of sharp changes (peaks) in pipe temperature, indicating water usage; these may be transmitted back to a remote unit or central hub. These may be actual times, or for example windows such as 07:00-07:30, 07:30-08:00 etc. with 0, 1 or more water usage events in them.

These may then be used to build up a usage pattern. This may provide data on approximate volume of water usage and occupation patterns of the house, for example is it empty during the day or for extended periods of time. It can also be compared to expected usage patterns for either a typical house, and/or one with a similar number of occupants, and if the usage is unusually low or intermittent by comparison, then it may be determined that the device is be fitted to the wrong pipe for example the washing machine, dishwasher or basin, not the mains water supply. This may then trigger a prompt, e.g., SMS, to the user to check the apparatus installation.

'On Pipe Based' Detection Based on Thermal Mass

It may be advantageous to know if the detector (i.e., device comprising at least the pipe temperature sensor) is fitted on a pipe. No flow may be evident to the device as there may be no sudden changes in pipe temperatures for an extended period of time. However this may be ambiguous as to whether the device has been removed from the pipe or the property is empty.

One possibility if no usage is observed for say >14 days is to ask (e.g., by SMS) a user if the device has been removed or if they are away from the property. However as this requires effort from the user it is not desirable.

A possible alternative is to detect if the device (comprising at least the pipe temperature sensor) is on a pipe by the temperature variations. One way of doing this is to measure the high frequency (e.g., a few Hz to a few second sampling frequency) fluctuations of the pipe temperature sensor, e.g., thermistor. If these have a high frequency(s) compared to a threshold then the device is likely to be off a pipe, as small fluctuations in temperature due to air movements may cause the temperature to fluctuate. If the fluctuations are low compared to a threshold then the device is likely on a pipe, and the thermal mass of the pipe may be damping the fluctuations.

An additional or alternative possible method is to look at the cyclical variation of the two temperatures over the diurnal temperature cycle. If the device is on a pipe, then the pipe temperature is likely to lag the air temperature sensor slightly due to the thermal mass of the pipe. This may be measured by fitting a e.g. 24 hour period sinusoid to the samples and comparing the phases, or looking for a consistent temporal offset between the two sensors showing a lag on the pipe.

Checking how Long Property is Empty Prior to Sending a High Flow Alert

High flow alerts may be more important when properties are empty as a) no one is likely to notice the leak and shut the water off and b) there is far less likely to be a false alarm due to long showers, cleaning cars etc.

One way of filtering the alerts is as follows. A measure of how long it has been since the last water usage was detected in the property may be maintained. So a timer or counter may be updated periodically and reset e.g. to zero when usage is detected (e.g. by detecting a pipe temperature peak or tap-on event as discussed herein). When a high flow duration more than a predefined (non-zero) period is detected, the duration of no usage prior to it may be compared to a threshold in the form of a predefined time duration. If it is higher than the predefined time duration (e.g. 3 hours or maybe 72 hours) then the alert can be assumed to be in an empty home. This may then be treated differently to a high flow detected in an occupied property by indicating the specific type of high flow, for example by sending a different/more appropriate message to a user, e.g., by SMS. Such a message may indicate the type of high flow by at least inferring, e.g., "house empty but constant flow". A detection that a house or other building has been empty for more than a longer period e.g. 24 hours may indicate that a user is away or on vacation, in which case the alert may trigger an offer of assistance such as 'would you like us to send a plumber to your property to switch off your water'.

The high flow for more than defined period may be detected when the following criteria (preferably all) are met:

Tp remains within a predetermined range either side of estimated water temperature, e.g. maximum deviation of Tp remains within the predetermined range;

Q remains above a threshold value; and/or

Pipe temperature is smooth, e.g., curvature remains below a threshold and/or all residuals relative to a straight line fit remain below a threshold.

Additional or Alternative Features of Embodiments

Variable Leak Detection Threshold

Where in an embodiment a leak condition is determined using a threshold, for example at least based on a temperature difference between the pipe and ambient relative to a predetermined threshold for a predetermined period as described above and/or based on a temperature gradient and predetermined threshold as described below (see equations 4a, 4b, 6a, 6b below), it may be advantageous to vary such a threshold(s) for example according to the time of year. Regardless of whether or not the flow detection system, e.g., ECU thereof, is able to track the time of year for example by means of an internal electronic calendar, the threshold may be varied based on a starting difference between the pipe and ambient temperatures.

The starting temperature difference may be the difference in readings of the two temperature sensors at the start of the predetermined period used to monitor for a leak. The start of the predetermined period may be identified when it is detected that the difference between the temperatures suddenly changes at a rate above a pre-determined value and/or may be the last detected time point where the temperature versus time gradient of the pipe temperature reverses sign such that the pipe temperature tends towards the ambient temperature.

If the starting temperature difference is smaller, then a lower threshold may be applicable. For example, if the starting temperature is 4° C. then a pre-determined threshold may have a value of 0.3° C., or if the starting temperature difference is 0.5° C. then the threshold may be 0.1° C.

Initiating Leak Detection Operation

An embodiment may be configured to detect when the unit is mounted on a pipe such that operation for monitoring for any leak can be started. The unit may be configured to wait until a sudden change in pipe temperature relative to the ambient temperature is detected, preferably repeatedly such as at least three times in 24 hours. The unit may then effectively know that it is in use, i.e. no longer separate from a pipe to be monitored.

Such a feature may give confidence for example to an insurer that any readings or notifications arising from the unit relating to leak detection have resulted from events occurring while the unit was fitted to a pipe.

The start of leak detection operation may be indicated by communicating this to a remotely located control entity and/or may be recorded internally within the unit, preferably recording the date at which the unit was mounted onto the pipe, or incrementing an internal timer so the total time that the device has been fitted to a pipe is known.

Alarm Filtering

A preferred embodiment does not provide an alarm, e.g. notification to the user and/or an audible and/or visual indication by the unit, every time a potential leak is detected. Such an alarm may be provided only when a potential leak detection occurs repeatedly on each of a pre-determined number of periods when no flow would be expected in the absence of a leak, e.g. three night time such periods.

Similarly, if a temperature pattern is detected having transition(s) corresponding to at least one leak-no leak transition during each of a pre-determined number of such periods then no alarm may be generated. Such a pattern may merely indicate that a user has a tendency to sometimes leave a tap dripping and not fully off and later to turn it off fully, for example. Preferably, no alarm is generated until at least seven night-time periods (or other periods of no flow expectation during a respective 24 hour periods) have occurred.

Burst Pipe Indication

An embodiment may be configured to detect when the pipe temperature stays substantially constant at a temperature that differs significantly by a pre-determined amount at least from the ambient temperature. In this case, the pipe temperature may have previously varied according to fluid (e.g. water) usage but then remain at the substantially constant temperature without beginning any rise towards the ambient temperature. The substantially constant temperature may be detected as corresponding to a water temperature estimated based on the preceding variations according to usage.

If the pipe temperature remains at the constant temperature for a pre-determined period, preferably longer than the longest period of usage expected for high flow such as when a user is washing a car (e.g. longer than 1 hour), this may indicate a burst pipe condition. Preferably, the detection of the substantially constant temperature for the pre-determined period results in the unit immediately issuing an alarm (e.g., visual and/or audible notification or alert). It is preferable in this case that the generation of a leak alarm is not disabled even for verification over more than one 24 hour period. In other words, preferably no verification is to be performed before issuing an alarm in the case of a potential burst pipe detection.

Holiday Mode

An embodiment may be configured to detect when a pre-determined number of, e.g., 24 hour, periods have passed with no flow, for example encompassing seven nights. Such no flow may be detected by determining that the pipe temperature tracks the ambient temperature throughout the predetermined number of such periods. If such an extended no flow period has occurred and the embodiment subsequently detects a sudden change in pipe temperature, for example indicated by a rate of change of pipe temperature greater than a pre-determined amount or a change in magnitude of pipe temperature greater than a pre-determined amount preferably over a pre-determined minimum period such as 60 minutes, an alarm (e.g., visual and/or audible notification or alert) may be generated due to the risk of the change indicating a burst pipe. Preferably no delay e.g. due to verification, is allowed before such an alarm is issued.

Remote Communication

An embodiment may output a minimum of data points from temperature profiles of the air and pipe and send these to a remote entity for determination of a leak/no leak status. Such data points may comprise the ambient temperature, pipe temperature, starting temperature and/or temperature-time gradient(s) of the ambient and/or pipe temperature profiles at the time point when the flow was last detected, e.g. water was last used. Such data points may be transmitted, e.g. wirelessly, to a remote control unit that decides if a leak has occurred based on those data points. This may be advantageous where the remote system decides what should be an appropriate predetermined threshold of temperature difference, for example depending on weather patterns/forecasts. The remote entity may adjust such a threshold on the fly for example in case of a heatwave where the ambient temperature is of the order of e.g. 30° C. and the pipe temperature is therefore not able to catch up during the predetermined period.

By varying such a threshold remotely, the remote system may be able to ensure that all devices are disabled from providing any leak alarm and/or ensure that any such alarm is ignored. Such remote control of the alarm process may be advantageous where sufficient data on preceding weather conditions is not able to be programmed into a leak detection unit mounted on a pipe. By providing the leak detection remotely, the system has some flexibility.

Taking into account that a leak detection may not necessarily be in radio communications at all times with a remote entity, a leak detection unit may have two modes of operation. In a first mode where radio communications are possible, the remote system may decide based on data points from the leak detection unit when an alarm is to be generated. In another mode, the unit detects that it is out of radio communication and is then configured to make decisions on alarms internally. An embodiment of the leak detection unit may have an indicator for indicating to the user whether or not the unit is able to perform radio communications with the remote entity. Where the unit is not in radio communications, it may be configured to provide notification to the user, e.g. to the user's mobile phone, to inform that the unit is operating in the independent, isolated mode.

In a preferred embodiment, data may be sent to a remote unit wirelessly, e.g., using Sigfox® (this may be advantageous where there are bandwidth constraints). A unit that is local to, eg., attached to, the pipe may look for smooth regions where we can check for leaks (for example, it may look to (re-)start a predetermined period each time a water usage/flow is detected), then a predetermined threshold for leak detection may be adjusted at the remote unit to allow for temperature variations, desired sensitivity of the detectors, and/or to classify the leak according to severity.

Data that may be sent using, e.g. Sigfox®, may comprise for example: message type; message count; indication that ambient and pipe temperatures have crossed; pipe temperature sample(s), ambient temperature sample(s); indicator of time interval between each pipe temperature sample; and/or battery voltage.

Where more bandwidth is available, the ambient/air and pipe temperatures may be sent to the remote unit at every sample point. These may be batched and sent as a group to save battery power (e.g. send the last 10 samples every 1000 seconds). The leak detection algorithm may then be run remotely (permitting updates to be applied without needing to reprogram the detectors in the field).

Start of Predetermined Period

The predetermined period during which an embodiment monitors for a leak, e.g., by monitoring to detect a below threshold temperature difference and/or convergence of pipe and ambient temperature profiles, may have a predetermined duration, e.g. 2.7 hours, beginning at a starting time. The starting time may be determined by detecting a peak in $d^2T/dt^2$, taking into account the sign of this second differential (the term 'differential' being used interchangeably with 'derivative' throughout this specification, for example the second order derivative $d^2T/dt^2$ being referable to as a second derivative/differential of temperature with respect to time). Such a peak may be interpreted as indicating a water usage/flow and may thus be used to trigger the start of a new predetermined period, e.g., to re-start an existing monitoring period. When the second order differential is negative and the pipe temperature is greater than the ambient/air temperature, this may indicate the start of the predetermined period. When the second order differential is positive and the pipe temperature is less than the air temperature, this may similarly start a predetermined period.

Additional or Alternative Leak Detection

One method of leak detection involves using a determination of temperature difference between pipe and ambient air sensors and determining if the temperature difference is below a pre-determined threshold for a pre-determined period, as described elsewhere in this specification. However, depending for example on the time of year and/or a local climate, the temperature of the pipe may not be substantially constant throughout a period of no flow. Consequently, additionally or alternatively to the above method, an embodiment may determine a leak/no leak state based on whether or not the pipe temperature and ambient temperature tend to converge (as opposed to, e.g., 'tracking', i.e., generally staying parallel with a constant or zero offset).

Generally, in a no flow (e.g. no leak) condition, the pipe and ambient air temperatures may tend to gradually converge. In a flow or leak condition, the pipe temperature may tend to a constant temperature without returning to or at least converging towards the ambient temperature; this may even involve the pipe temperature crossing the ambient temperature.

In one scenario, in the no flow condition, the pipe temperature may gradually drop or rise depending on the environment so that the temperature difference between the ambient and pipe temperature sensors generally reduces. Bearing this in mind, it may be advantageous for detecting a leak to monitor the progression of the pipe and/or ambient temperature relative to each other, for example by monitoring progression of a gradient of temperature vs time of at least the pipe temperature. Such monitoring may allow early detection of a leak without awaiting detection of a sufficiently low and/or constant temperature difference between the sensors, e.g., without waiting to see if the pipe and ambient temperatures track and/or become closer than a threshold difference apart.

Thus, a preferred embodiment, additionally or alternatively to the monitoring of the temperature difference relative to a threshold, may monitor whether or not the pipe temperature tends to converge towards the ambient temperature, when there has been no other water usage for a length of time (for example 5 minutes). Detecting such a lack of water usage may be done by monitoring the second differential of the pipe temperature relative to time (i.e., $d^2T_p/dt^2$), and waiting for it to be below a certain threshold, indicating no sudden changes in temperature and hence no changes in flow due to taps switching off and on or other intermittent usage. To monitor for convergence, an embodiment may monitor the pipe and air temperatures based for example on the equations below.

The rate of change of the measured local pipe temperature can be considered to be:

$$dTp/dt = h1 \cdot (Ta-Tp) + h2(Tw-Tp) \quad (1)$$

wherein Tp is the pipe temperature, Ta is the ambient temperature and Tw is the temperature of the water entering the pipe from the mains supply. h1 may be considered a (generally constant) transfer coefficient between the pipe and the ambient (e.g. air), and h2 may be considered to be a flow-dependent (thus, may be non-constant) transfer coefficient between the pipe and mains water supply.

h2 may be strongly dependent upon the rate of flow of the water in the pipe, q. If q is zero (no leak), then h2 will be very close to zero. If q is non zero, then h2 may start to affect, and/or have a greater effect on, dTp/dt.

If there is flow through the pipe, then the coefficient of heat transfer between the water and the pipe, h2 may be larger relative to h1. Over a period of time (typically 5 mins to 3 hours), Tp will generally tend towards Tw. As Tp approaches Tw, the rate of change of Tp, dTp/dt may be small, even if there is a still a relatively large difference between the air temperature and the pipe temperature (Ta−Tp). This may be indicative of flow in the pipe and presence of a leak.

One embodiment of implementing this in practice is as follows:

Rearranging (1) for h1 gives $$h1 = [(dTp/dt) - h2(Tw-Tp)]/(Tp-Ta) \quad (2)$$

When h2 is large, (1) shows that generally Tp will tend towards Tw over time as Tp will asymptotically approach the water temperature. Tp may approach a steady state as the h2(Tw−Tp) term becomes smaller, and we can then approximate (2) based on the observables Tp and Ta as $$h1' = (dTp/dt)/(Tp-Ta) \quad (3)$$

If h1' is small, then the gradient in the pipe temperature over time is small relative to the difference between the pipe and the ambient/air temperatures. The pipe temperature may then be not tending towards the ambient/air temperature in a way which would be expected under a no leak condition, i.e., there may be an additional heat source or sink being applied to the pipe, potentially indicating the presence of flow in the pipe and thus a leak.

Thus, if it is detected that $$(dTp/dt)/(Tp-Ta) < \text{THRESH} \quad (4a)$$

over a period of several minutes to a few hours, this may be interpreted as indicating a leak, where THRESH is a value that is preferably close to zero but sufficient to allow for variations due to noise and/or water temperature changes.

And if $$(dTp/dt)/(Tp-Ta) >= \text{THRESH} \quad (4b)$$

then this may be interpreted as indicating that there is not a leak. Example values of THRESH may be, e.g., 0.001, 0.005, 0.01, 0.1 or 1.

In an embodiment, rather than calculating the first differential dTp/dt by calculating the difference between $Tp_n$ and $Tp_{n-1}$ where $Tp_n$ and $Tp_{n-1}$ are the values of Tp in successive time periods (which calculation may amplify any noise in the readings), exponential function(s) may be fitted (e.g., finding a best fit for example by means of a least squares fitting method) to the Tp and/or Ta samples over a region in which there has been no previously calculated water usage (this may have been indicated by other means). The exponential function(s) may then be used to calculate a value indicative of dTp/dt by analytical differentiation of the fitted exponential. Each fitted exponential function for the pipe and air temperature may be of the form $a+bt+ce^{dt}$ where a, b, c and/or d are generally taken to be constants and t is an indicator of time. In this case analytical differentiation of the function may calculate the value indicative of dTp/dt by calculating $b+cde^{ct}$.

Advantageously, the use of an equation above, e.g., (3), (4a) and/or (4b), may allow an early and/or fast response to a leak condition.

In an embodiment, leak detection based on a ratio such as in equation (4a) and/or (4b) may be combined with an above described detection method based on detecting when a temperature difference is below/not below a predetermined threshold for a predetermined period. For example, they may run in parallel to provide redundancy and/or to improve robustness. If either algorithm predicted a leak a number (1 or more) of times then a leak could be reported for example by outputting an alarm.

In view of the above, to implement leak detection, a leak detector for detecting a leak in a water supply system comprising a pipe may have a first temperature sensor detecting ambient temperature, a second temperature sensor configured to be mounted adjacent or in thermal contact with a pipe of the pipe system, and a processing means configured to determine a temperature difference between the first and second temperature sensors, wherein the processing means is configured to indicate the presence of a leak if a monitored variable is above a predetermined threshold for a predetermined period, wherein the monitored variable is the sum of an indicator of time gradient of the sensed pipe temperature and a multiple of the temperature difference, where the multiple represents a constant heat transfer coefficient. The leak detection method based on such a sum may be combined with either or both of the two methods based on the temperature difference relative to a predetermined threshold and on h1'. Furthermore, optional features provided for either of those two methods, for example with regarding to identifying the starting point for the predetermined period, etc., may be applied for this sum-based method similarly.

In an embodiment, leak detection in line with equation (6a) and/or (6b) may be combined with an above described detection method based on detecting when a temperature difference is below/not below a predetermined threshold for a predetermined period and/or with a detection method based on a ratio as in equation (4a) and/or (4b). For example, any two or more of these methods may run in parallel to provide redundancy and/or to improve robustness. If either algorithm predicted a leak a number (1 or more) of times then a leak could be reported for example by outputting an alarm.

Generally speaking, the embodiments described herein are implemented indoors, i.e., are attached to a pipe within a property in order to detect leaks. This may be advantageous depending on geographic location, since an outdoor location may require some thermal insulation to prevent the pipe freezing. Such insulation may interfere with monitoring the ambient temperature, depending on the arrangement of sensors.

Figure 5:
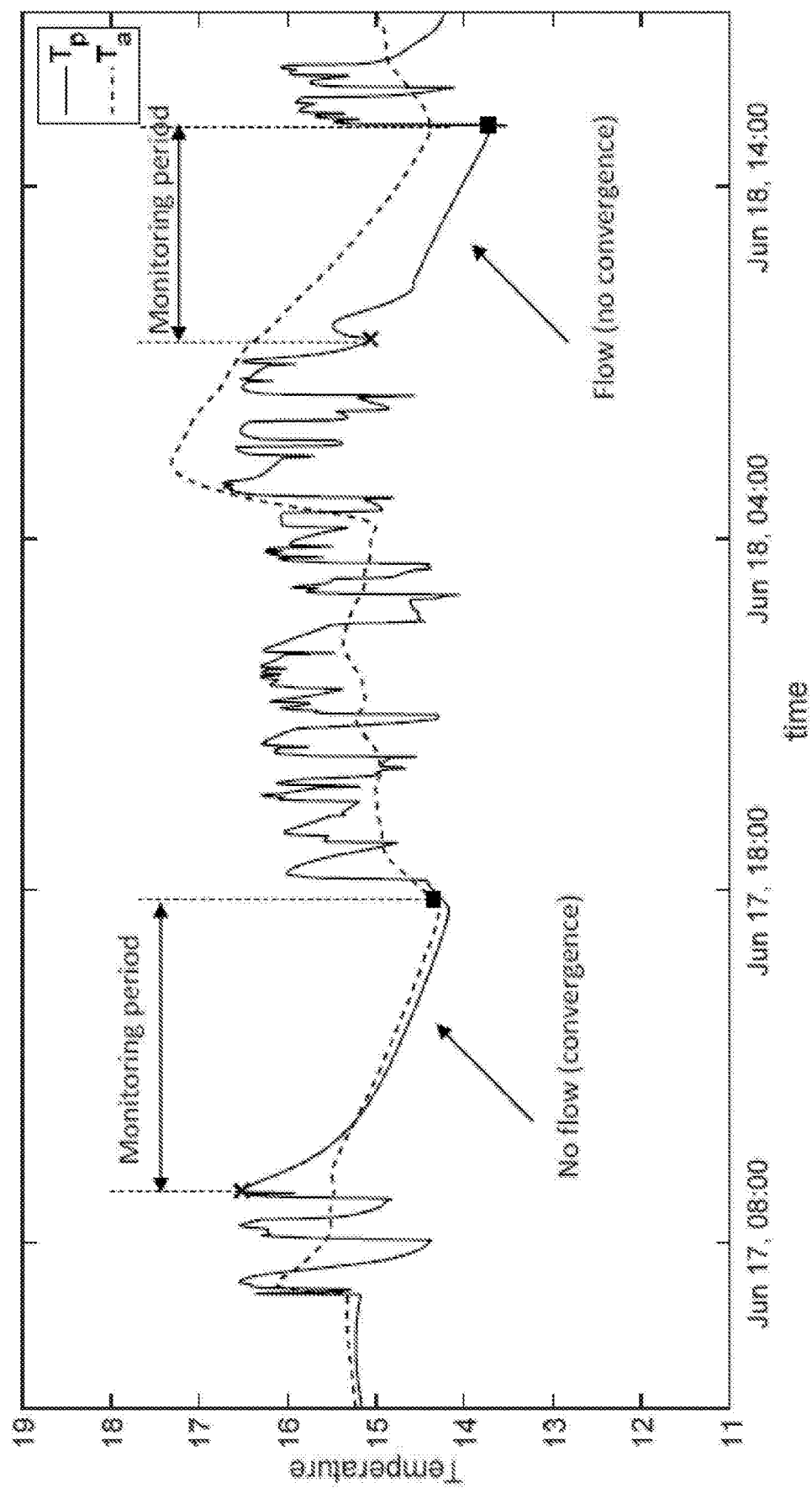
FIGS. 5 and 6 show examples of temperature-time traces.

FIG. 5 shows further example temperature-time traces of pipe temperature Tp and ambient temperature Ta, including monitoring periods for 'no flow' and 'flow' instances.

Figure 6:
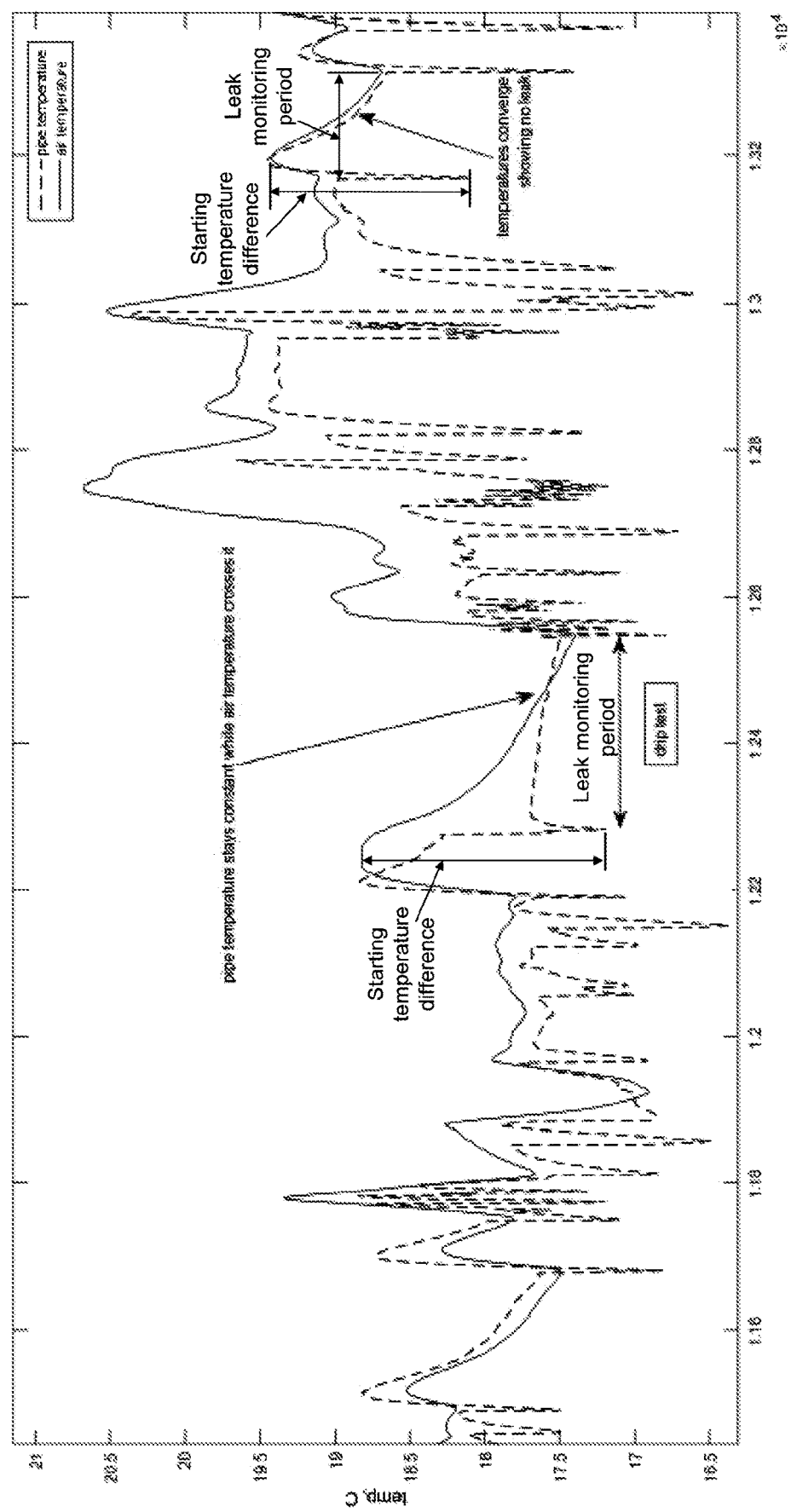

FIG. 6 shows further example temperature-time traces of pipe temperature Tp and ambient temperature Ta. As shown, a maximum ambient/air temperature may be used for a starting temperature difference to trigger a monitoring period. Alternatively, the ambient/air temperature used for the starting difference may be the temperature of the ambient/air at the instant that the pipe temperature curvature is at a maximum.

Figure 7:
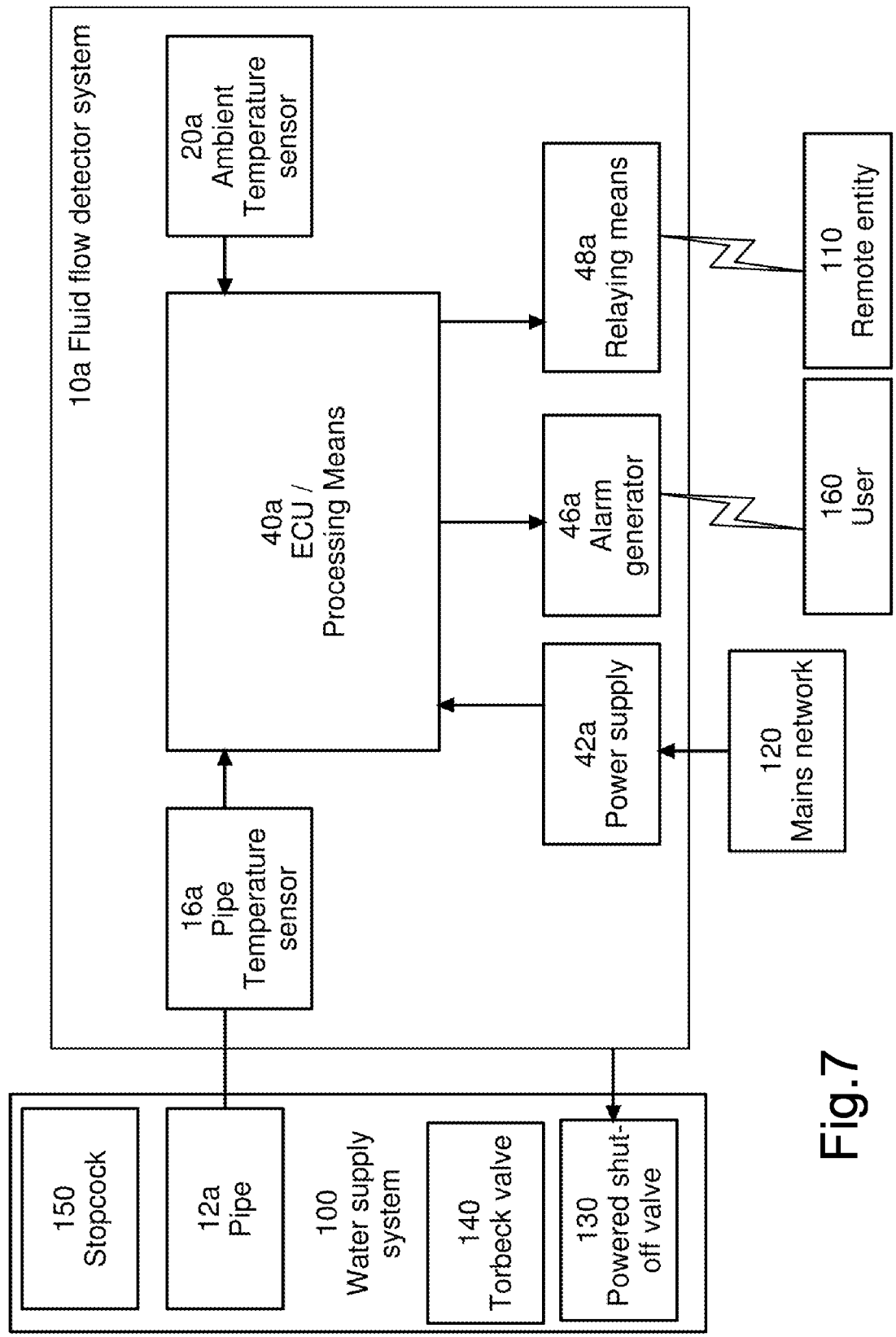
FIG. 7 shows an example implementation of a fluid flow detector system/device.

FIG. 7 shows an example fluid flow detector system 10a, for monitoring a pipe 12a of a water supply system 100 (referable to as a pipe system). The water supply system may further comprise a stopcock 150, a valve 140 such as a Torbeck valve, and/or a powered shut-off valve 130 which may be controlled for example by the processing means (preferably comprising one or more processors), e.g., ECU 40a. The fluid flow detector system may be a self-contained device for attaching to the pipe 12a, or may comprise a system of couple devices, e.g., the pipe temperature sensor 16a and/or ambient temperature sensor may be provided externally to a device comprising the processing means 40a, e.g., may be coupled by a wire(s) or wirelessly to such a device. The power supply 42a may be coupled to a mains network 120 and/or may comprise a battery(s). The alarm generator 46a is shown in the fluid flow detector system, e.g., in a device housing at least the processing means, however such an alarm generator may additionally or alternatively be provided at a remote entity 110. The alarm generator 46a may send an alarm preferably, wirelessly, to a user 160 and/or to or via a relaying means 48a and/or a remote entity. The fluid flow detector system, e.g., a device comprising at least the processing means, may comprise a relaying means, e.g., a communication interface comprising a transmitter and/or receiver, preferably wireless, for communication with a remote entity 110l (e.g., remote alarm signal receiving station).

Figure 8:
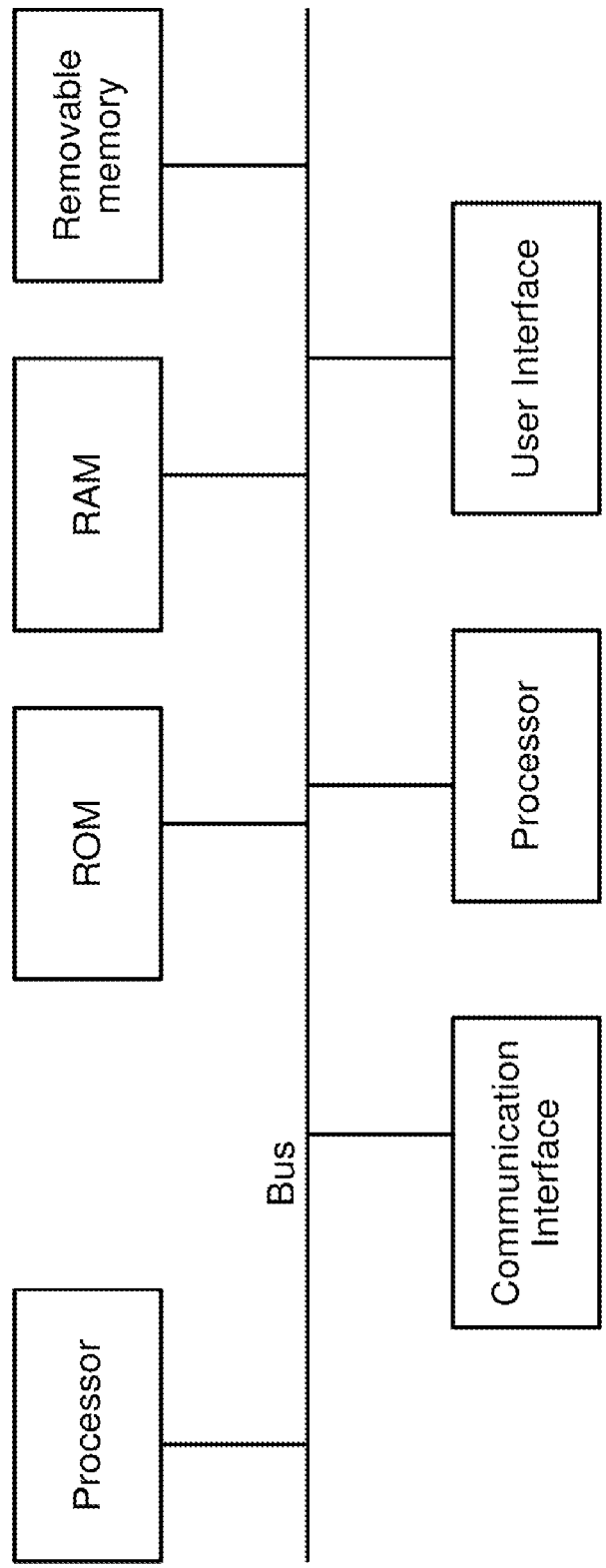
FIG. 8 shows an example computing device or system on which at least the processing means, e.g., electronic control unit, of an embodiment of the invention may be implemented.

FIG. 8 shows an example computing device or system on which at least the processing means, e.g., electronic control unit, of an embodiment of the invention may be implemented. Similarly, remote entity, e.g., remote alarm signal receiving station, may by implemented by such a computing device/system. Each element of FIG. 8 is optional. The computing device/system of FIG. 8 comprises a bus, at least one processor, at least one communication port (e.g., RS232, Ethernet, USB, etc.), and/or memory, all generally coupled by a bus (e.g., PCI, SCSI). The memory may comprise non-volatile memory such as read only memory (ROM) or a hard disk and/or volatile memory such as random access memory (RAM, e.g., SRAM or DRAM), cache (generally RAM) and/or removable memory (e.g., EEPROM or flash memory). The processor may be any known processor, e.g., an Intel (registered trademark) or ARM (registered trademark) processor. A user interface, e.g., display screen and/or keyboard may be provided. The processor 24a may be an ARM® device or a similar processor produced by another manufacturer such as Intel®.

Further Alternative or Additional Features of Embodiments

The following describes features of embodiments, any one or more of which features may be provided in any combination, and in any embodiment disclosed above, for example in an embodiment using the dip (and/or peak) height method.

If a leak is due to a pipe burst or other catastrophic failure, it may be beneficial to detect the leak quickly, e.g., earlier than a 4 hour wait which may otherwise be used to determine a low flow leak.

Continuous water usage may be evident by the pipe temperature tending to be close to the incoming mains water temperature and staying at a close to constant value for a period of time, for example 20 minutes. Such usage may be detected by an algorithm, which is described below with reference to the features 1-9 shown in FIGS. 9 and 10, wherein the dash-dot-dash lines indicate estimated air temperatures, and the solid and dotted lines indicate measured pipe temperature and estimated incoming water temperature, respectively. The pipe temperatures of FIG. 9 (labelled 4) and shown similarly in FIG. 10 may be detected by a pipe temperature sensor (thermistor). The ambient (air) temperatures of FIG. 9 (labelled 1) may be measured by a sensor. However, an embodiment may omit an ambient air temperature sensor, and therefore a measured air temperature trace is omitted from FIG. 10.

Figure 9:
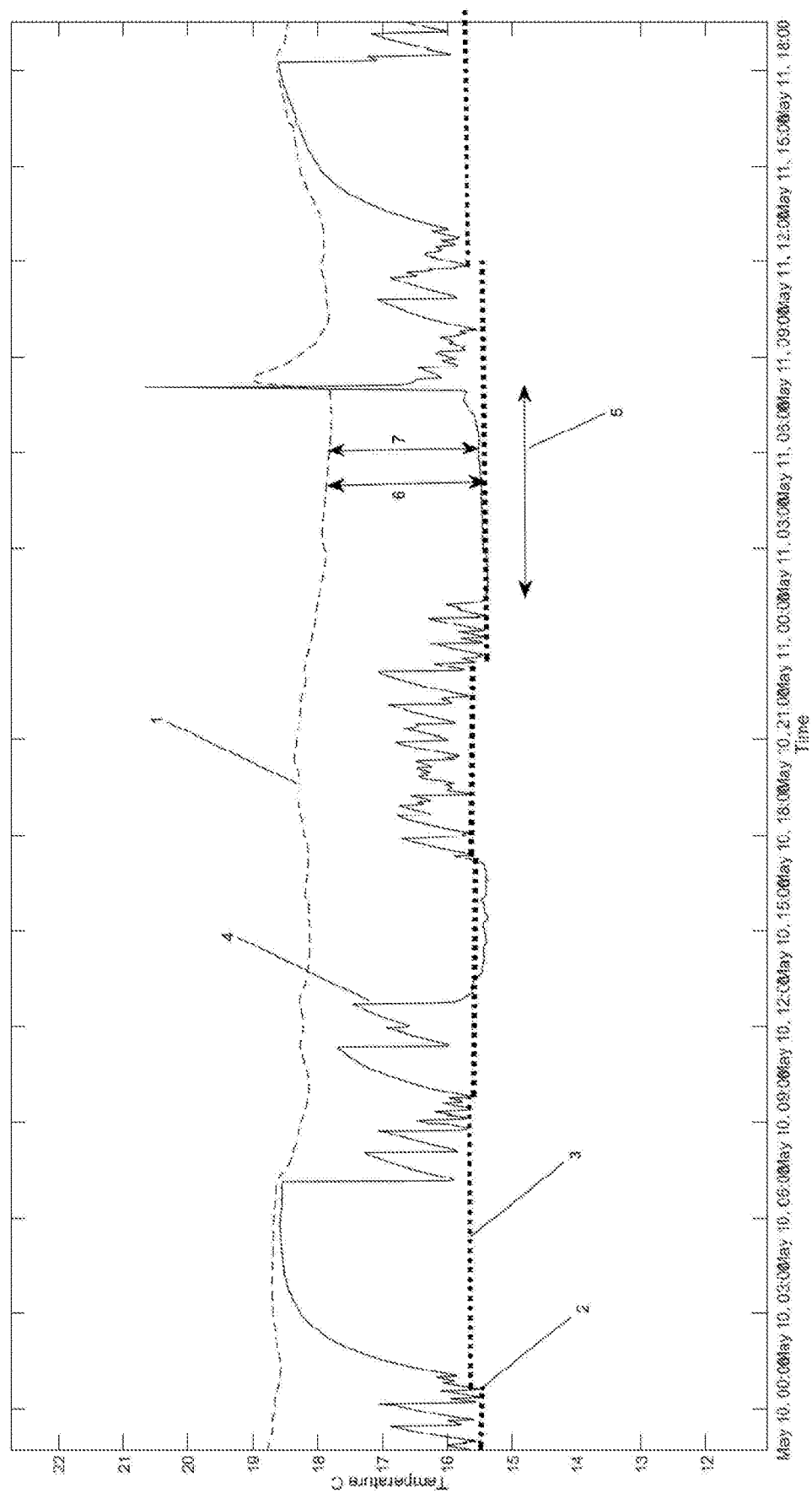
FIG. 9 shows an example high flow graph of pipe and air temperatures.
Figure 10:
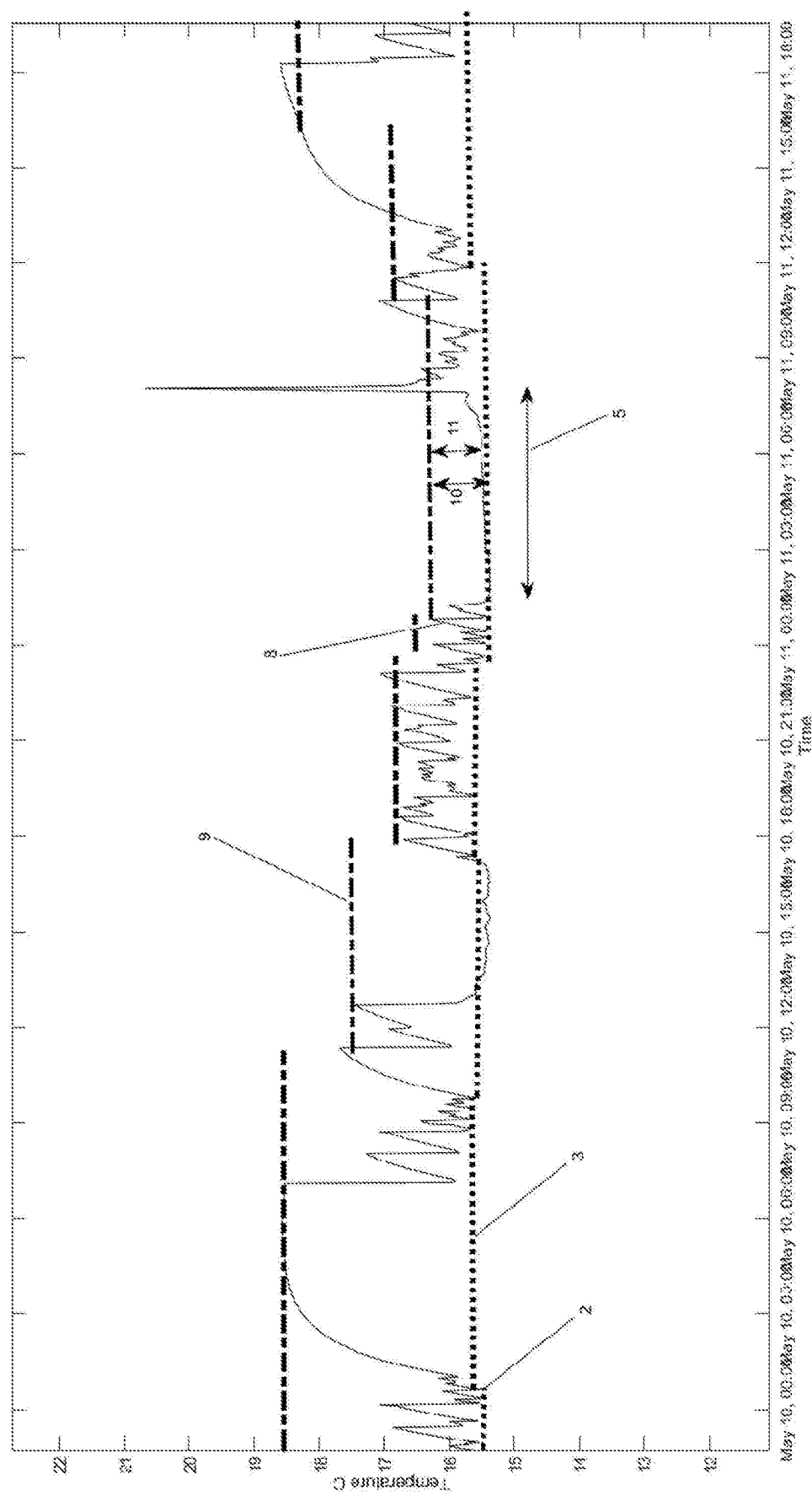
FIG. 10 shows an example of a high flow graph showing measured pipe temperatures.

In the algorithm, and with reference to FIG. 9, the incoming water temperature (3) may be estimated by analysing pipe temperature curvature over time preferably based on the second differential of pipe temperature ($d^2T/dt^2$). Specifically, the estimation may look for peaks (2) in the second differential of the pipe temperature (4). Using the second differential may identify points of sharp curvature (e.g., greater than a threshold indicator value) for example where a tap is turned off and on. Taking an average of, or otherwise smoothing, the temperatures at each of these points may give a rolling forward looking estimate of the water temperature entering the building (generally from underground). This temperature of water entering the building generally varies reasonably slowly as the season changes, so may be updated slowly to smooth out points where a very small amount of water usage has chilled the pipe only slightly.

When there is a region (5) where the pipe temperature remains roughly (e.g., exactly) constant for an extended period of time, say 20 minutes, then the pipe temperature may be compared to the estimated water temperature and the air (ambient) temperature (1). If the pipe temperature and estimated water temperature are close (e.g., having less than a threshold temperature difference), but the air temperature is noticeably different to both of them (e.g., having greater than a threshold temperature difference), then a continuous flow condition may be assumed. A flow (or leak) may then by indicated (e.g., internally, audibly and/or visibly on the detector housing, and/or by notification to a user and/or a central control unit). One metric for doing this is a proxy flow estimate based on the ratio of the temperature differences (6) and (7), for example $$Q=(T\text{air}-T\text{pipe})/(T\text{air}-T\text{water})$$

If flow parameter Q is close to 1 or above a defined threshold, then continuous flow may be assumed. Flow (e.g., leak) may then be indicated, e.g., internally and/or preferably by notification directly to the user and/or external control unit. If Q is close to 0, then there is no or low flow, which may similarly be indicated. By repeatedly updating the value of Q as new temperature readings are taken, then the duration of the continuous flow may be measured and monitored, preferably using a timer T1. If any distinct changes in the pipe temperature are observed, for example by measuring the gradient of the pipe temperature and comparing it to a threshold, then the duration estimate may be restarted, as it is likely that the water flow has stopped and restarted, indicating that for example one shower has stopped and another started.

By choosing the duration over which continuous flow is monitored for, unusual or extended water usage may then be alerted. For example if continuous water usage is typically less than 20 minutes, then an alert may be generated when continuous water usage is detected for longer than a threshold time duration of 20 minutes. This may be achieved using a timer T1. This may alert someone to a burst pipe, or possibly a bath that has been left running. More generally, an indication of flow or a leak may be provided internally, audibly and/or visibly on the detector housing, and/or by notification to a user and/or external control unit.

The duration threshold may be varied preferably in response to observed water usage, for example varied automatically by the processor and/or in accordance with direct and/or remote input from a user and/or external control unit. For example if a particular installation often observes continuous water usage for longer periods of time (because longer showers are taken for example) then the duration of h flow before an alert is sent may be adjusted to minimise nuisance alarms during showers. This may involve observing repeated periods of water flow that are shorter than a threshold time duration but longer than a shorter threshold time interval.

Figure 11:
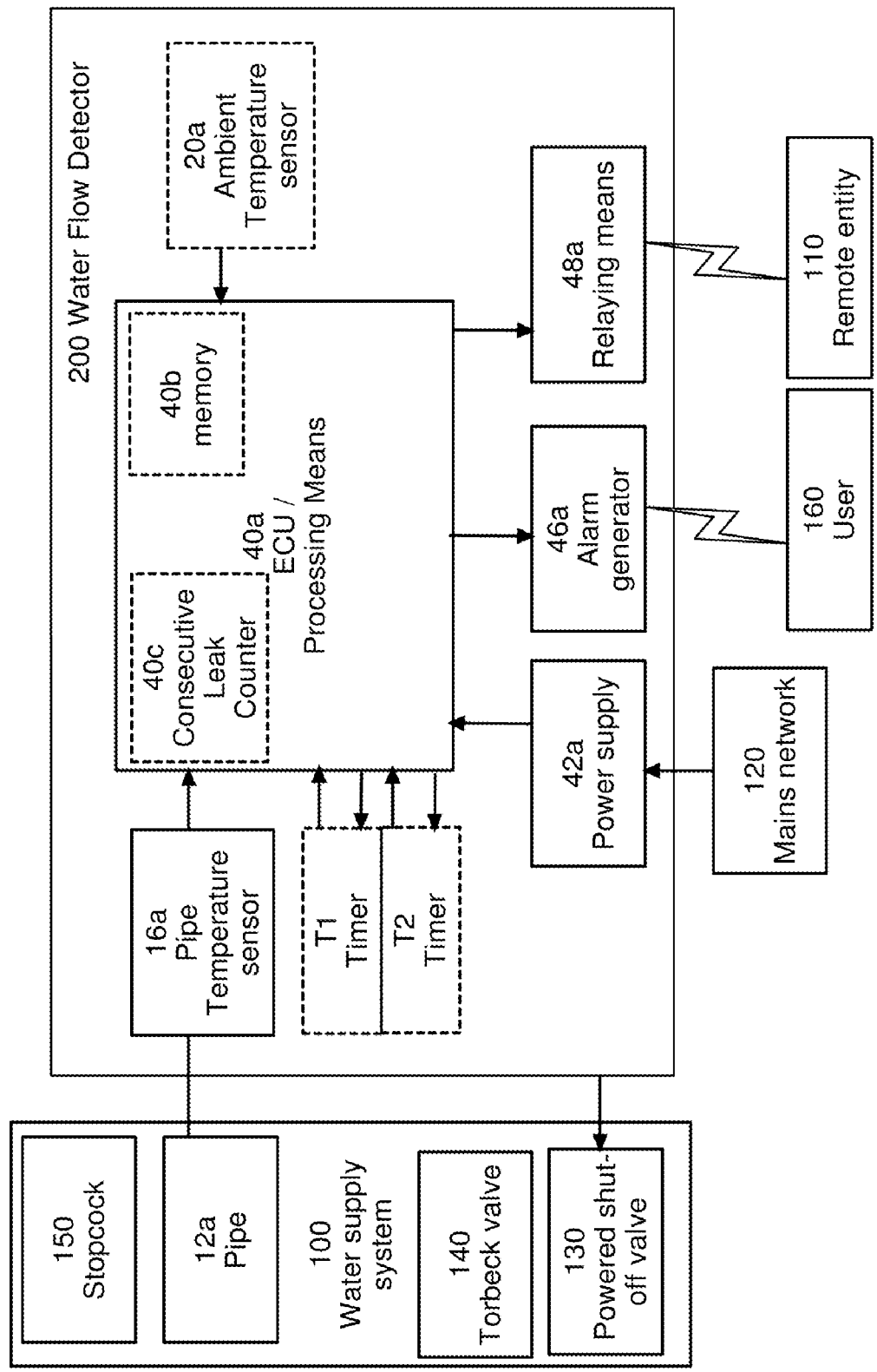
FIG. 11 shows an example of a water leak detector, optionally comprising at least one timer T1 and/or omitting an ambient temperature sensor.

An embodiment may use a single sensor, or at least omit the air (ambient) temperature sensor. A flow/leak detector may then have a lower component count and may be manufactured at lower cost. In this regard, FIG. 11 shows an embodiment of a water flow/leak detector 200, which comprises components similarly to the system 10a of FIG. 7 (e.g., at least a pipe temperature sensor 16a and processor 40a), however optionally comprising one or more one timers T1, T2 and/or consecutive leak counter and optionally omitting an ambient temperature sensor 20a (see FIG. 7) (any other element shown in FIG. 11 may be similarly optional). Where an air temperature sensor is not used, high flow leaks may still be determined using a similar method as above. However because the air temperature is no longer directly observable, it may instead be estimated. We refer in this regard to FIG. 10, wherein the dash-dot-dash lines indicate estimated air temperatures. The air temperature may be estimated by looking for an temperature (referred to for example as an end or target temperature) to which the pipe temperature is tending, e.g., when it follows an approximately exponential-type (e.g., proportional to $x+ye^{-f(t)}$ where t is time and f(t) is a function of time such as and $\alpha t+\beta$, wherein x, y, α and/or β may be a constant) curve upwards (8). For example, the first dash-dot line of FIG. 10, where the pipe temperature plateaus, corresponds to such an end temperature of about 18.5 deg C. Determining such an end value, and/or an average of such end values corresponding to respective plateaus, may allow determination of an estimated air (ambient) temperature. Additionally or alternatively, an air temperature (9) may be estimated based on a smoothed and/or average of peak pipe temperatures following a detected such tendency to an end temperature (even if no plateau is reached); this may be preferred where it is desired not to wait for occurrence of a plateau in order to determine an end temperature. Such a temperature estimate using peak temperature(s) is shown by the second dashed-dot line of FIG. 10 at about 17.5 deg C. above such peaks in pipe temperature. (Note that air temperature may change more quickly than incoming water temperature, so this preferably updates more rapidly). Using either estimation method when the ambient temperature sensor is omitted, the ratio of Tpipe−Tair(estimated) (10) to Tpipe−Twater (11) may then be calculated again and continuous flow identified using the same metric as above.

The algorithm may also function if water temperature is higher than air temperature, for example if the pipe temperature follows an exponential-type curve downwards and/or troughs are used instead of the above-mentioned peaks.

In an embodiment, timing, duration and/or flow amount of water usage may be estimated (e.g., low, medium, high, or an exact amount of flow and/or duration) from received pipe temperatures e.g., from a pipe temperature graph. For example whenever the pipe temperature dips down rapidly and then increases again (this may be taken to be indicated by a high negative first differential dT/dt, e.g., exceeding a threshold differential value, and/or on the basis a second differential) then short duration water usage may be assumed and preferably notified to a user, e.g., by mobile phone. Also when the pipe temperature similarly dips and rises, and measured Q is also high for a period of time (this preferably detected by measuring a duration for which the determined flow parameter remains above a threshold flow parameter value), then longer duration water usage may be assumed or otherwise determined, and preferably similarly notified. This may then be used to provide feedback to a consumer on the functioning of their leak detector, and/or to help encourage water conservation, for example by comparing them to other water users and/or showing that they are above average water users. Feedback to the consumer may indicate that they are light or heavy water users, and/or may indicate appropriate water saving tips to the user based on the detected usage.

In view of the above, according to an embodiment, there may be provided a water flow detector for detecting a flow in a building water supply system comprising a pipe, the flow detector configured to determine ambient temperature and having a pipe temperature sensor configured to be mounted adjacent or in thermal contact with a pipe of the pipe system, and a processor configured to determine a first temperature difference that is between the determined ambient temperature and a temperature of the pipe temperature sensor, wherein: the processor is configured to generate an indicator of pipe temperature curvature based on outputs of the pipe temperature sensor; the processor is configured to identify a said indicator that exceeds a threshold indicator value and to store a said pipe temperature sensor output received when the curvature exceeds said threshold indicator value; the processor is configured to estimate a temperature of water entering the building based on at least one said stored pipe temperature sensor output; the processor is configured to determine a second temperature difference that is between the estimated temperature and the determined ambient temperature; the processor is configured to determine a flow parameter that is a function of a ratio of the first temperature difference to the second temperature difference; and the processor is configured to determine presence of a flow based on the flow parameter.

Advantageously, such a water flow detector may be used to detect and indicate (for example internally, audibly and/or visibly on the detector housing, by notification to a user (e.g. to the user's mobile phone) and/or by notification to an external or central control unit) a flow that is a leak, such a leak potentially being anywhere within the pipe system of the building (e.g., domestic or office building) and generally downstream of the detector. Such an embodiment may be desirable in particular for indicating a high flow or catastrophic leak, e.g., a burst pipe condition, which may be detected when the flow parameter exceeds a threshold. Rapid response to such a leak may be achieved using the pipe temperature sensor, which may be the only temperature sensor and/or may be inside a housing that may further contain the processor (processing means, ECU). Specifically, the pipe temperature sensor may be within the housing, and/or at, on or within a wall of the housing. An attachment (e.g, spring-loaded clip) of the housing for mounting the housing to the pipe may bias the pipe temperatures sensor into direct or close contact with the pipe. Any ambient temperature sensor that is present may be further contained in the housing.

The indicator of pipe temperature curvature may indicate a second differential of pipe temperature change relative to time. In a preferred embodiment, the curvature indicator may indicate extremes in the pipe temperature based on filtering the pipe temperature for peaks in the curvature (which is relative to time). Regardless, the indicated curvature (preferably magnitude thereof) relative to the threshold indicator value, which may be a preset and/or locally stored value, may be used to estimate the water temperature.

The function is preferably a monotonic function of the ratio. An embodiment may determine if the flow parameter is substantially (e.g., exactly) proportional to the ratio of the first and second temperature differences. More specifically, the flow parameter may be determined to be equal to (or at least proportional to) (Tair−Tpipe)/(Tair−Twater), wherein Tair is the determined ambient temperature, Tpipe is the temperature of the pipe temperature sensor and Twater is the estimated temperature of water entering the building.

There may further be provided the water flow detector wherein the processor is configured to determine, based on a plurality of said pipe temperature sensor outputs, when the pipe temperature tends towards (e.g., converges towards) an end value, and to determine the end value, wherein the processor is configured to perform the determination of the ambient temperature based on at least one said determined end value. For example, the ambient temperature may be determined to be substantially (e.g., exactly) equal to the most recently determined end value, or different to that value by a preferably fixed offset.

There may further be provided the water flow detector, wherein the processor is configured to perform said determination of when the pipe temperature tends towards an end value by determining when the pipe temperature tends substantially exponentially towards an end value, There may further be provided the water flow detector, wherein the processor is configured to estimate the ambient temperature based on, e.g., equal (albeit optionally with a fixed offset) to, a time-based smoothing or average of a plurality of said determined end values.

There may further be provided the water flow detector, wherein the processor is configured to detect at least one maximum and/or minimum of said determined end values and to estimate the ambient temperature based on, e.g., equal to or as an average of, said maxima and/or minima end values.

There may further be provided the water flow detector, comprising another temperature sensor, wherein the processor is configured to perform the determination of the ambient temperature based on at least one output of the another temperature sensor.

There may further be provided the water flow detector, wherein the processor is configured to indicate a flow when the flow parameter (preferably a magnitude thereof) exceeds a threshold flow parameter value, optionally wherein the threshold flow parameter is 0.1, 0.2, 0.9, 0.95 or 0.98.

There may further be provided the water flow detector, wherein the flow indication indicates a high flow leak (e.g., indicates a catastrophic leak and/or does not provide other possible indications, e.g., no flow, low flow and/or medium flow). This may occur for example using a threshold flow parameter of 0.9, 0.95 or 0.98.

There may further be provided the water flow detector, comprising a timer to determine when the flow parameter remains greater than a threshold flow parameter value for a time longer than a threshold time duration, and to indicated presence of a flow responsive to a said determination by the timer, optionally wherein the threshold flow parameter value is 0.1, 0.2, 0.9, 0.95 or 0.98.

There may further be provided the water flow detector, wherein said threshold time duration is at least 20 minutes, more preferably at least one hour. Preferably, the threshold time duration can be varied automatically to be set at a value that is above the duration for which normal flow is usually observed in the building.

There may further be provided the water flow detector, configured to receive input from at least one of a user and a control unit, and to vary the threshold time duration according to said input. Such input may be received wirelessly or through a physical user interface on the water flow detector housing. Such a control unit may be a central control unit or monitoring station that interfaces with a plurality of the water flow detectors preferably located in other buildings.

There may further be provided the water flow detector, wherein the processor is configured to determine a temperature versus time gradient based on outputs of the pipe temperature sensor, and to restart the timer when the determined gradient exceeds a gradient threshold.

There may further be provided the water flow detector, configured to increase the threshold time duration when the flow parameter remains greater than a said threshold flow parameter value for a time that is longer than a threshold time interval, wherein the threshold time interval is shorter than said threshold time duration.

There may further be provided the water flow detector, wherein the processor is configured to estimate the temperature of water entering the building based on (e.g., equal to or proportional to; albeit optionally with a fixed offset) an average of a plurality of said stored temperature sensor outputs.

There may further be provided the water flow detector, wherein the processor is configured to indicate a flow (or leak) when the flow parameter is between a first threshold flow parameter value and a second threshold value, optionally wherein the first threshold flow parameter is 0.1, 0.05 or 0.02 and/or the second threshold value is 0.9, 0.95 or 0.98. The detector may then indicate (e.g., by notifying a user and/or control unit) a medium flow/leak. Additionally or alternatively, the processor may be configured to indicate (e.g. internally to the detector, preferably by similar notification to the user and/or control unit and/or audibly or visibly on the detector housing) no flow/leak when the flow parameter is below a threshold flow parameter value, optionally wherein the threshold flow parameter is 0.1, 0.05 or 0.02.

In preferred embodiment, the processor is configured to determine presence of a leak based on the flow parameter. Any above-mentioned determination of presence of, or indication of, flow may result in or comprise the detector indicating a leak. Preferably the leak is indicated as above, e.g., internally, audibly and/or visibly on the housing, notified to a user (e.g., to a mobile phone), and/or to an external control unit.

Such a water flow detector may be referred to as a water leak detector. In this regard, 'flow' and 'leak' may be used interchangeably in the above description of the water flow detector, a leak being a specific form of a flow.

According to a second embodiment, there may be provided a method for detecting a flow in a building water supply system comprising a pipe, the method comprising: determining ambient temperature; using a temperature sensor to detect a temperature of the pipe, the temperature sensor mounted adjacent or in thermal contact with the pipe; estimating a temperature of water entering the pipe, based on output of the temperature sensor; and determining when the pipe temperature remains substantially constant for a period of time greater than a threshold time duration, and if it is determined that the pipe temperature has remained substantially constant for a said period of time, then indicating a flow if: a difference between the estimated temperature and a said pipe temperature detected during said period is less than a first threshold temperature difference; a difference between the ambient temperature and the pipe temperature is greater than a second threshold temperature difference; and a difference between the ambient temperature and the estimated temperature is greater than a third threshold temperature difference.

Similarly as for the first aspect, the flow indication may specifically be an indication of a leak, e.g., the indication being internally, audibly and/or visibly on a detector housing, direct to a user (e.g., to a mobile phone) and/or to an external control unit. Embodiments may be advantageous for rapidly detecting and indicating a high flow or catastrophic leak, e.g., a burst pipe condition.

There may further be provided the method, wherein the threshold time duration is at least 20 minutes, preferably at least one hour.

The first, second and/or third threshold difference may be the same or different. At least one of these differences may be at least 0.2 deg C., preferably at least 0.5 deg C., more preferably at least 1 deg C.

There may further be provided the method, wherein said determining ambient temperature comprises estimating ambient temperature by determining when the pipe temperature tends (or converges) towards an end value, determining the end value, and determining an estimation of the ambient temperature based on at least one said determined end value. For example, the ambient temperature may be estimated as equal to the most recently determined end value, albeit with an optional fixed offset.

There may further be provided the method, wherein said determining ambient temperature is performed based on an output of an ambient temperature sensor.

Advantageously, and similarly as for the first aspect, such flow detection may be leak detection and such flow indicating may indicate a leak. In this regard, and similarly as for the first aspect, it is noted that 'flow' and 'leak' may be used interchangeably in relation to the above method, a leak being a specific form of a flow.

According to a third aspect of the present invention, there is provided a method of providing water consumption feedback to a user of a building water supply system comprising a pipe, the method optionally using the water flow detector of the first aspect and/or the method of the second aspect, the method of providing feedback comprising: using a temperature sensor to detect a temperature of the pipe, the temperature sensor mounted adjacent or in thermal contact with the pipe; and at least one of:
(a) determining when a magnitude of the pipe temperature has a peak and a time differential of the pipe temperature approaching the peak exceeds a threshold differential value, preferably wherein said threshold differential value is negative, and, responsive to a said detection, indicating a short duration water usage; and
(b) determining a flow parameter that is substantially proportional to a ratio of a first temperature difference to a second temperature difference, wherein the first temperature difference is between a determined ambient temperature and a said detected temperature of the pipe, and the second temperature difference is between an estimated temperature of water entering the pipe and the determined ambient temperature, measuring a duration for which the determined flow parameter remains above a threshold flow parameter value, and determining how long water has been used for based on the measured duration.

Thus, short and/or long duration usage may be informed to the user, based on the time differential (dTp/dt, where Tp is pipe temperature and t is time) and/or a sufficiently long duration of a sufficiently high flow parameter magnitude (e.g., at least 0.8, 0.9, 0.05 or 0.98 for high flow, or 0.1 or 0.2 for low flow, if the flow parameter value is determined based on a ratio as described above for the first aspect).

The estimate of temperature of the water entering the pipe may be achieved as outlined above for the first aspect, this being generally based estimate the temperature of water entering the building based on stored pipe temperature sensor outputs, e.g., an average of a plurality of stored temperature sensor outputs.

In an optional embodiment, alternatively or additionally to determining how long water has been used for based on the measured duration, (b) may comprise detecting when the flow parameter (preferably magnitude thereof) remains greater than a threshold flow parameter value for a time longer than a threshold time duration and responsive to a said detection, indicating a long duration water usage.

The feedback to the user may indicate that the user is a heavy water consumer or a light water consumer based on a number or frequency of a said plurality of indications of short duration water usage and a number or frequency of a said plurality of indications of long duration water usage. For example, the feedback indicating that the user is a heavy or light water consumer may be based on a ratio of a number or frequency of a said plurality of indications of short duration water usage to a number or frequency of a said plurality of indications of long duration water usage.

Additionally or alternatively, the feedback may be based on comparing at least one said indication of water usage with indications of water usage of other water users, and determining in which quantile of distribution of water usage the user of the building water supply system is in.

Any one or more of the above embodiments may be combined, with/without any of the optional features, within any of the embodiments (e.g., fluid flow detector, leak detector and/or water supply system comprising such a leak detector) disclosed herein.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:
1. A fluid flow detection apparatus for detecting a water leak in a pipe system of a building, the fluid flow detection apparatus configured to perform a high flow test and to output a leak signal indicating a high flow based on a result of said test, wherein the fluid flow detection apparatus comprises:
a first temperature sensor to detect ambient temperature;
a second temperature sensor to detect pipe temperature, the second temperature sensor adjacent or in thermal contact with a pipe of the pipe system;
at least one input line, configured to receive a time series of ambient temperature indicators from the first temperature sensor and a time series of pipe temperature indicators from the second temperature sensor; and
a processor configured to perform the high flow test by:
identifying either lowest or highest temperatures in a first time series of received pipe temperature indicators,
estimate, based on the identified temperatures, a temperature profile of water entering the pipe, the estimated water temperature profile comprising at least one estimated temperature of the water; and
determining that a high flow is present by detecting, based on a second time series of pipe temperature indicators received after the first time series, if the pipe temperature approaches the estimated water temperature profile.
2. The fluid flow detection apparatus of claim 1, wherein the processor is configured to detect a transient usage by detecting a peak of pipe temperature indicators received from the pipe temperature sensor after a low flow test has been performed, the fluid flow detection apparatus configured to inhibit output of the leak signal indicating a low flow until the transient usage is detected.
3. The fluid flow detection apparatus of claim 1, wherein the processor is configured to determine a value of a parameter that is proportional to a ratio of a difference between a received first ambient temperature indicator and a received second pipe temperature indicator and a difference between a received ambient temperature indicator and a water temperature,
wherein the processor is configured to determine the water temperature based on the estimated water temperature profile, wherein the first and second temperature indicators and water temperature indicate concurrent temperatures, and
the processor is configured to perform said detection of a said approach of the pipe temperature toward the estimated water temperature profile by detecting when a determined parameter value exceeds a threshold.
4. The fluid flow detection apparatus of claim 3, wherein the processor is configured to determine the value of the parameter based on each of the received pipe temperature indicators and to determine an approach of the pipe temperature toward the estimated water temperature profile when all of the determined values of the parameter exceed the threshold.
5. The fluid flow detection apparatus of claim 3, wherein:
the processor is configured to determine the value of the parameter based on each of the received pipe temperature indicators, and
the processor is configured to detect a water usage and to determine a duration of the high flow, the processor configured to perform detection of the water usage by detecting a peak of pipe temperature indicators received from the pipe temperature sensor; and the fluid flow detection apparatus further comprises:
a timer to measure a time from a last detected water usage, wherein the timer is configured to reset in response to a next detected said water usage; and
the timer is configured to measure duration of the detected high flow by timing how long at least one of:
maximum deviation of the pipe temperatures from the estimated water profile remains within a predetermined range;
current said parameter values of the pipe temperatures remain above a threshold value; and
the pipe temperature remains smooth; and
wherein the processor is configured to, when the measured duration of the detected high flow exceeds a predefined period, indicate a type of high flow if the measured time since the last detected water usage is greater than a predefined time duration.

6. The fluid flow detection apparatus of claim 1, wherein the processor is configured to detect a transient usage by detecting a peak of the received pipe temperature indicators, and to inhibit the leak signal indicating the high flow if, based on the received indicators, the ambient and pipe temperatures crossed after a last detected transient usage.

7. The fluid flow detection apparatus of claim 1, wherein the processor is configured to detect a transient usage by detecting a peak of the received pipe temperature indicators, and to inhibit the leak signal indicating the high flow if more than a predetermined number of said detected peaks comprise a crossing of the received ambient and pipe temperatures.

8. The fluid flow detection apparatus of claim 1, wherein at least one of:
the processor is configured to inhibit the leak signal indicating the high flow if, based on the received indicators, a minimum absolute difference between corresponding received ambient and pipe temperature indicators is less than a threshold;
the processor is configured to inhibit a said leak signal indicating a high flow if an average gradient of the received pipe temperatures is outside a predetermined range; and
the processor is configured to inhibit a said leak signal indicating a high flow if at least one of:
at least one residual of the received pipe temperatures relative to a straight line fit to the received pipe temperatures exceeds a threshold; and
a mean square said residual exceeds a threshold.

9. The fluid flow detection apparatus of claim 1, wherein at least one of:
the processor is configured to detect a transient usage by detecting a peak of the received pipe temperature indicators, and to perform a validity check to determine that the high flow test is invalid if, based on the received pipe temperature indicators, a difference between a minimum and a maximum pipe temperature since a last detected said transient usage is greater than a threshold difference, the processor configured to, if the validity check indicates invalidity, inhibit output of a said leak signal indicating a high flow; and
the processor is configured to perform a validity check to determine that the high flow test is invalid when, based on an average gradient of the received ambient temperature indicators, a projected ambient temperature profile intersects the estimated water temperature profile, the processor configured to, if the validity check indicates invalidity, inhibit output of a said leak signal indicating a high flow.

10. The fluid flow detection apparatus of claim 1, the fluid flow detection apparatus configured to perform a test to detect a leak and to output the leak signal indicating a result of the test, wherein the processor is configured to detect a potential transient usage when:
rate of curvature of the received pipe temperature indicators exceeds a threshold; and
ambient temperature variation is smooth throughout a time duration comprising the exceeding rate of curvature, and wherein:
the fluid flow detection apparatus is configured to inhibit performance of the test until a predetermined number of the potential transient usages has been detected.

11. The fluid flow detection apparatus of claim 10, wherein the processor is configured to indicate that a whole or part of the apparatus comprising at least the second temperature sensor is not fitted to the pipe, until the predetermined number of the potential transient usages has been detected.

12. The fluid flow detection apparatus of claim 1, wherein the identified temperatures are identified based on pipe temperature indicators received at respective difference maxima between received ambient and pipe temperatures.

13. The fluid flow detection apparatus of claim 1, configured to perform a low flow test and to output a leak signal indicating one of the high flow, a low flow and no flow based on a result of at least one of the low flow test and the high flow test, wherein the processor is configured to perform the low flow test by:
determining that the low flow is present, if absolute values of temperature difference indicators of a monitoring period remain above a difference threshold, wherein each temperature difference indicator represents a difference between a received first temperature indicator and a received second temperature indicator.

14. The fluid flow detection apparatus of claim 13, wherein the processor is configured to perform a validity check to determine, based on the received ambient temperature indicators of the monitoring period, that the low flow test is invalid when ambient temperature variation is not smooth and not stable, and
the processor is configured to, if the validity check indicates invalidity, inhibit output of the leak signal indicating the low flow.

15. The fluid flow detection apparatus of claim 14, wherein the processor is configured to determine the smoothness based on a comparison of the received ambient temperature indicators to a straight line fit to the received ambient temperature indicators.

16. The fluid flow detection apparatus of claim 14, wherein the processor is configured to determine the stability when at least one of:
an average gradient of the received ambient temperature indicators is not outside a predetermined range; and
a difference between minimum and maximum of the ambient temperature indicators is less than a threshold.

17. The fluid flow detection apparatus of claim 13, wherein at least one of:
the processor is configured to perform a validity check to determine, based on the received pipe temperature indicators of the monitoring period, that the low flow test is invalid when the received pipe temperature indicators of the monitoring period comprise at least one peak, the processor configured to, if the validity check indicates invalidity, inhibit output of the leak signal indicating the low flow; and the processor is configured to detect a transient usage by detecting a peak of the received pipe temperature indicators, and configured to inhibit the leak signal indicating the high flow if the transient usage has been detected based on the received temperature indicators.

18. The fluid flow detection apparatus of claim 13, wherein the processor is configured to perform a validity check to determine that the low flow test is invalid when an average gradient of the temperature difference indicators across the monitoring period indicates divergence of the ambient and pipe temperatures and exceeds a threshold gradient, and the processor is configured to, if the validity check indicates invalidity, inhibit output of the leak signal indicating the low flow.

19. The fluid flow detection apparatus of claim 13, wherein the processor is configured to perform a validity check to determine that the low flow test is invalid if the received ambient and pipe temperature indicators of the monitoring period cross, and the processor is configured to, if the validity check indicates invalidity, inhibit output of the leak signal indicating the low flow.

20. The fluid flow detection apparatus of claim 13, wherein the processor is configured to perform a validity check to determine that the low flow test is invalid if, in an end subset of the ambient and pipe temperature indicators of the monitoring period, at least one of i) and ii) is detected:

i) an average gradient of absolute differences across the end subset is outside a predetermined range; and ii) an average gradient of the received pipe temperatures across the end subset is outside a predetermined range, the processor is configured to, if the validity check indicates invalidity, inhibit output of the leak signal indicating the low flow.

21. The fluid flow detection apparatus of claim 13, configured to determine the difference threshold based on at least one of:

at least one environmental condition of a geographical region comprising the pipe system, the at least one environmental condition comprising at least one of a ground temperature and an air temperature;

time of year;

which floor of a building has the pipe; and geographical location of the pipe system.

22. A method for detecting a water leak in a pipe system of a building, the method including performing a high flow test and outputting a leak signal indicating a high flow based on a result of the high flow test, wherein the method comprises:

receiving time series of samples of ambient temperature and pipe temperature, wherein each pipe temperature is a temperature of an external surface of a pipe of the pipe system;

performing the high flow test by:

estimating a temperature profile of water entering the pipe, based on identifying either lowest or highest temperatures of a first time series of received pipe temperature indicators, the profile comprising at least one estimated temperature of the water; and determining that a high flow is present by detecting, based on a second time series of pipe temperatures indicators received after the first time series, if the pipe temperature is approaching the estimated water temperature profile.

23. The method of claim 22, further comprising performing a low flow test and outputting a leak signal indicating one of the high flow, a low flow and no flow based on a result of at least one of the low flow test and the high flow test, wherein the low flow test is performed by:

determining that the low flow is present, if absolute values of temperature difference indicators of a monitoring period remain above a difference threshold, wherein each temperature difference indicator represents a difference between a received first temperature indicator and a received second temperature indicator.

* * * * *